US010503716B2

(12) United States Patent
Chase et al.

(10) Patent No.: US 10,503,716 B2
(45) Date of Patent: Dec. 10, 2019

(54) SYSTEMS AND METHODS FOR GENERATING BIT MATRICES FOR HASH FUNCTIONS USING FAST FILTERING

(71) Applicant: Oracle International Corporation, Redwood City, CA (US)

(72) Inventors: David R. Chase, Belmont, MA (US); Guy L. Steele, Jr., Burlington, MA (US)

(73) Assignee: Oracle International Corporation, Redwood City, CA (US)

( * ) Notice: Subject to any disclaimer, the term of this patent is extended or adjusted under 35 U.S.C. 154(b) by 750 days.

(21) Appl. No.: 14/069,259

(22) Filed: Oct. 31, 2013

(65) Prior Publication Data

US 2015/0120754 A1    Apr. 30, 2015

(51) Int. Cl.
*G06F 16/22*      (2019.01)
(52) U.S. Cl.
CPC .................. *G06F 16/2255* (2019.01)
(58) Field of Classification Search
CPC ......... G06F 17/30949; G06F 17/30067; G06F 17/30516; G06F 17/30864; G06F 17/30985
USPC ........................................................ 707/747
See application file for complete search history.

(56) References Cited

U.S. PATENT DOCUMENTS

| | | | |
|---|---|---|---|
| 6,275,919 B1 * | 8/2001 | Johnson | G06F 16/9014 711/216 |
| 7,043,494 B1 * | 5/2006 | Joshi | G06F 17/30961 |
| 7,054,315 B2 * | 5/2006 | Liao | H04L 29/06 370/351 |
| 7,065,609 B2 * | 6/2006 | Eatherton | G06F 17/30982 365/49.17 |
| 7,904,642 B1 * | 3/2011 | Gupta | G06F 17/30982 711/108 |
| 8,462,786 B2 * | 6/2013 | Liu | H04L 45/7453 370/389 |

(Continued)

OTHER PUBLICATIONS

Thomas H. Cormen, Charles E. Leiserson, Ronald L. Rivest, Introduction to Algorithms, 1990, 2nd printing, p. 421.*

(Continued)

*Primary Examiner* — Pierre M Vital
*Assistant Examiner* — Andrew N Ho
(74) *Attorney, Agent, or Firm* — Robert C. Kowert; Meyertons, Hood, Kivlin, Kowert & Goetzel, P.C.

(57) ABSTRACT

A lookup circuit evaluates hash functions that map keys to addresses in lookup tables. The circuit includes multiple hash function sub-circuits, each of which applies a respective hash function to an input key, producing a hash value. Candidate pairs of hash functions to be implemented by the hash function sub-circuits may be generated and tested for suitability in hashing a particular collection of keys. The suitability testing may include computing hash value bit vectors by applying each hash function in a candidate pair to a given key, and determining (using a modified union-find type operation that organizes objects in each set as a directed graph whose root points to itself) whether the resulting hash value bit vectors belong to the same set. The union-find type operation may include a limited distance-from-root test, path compression, or exception handling for special cases, but not a rank test.

20 Claims, 13 Drawing Sheets

(56) References Cited

U.S. PATENT DOCUMENTS

| | | | | |
|---|---|---|---|---|
| 8,804,950 | B1* | 8/2014 | Panwar | H04L 9/06 380/28 |
| 2004/0073541 | A1* | 4/2004 | Lindblad | G06F 17/30911 707/3 |
| 2006/0116989 | A1* | 6/2006 | Bellamkonda | G06F 17/30489 |
| 2006/0179071 | A1* | 8/2006 | Panigrahy | G06F 17/30949 707/101 |
| 2006/0265370 | A1* | 11/2006 | Qian | G06F 17/30949 707/7 |
| 2007/0136250 | A1* | 6/2007 | Lindblad | G06F 17/3071 |
| 2007/0136331 | A1* | 6/2007 | Hasan | G06F 17/30949 707/999.1 |
| 2007/0192564 | A1* | 8/2007 | Loeb | G06F 17/3033 711/216 |
| 2008/0065596 | A1* | 3/2008 | Shadmon | G06F 17/30911 |
| 2008/0065639 | A1* | 3/2008 | Choudhary | G06F 7/02 |
| 2008/0140662 | A1* | 6/2008 | Pandya | G06F 9/444 |
| 2008/0281789 | A1* | 11/2008 | Kao | G06F 17/30949 707/3 |
| 2008/0307189 | A1* | 12/2008 | Mityagin | G06F 17/30011 711/173 |
| 2008/0313132 | A1* | 12/2008 | Hao | H04L 45/00 707/2 |
| 2009/0265320 | A1* | 10/2009 | Kelley | H04L 12/4641 |
| 2010/0023727 | A1* | 1/2010 | Lim | H04L 45/00 711/216 |
| 2010/0040066 | A1* | 2/2010 | Hao | H04L 45/00 370/395.31 |
| 2010/0269024 | A1* | 10/2010 | Hao | H03M 13/13 714/777 |
| 2010/0287173 | A1* | 11/2010 | Schneider | G06F 17/30628 707/759 |
| 2011/0099175 | A1* | 4/2011 | Darcy | G06F 17/30949 707/747 |
| 2012/0036134 | A1* | 2/2012 | Malakhov | G06F 9/5016 707/747 |
| 2012/0136846 | A1* | 5/2012 | Song | H04L 45/7453 707/698 |

OTHER PUBLICATIONS

Robert E. Tarjan, Jan Van Leeuwen, Worst-Case Analysis of Set Union Algorithms, 1984, vol. 31, No. 2, p. 251-253, and 276.*

Thomas H. Cormen, Charles E. Leiserson, Ronald L. Rivest, 1990, Introduction to Algorithms, 2nd printing, p. 421 (Year: 1990).*

Robert E. Tarjan, Jan Van Leeuwen, 1984, Worse-Case Analysis, of Set Union Algorithms, vol. 31, No. 2, p. 251-253, and 276. (Year: 1984).*

F. C. Botelho, D. Menoti, N. Ziviani. A new algorithm for constructing minimal perfect hash functions, Technical Report TR004/04, Department of Computer Science, Federal University of Minas Gerais, pp. 1-13, 2004.

Buhler, Jeremy. Mercury BLAST dictionaries: Analysis and performance measurement. Report 2007-13. Depart of Computer Science and Engineering, Washington University in St. Louis, Mo. Feburary, pp. 1-9, 2007.

J.Lawrence Carter, Mark N. Wegman, Universal classes of hash functions. Journal of Computer and System Sciences, vol. 18, Issue 2, Apr. 1979, pp. 143-154. ISSN 0022-0000.

Z.J. Czech, G. Havas, and B.S. Majewski. An optimal algorithm for generating minimal perfect hash functions, Information Processing Letters, 43(5):257-264, 1992.

Rasmus Pagh and Flemming Friche Rodler. 2004. Cuckoo hashing. J. Algorithms 51, May 2, 2004, 122-144.

Tran Ngoc Thinh, Kittitornkun, S., and Tomiyama, S. Applying Cuckoo Hashing for FPGA-based Pattern Matching in NIDS/NIPS. Proc. International Conference on Field-Programmable Technology (ICFPT), 2007, pp. 121-128, Dec. 12-14, 2007.

Wikipedia article "Disjoint-set data structure" http://en.wikipedia.org/wiki/Disjointset_data_structure; pp. 1-5, accessed Oct. 31, 2013.

Xilinx, Inc. Virtex-5 FPGA User Guide. UG190 (v5.4) Mar. 16, 2012. http://www.xilinx.com/support/documentation/user_guides/ug190.pdf, pp. 173-210 [accessed Oct. 31, 2013].

Havas, George, Majewski, Bohdan S., Wormald, Nicholas C., and Czech, Zbigniew J. Graphs, hypergraphs and hashing. In Graph-Theoretic Concepts in Computer Science (Leeuwen, Jan, ed.). Lecture Notes in Computer Science 790 (Springer, Berlin and Heidelberg, 1994), pp. 153-165.

CMPH, C Minimal Perfect Hashing Library, Jun. 9, 2012, pp. 1-5.

Tarjan, Robert Endre. 1975. Efficiency of a Good But Not Linear Set Union Algorithm. Journal of the ACM 22, Apr. 2, 1975, 215-225.

Robert E. Tarjan and Jan van Leeuwen. 1984. Worst-case Analysis of Set Union Algorithms. Journal of the ACM 31, Mar. 2, 1984, 245-281.

U.S. Appl. No. 14/069,253, filed Oct. 31, 2013, Guy L. Steele Jr.

U.S. Appl. No. 14/069,255, filed Oct. 31, 2013, Guy L. Steele Jr.

Thomas H. Cormen, et al., "Introduction to Algorithms", The MIT Press, 1990, pp. 440-461.

Prentice-Hall Series in Automatic Computation, "A Discipline of Programming", Edsger W. Dijkstra, 1976, pp. 161-167.

Henry S. Warren, Jr., "Hacker's Delight", 2003, pp. 74-75.

U.S. Appl. No. 14/106,476, filed Dec. 13, 2013, David R. Chase.

* cited by examiner

SYSTEMS AND METHODS FOR GENERATING BIT MATRICES FOR HASH FUNCTIONS USING FAST FILTERING

BACKGROUND

Field of the Disclosure

This disclosure relates generally to computing devices that implement lookup tables, and more particularly to systems and methods for determining the suitability of pairs of hash functions for implementation within hardware lookup circuits.

Description of the Related Art

Computer networking devices such as routers, switches, and network interface cards commonly rely on lookup tables in hardware circuitry to quickly access information associated with incoming data packets for purposes such as routing, filtering, or load-balancing. Lookup tables for network applications allow for the fast retrieval of data values associated with a key, where the key is a bit string that can be found in or computed based on data received in incoming packets. Lookup tables can map a set of such keys to a set of addresses in a memory holding data associated with the keys.

Many existing hardware approaches focus on lookup tables that solve the longest-prefix match problem, specifically for IP routing applications. Such approaches typically assume fixed key sizes and a static/fixed set of tables with fixed-size entries, and they typically emphasize high lookup rates over low latency for individual lookups. For example, some traditional hardware implementations of lookup tables include content-addressable memories (CAMs) or, more specifically, ternary content-addressable memories (TCAMs). CAMs are dedicated hardware circuits combining memory locations for key entries with comparator logic such that a given input key can be quickly compared to all key entries stored in the memory in parallel. If an input key is found, the CAM either directly returns data associated with the key or the index of the memory location the matching key is stored in. This index can then be used to access data associated with the key, for example, by using the index as an address into a separate static random access memory (SRAM) or a dynamic random access memory (DRAM).

TCAMs allow key entries to not only use bit values of 0 and 1, but a third, "don't care" value, X. A value of X specifies that the corresponding bit position is not to be compared to the input key, but is to be considered a match. Some applications require that, in case of multiple matches, the entry with the longest sequence of matching, non-X bits starting from the most significant bit, commonly known as the longest-prefix match, to be the entry that is returned. While TCAMs offer low access latencies, their memory capacity is generally lower than the capacities offered by standard SRAMs of equal chip size. This is largely due to the added comparator logic per memory location. Furthermore, the power consumption of TCAMs tends to be high, and the hardware design dictates a maximum key size.

Some more recent hardware implementations of large lookup tables targeted at solving the longest-prefix match problem leverage standard SRAM technology. These implementations often utilize tree-based data structures such as TRIEs (which are also known as digital trees or prefix trees) stored in SRAMs. In some existing implementations, TRIEs map the digits of the keys to nodes in a tree structure such that the lookup of a key is done by traversing the tree from its root to its leaf nodes, such that at every node, the next digit in the input key determines the next-level node until a leaf node is reached. The traversal of the tree for key lookups may require multiple accesses to SRAM memory. For example, for m-bit keys, TRIEs require O(m) memory accesses in the worst case. By using multiple SRAMs and techniques such as pipelining, tree-based implementations can match or exceed the lookup rates offered by TCAMs. On the other hand, approaches that depend on multiple SRAM accesses commonly lead to significantly higher latencies for individual key lookups.

Existing software approaches, including software algorithms for evaluating perfect hash tables, provide more flexibility than existing hardware approaches in terms of the number of tables, key sizes, and data entry sizes. However, these algorithms are typically designed for sequential processing (e.g. as a sequence of processor instructions), and do not lead to efficient, parallel circuit implementations. For example, software techniques for fast lookups commonly include data structures such as hash tables or, more specifically, perfect hash tables. However, existing software algorithms for key lookups typically do not yield practical hardware implementations of lookup tables, as they often require long sequences of steps, sequential integer arithmetic, and/or conditional processing, i.e., properties that do not allow for efficient parallel or pipelined processing in hardware.

An existing FPGA-based lookup circuit applies the techniques of Cuckoo Hashing to look up keys in a table pattern. This circuit uses a two-level table to accommodate variable-length patterns. One form of "universal hashing" that has been described computes a hash function of a bit-string by multiplying the bit string, regarded as a bit vector by a matrix of bits in order to compute a linear transformation of the bit vector. One class of hash functions that has been described relies on combining the results of two or more primary hash functions, with the primary hash functions being regarded as mapping a set of keys into a graph or hypergraph.

An existing algorithm sometimes referred to as the "union-find" algorithm or the "disjoint-set data structure" is an algorithm for creating singleton sets of objects, merging sets, and finding a unique representative for a set. This algorithm maintains a collection of disjoint sets in such a way that at all times every set in the collection is nonempty and every set is represented by a specific one of its members. Three operations are provided for the algorithm: MAKE-SET(x), UNION(x,y), and FIND-SET(x). The operations MAKE-SET and UNION update the collection, while FIND-SET performs a query as to the state of the collection. The operation MAKE-SET takes an object x that is not yet a member of any set in the collection, adds a new singleton set to the collection that contains the object x and no other, and makes the object x the representative of that set. The operation UNION takes two objects, each of which is a member of some set in the collection. If the two objects belong to different sets, then the sets are merged into a single set that replaces the two original sets in the collection, and an element of the new set is chosen to be its representative. The operation FIND-SET takes an object that is a member of some set in the collection, and returns the object that represents that set. The algorithm operates by using "parent" links to organize the objects in each set as a directed graph. The directed graph is similar to a tree except that the root of the tree points to itself as a parent, rather than having no parent link. The representative of a set is the root of the tree, i.e., the only object in the set whose parent pointer points to that object rather than to some other object. The representative of a set can be found by starting from any member of the set and tracing the chain of parent pointers until an object is found whose parent is itself.

SUMMARY

The systems and methods described herein may in some embodiments implement programmable hash tables that provide low-latency access to data stored in memory. More specifically, the systems described herein may include hardware circuitry configured to implement lookup circuits. In various embodiments, these lookup circuits may evaluate hash functions that map a set of keys (e.g., bit strings) to a set of addresses in one or more lookup tables that hold data associated with the keys. As used herein, the terms "hash function evaluation circuit", and "lookup circuit" may be used somewhat interchangeably to refer to such hardware circuitry (or at least a portion thereof). In some embodiments, the hash functions that are implemented in the hardware circuitry may be selected for efficient evaluation in hardware circuitry (e.g., they may be chosen or generated in such away that they can be implemented in hardware with tow latency), and these hash functions may be used to construct the lookup tables. In some embodiments, the hash functions may be pre-computed in software based on a fixed key set and representations of those hash functions may be transferred to hash tables in one or more memories or to other hardware elements within the lookup circuits. The hardware circuitry may be configured to retrieve data associated with a hash of a given key that is presented as an input to the hardware circuitry.

In some embodiments, a lookup circuit may include multiple hash function sub-circuits, each of which applies a respective hash function to an input key value, producing a hash value. In some embodiments, the input key value may be represented by a bit vector. In some such embodiments, to apply a respective hash function to the input key value to produce a respective hash value, each of the hash function sub-circuits may be configured to multiply the input bit vector by a pre-defined sparse bit matrix and to add a pre-defined constant bit vector to the result of the multiplication. The hash value may identify a location in the memory (e.g., an entry in a lookup table) that stores a data value associated with the hash value. The hash value may be useable to access the data value stored in the identified location, and the data value may or may not be associated with the received input key value. In some embodiments, data representing the key associated with each data value may be stored along with its associated data value in the lookup table (e.g., as a key-value pair).

In some embodiments, the systems and methods described herein may be used to identify pairs of hash functions that are suitable for use in lookup circuits, including those that implement bit matrix multiplication with sparse bit matrices, and may reduce the cost of searching for suitable hash functions, when compared to other approaches. In some embodiments, once a pair of candidate hash functions has been identified, the techniques described herein may provide a substantially more efficient test for whether the pair of hash functions is suitable for hashing a given set of keys than existing approaches. For example, the systems described herein may employ fast filtering in order to rapidly test pairs of hash functions to determine whether they are suitable for use in a lookup circuit.

In some embodiments, determining whether two hash functions (each of which is represented by a respective bit matrix and a respective bit vector) are suitable for hashing a particular collection of keys in a lookup circuit includes, for at least one key in the collection of keys: computing a first hash value bit vector by applying one of the two hash functions to the key, computing a second hash value bit vector by applying the other one of the two hash functions to the key and determining whether the first hash value bit vector and the second hash value bit vector belong to the same set. These operations may be applied iteratively to respective keys in the target collection of keys until it is determined that, for one of the keys in the collection, the first hash value bit vector and the second hash value bit vector belong to the same set or it is determined that, for all of the keys in the collection of keys, the first hash value bit vector and the second hash value bit vector belong to different sets, after which data indicating the number of keys that can be successfully handled by the two hash functions may be returned.

In some embodiments, determining whether the first hash value bit vector and the second hash value bit vector belong to the same set may include performing a modified union-find type operation that organizes objects in each set as a directed graph of objects having a root whose parent is itself. In such embodiments, performing the union-find type operation may include finding the root of the directed graph for a set that includes the first hash value bit vector, finding the root of the directed graph for a set that includes the second hash value bit vector, and determining whether the root of the directed graph for the set that includes the first hash value bit vector and the root of the directed graph for the set that includes the second hash value bit vector are the same.

In some embodiments, if the first and second hash value bit vectors computed from a given key do not belong to the same set, the union-find type operation may merge the respective sets to which first hash value bit vector and the second hash value bit vector belong, and to return an indication of success in handling the given key using the two hash functions. However, if the first and second hash value bit vectors computed from a given key do belong to the same set, the union-find type operation may return an indication of a failure to handle the given key using the two hash functions. In some embodiments, the union-find type operation performs a path compression or path shortening operation (which may include a path splitting or path halving operation), but does not perform a rank test. In some embodiments, the union-find type operation performs a limited distance-from-root test and/or determines whether the first and second hash value bit vectors meet pre-defined criteria for exception processing. As described in more detail herein, if the first and second hash value bit vectors meet the pre-defined criteria for exception processing, at least some of the operations that would otherwise be performed as part of the union-find type algorithm may be elided. For example, if each of the hash value bit vectors is the root of a directed graph for a different respective set that includes the hash value bit vector or if one of the hash value bit vectors and a parent or grandparent of the other hash value bit vector are the roots of directed graphs for different respective sets, the hash value bit vectors may be identified as special cases and may be handled outside of the standard processing loops of the union-find type operation.

In some embodiments, once it has been determined that a pair of hash functions is suitable for hashing a given collection of keys in a particular lookup circuit, a representation of each of the two hash functions may be transferred to the lookup circuit. For example, a representation of at least one of the two hash functions may be transferred to a memory in the lookup circuit, to fixed combinatorial logic in the lookup circuit, or to programmable combinatorial logic in the lookup circuit. In some embodiments, for at least one of the two hash functions, the representation of the hash function may include a random bit matrix that meets a pre-defined sparseness constraint.

Figure 1:
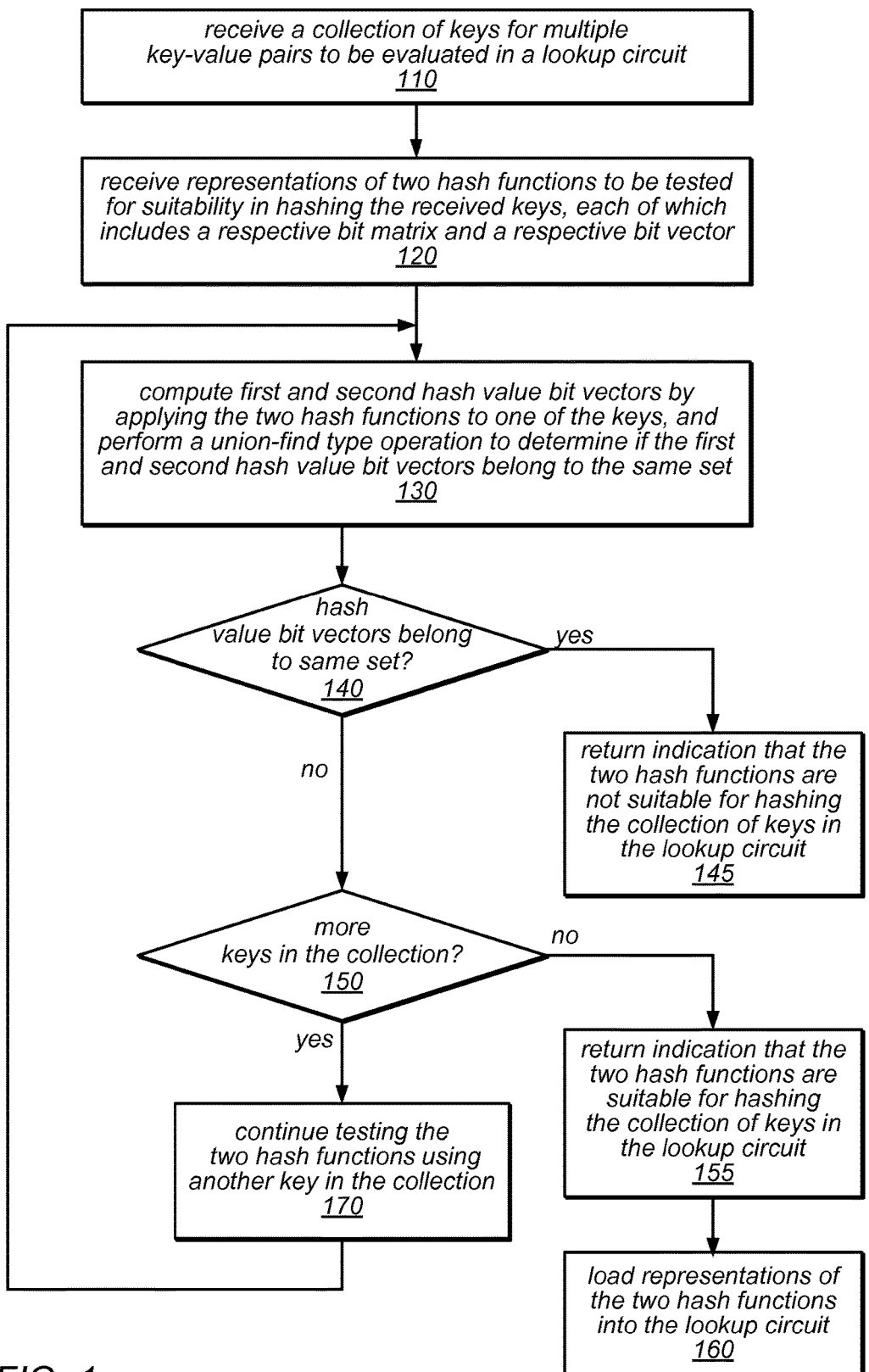
FIG. 1 is a flow diagram illustrating one embodiment of a method for testing a pair of hash functions, each of which is represented as a bit matrix plus a bit vector.

While the disclosure is described herein by way of example for several embodiments and illustrative drawings, those skilled in the art will recognize that the disclosure is not limited to embodiments or drawings described. It should be understood that the drawings and detailed description hereto are not intended to limit the disclosure to the particular form disclosed, but on the contrary, the disclosure is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF EMBODIMENTS

The systems and methods described herein may, in various embodiments, be used to implement configuring hash function circuitry and/or evaluating hash functions for performing table lookup operations using such circuits. More specifically, the systems described herein may utilize hash functions (e.g., perfect hash functions, minimal perfect hash functions or other hash functions) targeted at efficient evaluation in hardware circuitry to construct lookup tables. In some embodiments, the hash functions may be pre-computed in software based on a fixed key set and then transferred into a hardware lookup circuit. The lookup circuit may store a representation of the hash functions in one or more hash tables in memory or in other circuit elements and may be configured to retrieve and return data that is associated with various keys when they are presented to the circuit as inputs. In some embodiments, the lookup circuit may also be configured to verify the validity of a presented key, update data associated with a key, insert new key/value pairs, and/or delete key/value pairs.

The lookup circuits described herein may be implemented in various circuit-level network processing devices including network interface cards, network processors, smart routers/switches, etc., according to different embodiments. For example, in some embodiments, these circuits may be implemented as part of an application-layer network device, such as a network device that is designed for low-latency processing of application messages in hardware. In general, the systems and methods described herein may be employed in a variety of applications that require the fast retrieval of information associated with at least one key per incoming message, in different embodiments.

In some embodiments, the system in which the circuits and techniques described herein are employed may be a user-programmable device. In such embodiments, the hash tables described herein may be generated based on a user-provided program and/or user-provided table data, which may not be known at circuit design time. In some embodiments, the user may define the various hash tables and/or lookup tables (including the valid keys for the table, the data associated with each of the valid keys, the key size, the number of keys supported, the number and/or size of the data words associated with the keys, and/or other parameters of the hash tables and/or lookup tables) in a domain-specific programming language. In other embodiments, the user may define a mapping between valid key values and associated data words (e.g., in a comma-separated values file), and program instructions may be used to determine the key size, the number of keys supported, and the number and/or size of the data words associated with the keys, and to generate a hash function evaluation circuit configuration that implements a hash function (e.g., a minimal perfect hash function or another type of hash function) based on that information (which may include one or more hash tables or other representations of the hash functions, as described herein). In some embodiments, program instructions may be used to generate pairs of hash functions (each or which is represented as a bit matrix plus a bit vector) and to test the suitability of each pair of hash functions for hashing a collection of keys in a lookup circuit.

In some embodiments, the lookup circuits described herein may trade off some amount of flexibility for markedly lower latency, when compared to other approaches. For example, the lookup circuits may support only a single lookup table of fixed size, but may deliver the data associated with an input key (and, in some cases, a validity signal) faster than other lookup circuits. In some embodiments, some of the memories may be able to be updated white the lookup circuit is in operation, while others may not. For example, in some embodiments, flexibility may be provided in the context of a field programmable gate array (FPGA) implementation that operates in conjunction with a software infrastructure capable of reprogramming the FPGA if necessary, when the set of key-value pairs changes. In some embodiments that employ FPGA technology, the hash functions may be programmed through FPGA wiring rather than using tables stored in memory.

In some embodiments, the hardware circuitry may implement hash tables (e.g., hash tables for perfect hash functions, minimal perfect hash functions or other hash functions) by accessing multiple memory locations selected by multiple hash function sub-circuits, where each hash function sub-circuit is configured to multiply an input key, represented as a bit vector, by a sparse bit matrix, and then XOR the result with another bit vector (e.g., a constant bit vector). In some embodiments, the choice to use a sparse bit matrix may allow lookup operations to be implemented in circuitry with reduced access latency. For example, in embodiments in which a hash function sub-circuit multiplies input key bit vectors by a sparse bit matrix in which each row includes at most six 1-bits, a hash function producing an n-bit result may be computed using n FPGA lookup table circuit (LUTs) operating in parallel, with a latency of just one "LUT delay". In some embodiments, a hash function sub-circuit may be implemented using a collection of odd-parity circuits having different numbers of inputs (e.g., various odd-parity-of-6 circuits, odd-parity-of-11 circuits, and/or odd-parity-of-12 circuits).

One common application in which the hash function evaluation circuits and techniques described herein may be employed is the mapping of Internet Protocol (IP) addresses to Ethernet addresses for the purpose of routing IP packets to their destinations across multiple hops in the network. Given short packets and the high bandwidth of network links, in these types of applications, table lookups may need to be executed at a rate high enough to sustain the link rate. For example, a 10 Gb/s Ethernet link may have a maximum packet arrival rate of almost 15 million packets per second at minimum packet size, requiring 15 million table lookups per second to make routing decisions in a timely manner. For some such IP routing applications, the mapping of IP addresses to Ethernet addresses may not only require a determination of whether an IP address is held in the key memory, but whether there exists at least one key entry for which at least some of the bits (e.g., at least some of the most significant bits) matches the input key.

As noted above, existing hardware implementations of lookup tables for routing applications typically focus on high lookup rates, require solving the longest-prefix match problem, and often rely on fixed key and data entry sizes (as given by IP and Ethernet addresses). However, for applications in some computer networking devices, e.g., those examining incoming data packets beyond the network-layer header, lookup tables with different properties may be desirable. In particular, some applications may not require solving the longest-prefix match problem, but may require low, deterministic lookup latencies. In addition, it may be desirable to provide "early access" to associated data by making it available faster than an associated verification signal that indicates whether or not the data is actually valid, that is, associated with the key presented for query.

A hash function H for a set K of m distinct keys, each having r bits, is a mapping function that maps each key $k \in K$ to a p-bit integer $i=H(k)$. If the hash function H always maps distinct keys to distinct integers (that is, $k_1 \neq k_2$ implies that $H(k_1) \neq H(k_2)$), then the mapping is called a perfect hash function (PHF). If furthermore, the unique integers i produced by H for the m distinct keys form a set of consecutive integers, e.g., $0 \leq i \leq m-1$ for all i, the mapping is called a minimal perfect hash function (MPHF).

In some embodiments, given a hash function H for a key set K, the lookup of data associated with a key k may first require the evaluation of H(k) to compute a unique index i. The index i may then be used as an address into a memory holding a d-bit data entry D(k) associated with k. In some embodiments, the systems and methods described herein may be used to implement, in hardware circuitry, hash functions that can be evaluated in constant time for all keys k.

In some embodiments, the lookup circuits described herein may use the results of the application of two or more hash functions on a presented key, computed in parallel by hardware circuits, to probe an equal number of memory locations simultaneously. The contents of the accessed locations may be used to determine whether the lookup table holds data associated with the presented key. If so, the associated data may be delivered. A data-validity signal may also be generated, in some embodiments.

As noted above, in some embodiments, the lookup circuits described herein may include hash functions that perform bit matrix multiplication using sparse bit matrices, as defined by a sparseness constraint. For example, a sparseness constraint may specify a pre-defined upper or lower bound on the number of 1-bits, a pre-defined upper or lower bound on the number of 0-bits, a pre-defined number of 1-bits or 0-bits desired in each row, a constraint on the ratio between the number of 0-bits and the number of 1-bits in each row (e.g., a requirement that there be at least twice as many 0-bits as 1-bits in each row), a constraint on the ratio between the number of 1-bits and the number of 0-bits in each row (e.g., a requirement that there be at least twice as many 1-bits as 0-bits in each row) or another type of constraint on the number of 1-bits and/or the number of 0-bits in each row. In some embodiments, a useful choice (based on the circuit implementation) may be to allow no more than six 1-bits on each row, even for lookup circuits that handle keys having a large number of bits (e.g., 96), as this choice may reduce the hardware latency for computing the hash function and, therefore, may reduce the latency for delivering the data associated with the key.

In some embodiments, the systems and methods described herein may be used to perform suitability testing for candidate pairs of hash functions (e.g., to determine whether a pair of hash functions is suitable for hashing a given collection of keys in a particular lookup circuit). The suitability tests described herein may be used to determine whether a graph induced by the pair of hash functions is (or would be) acyclic. Note that it may not be necessary to construct the entire graph before testing the pair of hash functions for cycles. Instead, it may be sufficient to determine whether the graph, if it were constructed, would include a cycle. In some embodiments, rather than actually constructing such a graph, the system may be configured to construct a simpler data structure, which represents the sets of connected components of the graph. Construction of this data structure may begin with just the nodes of the graph (ignoring all edges) and may include adding edges one at a time until it is determined that adding an edge induces a cycle (in which case the suitability test fails) or until all edges have been added without any cycles being induced (in which case the suitability test succeeds).

More specifically, in some embodiments, each node may include a pointer to another node that is considered its parent or that is considered the root or representative of the set to which it belongs, and the parent pointer of the root of each set may point to itself. In such embodiments, determining whether two nodes belong to the same set may include determining whether they have the same root, which may include following the parent pointers in the chains from each of the nodes to its root. Initially, each node may be considered to be its own connected component (i.e., it is a single node that is not connected to anything else), and its parent pointer may point to itself as the representative of its set. In other words, construction may begin with a collection of multiple sets, each of which includes a single node. When adding edges, if it is determined that the same node is on both ends of an edge, there is no work to be done for that edge. In embodiments in which loops are allowed, the construction continues. However, in embodiments in which loops are not allowed, the suitability test may fail at that point, and the pair of hash functions being tested would be considered unsuitable for hashing the target collection of keys. In general, when an edge that connects two different nodes is added, there may be two different cases:

1) The two nodes are not yet known to belong to the same connected component. In this case, adding this edge will not produce a cycle, so those two connected components may be merged to create a single new connected component and construction may continue. As described in more detail herein, merging the connected components may include updating the parent pointer in at least one of the nodes (e.g., updating the parent pointer in the root of the set that includes one of the connected components so that it points to the root in the set that includes the other connected component). In some embodiments, the parent pointers in more than one node in either or both sets may be updated to point to the same root, which may improve the speed of future suitability testing operations involving the new connected component.

2) The two nodes at either end of the edge are already known to belong to the same connected component. In this case, introducing this edge will introduce a cycle (according to graph theory). Therefore, construction may be aborted and an indication that the suitability test failed may be returned.

As described in more detail herein, the systems and method described herein for testing the suitability of hash functions may exploit several mathematical observations. For example, a pair of hash functions and a set of keys may be used to derive a related mathematical graph with undirected edges such that the graph includes a node for every possible hash value, and includes one edge for each key, where the edge for a key connects the two nodes (which in some cases may be the same node) identified by the two hash values obtained by applying the two hash functions in the pair of hash functions to the key. In addition, when an edge is added to an acyclic graph to connect two nodes, the derived graph is acyclic if and only if the two nodes did not belong to the same connected component. Furthermore, if such a derived graph is acyclic, then the pair of hash functions is suitable for hashing the set of keys because there exists a simple technique for deriving the contents for the memories of a lookup circuit (such as those described herein and/or others) from the mathematical graph. Finally, there is a one-to-one correspondence between the connected components of the graph and the sets of nodes in those components. As previously noted and as described in more detail herein, in some embodiments, the systems described herein may be configured to determine whether the graph derived from a pair of hash functions and a set of keys is (or would be) acyclic without actually constructing a complete representation of the graph.

As previously noted, an existing algorithm sometimes referred to as the "union-find" algorithm or the "disjoint-set data structure" is an algorithm for creating singleton sets of objects, merging sets, and finding a unique representative for a set. This algorithm maintains a collection of disjoint sets in such a way that at all times every set in the collection is nonempty and every set is represented by a specific one of its members. Three operations are provided for the algorithm: MAKE-SET(x), UNION(x,y), and FIND-SET(x). The operations MAKE-SET and UNION update the collection, while FIND-SET performs a query as to the state of the collection. The operation MAKE-SET takes an object x that is not yet a member of any set in the collection, adds a new singleton set to the collection that contains the object x and no other, and makes the object x the representative of that set. The operation UNION takes two objects, each of which is a member of some set in the collection. If the two objects belong to different sets, then the sets are merged into a single set that replaces the two original sets in the collection, and an element of the new set is chosen to be its representative. The operation FIND-SET takes an object that is a member of some set in the collection, and returns the object that represents that set. The algorithm operates by using "parent" links to organize the objects in each set as a directed graph. The directed graph is similar to a tree except that the root of the tree points to itself as a parent, rather than having no parent link. The representative of a set is the root of the tree, i.e., the only object in the set whose parent pointer points to that object rather than some other object. The representative of a set (sometimes referred to herein as the root of the set) can be found by starting from any member of the set and tracing the chain of parent pointers until an object is found whose parent is itself.

The union-find algorithm is actually a class of four algorithms, in that there are two binary choices provided by the algorithm as to whether or not to use an "efficiency-enhanced" version of the algorithm. For simplicity, it is useful to define the behavior of UNION operation in terms of an auxiliary operation LINK, as follows:

```
UNION(x, y)
1    LINK(FIND-SET(x), FIND-SET(y))
```

The first binary choice to be made involves whether or not to use a "rank test" as part of the LINK operation. If not, then the MAKE-SET and LINK operations are defined as follows:

```
MAKE-SET(x)
1    parent[x] ← x
LINK(x, y)
1    parent[x] ← y
```

However, if the rank test is to be used, then the MAKE-SET and LINK operations are instead defined as follows:

```
MAKE-SET(x)
1         parent[x] ← x
2         rank[x] ← 0
LINK(x, y)
1         if rank[x] > rank[y]
```

|   |   |
|---|---|
| 2 | then parent[y] ← x |
| 3 | else |
| 4 | parent[x] ← y |
| 5 | if rank[x] = rank[y] and x ≠ y |
| 6 | then rank[y] ← rank[y] + 1 |

In this case, the "rank" stored in the representative object for a set is an approximation of (in fact, an upper bound for) the height of the tree. Here, the rank test arranges to merge two trees in order to keep the rank as small as possible, given the local nature of the sub-operations (which are applied only to the roots of the trees), in hopes that this will minimize the height of the new tree and, therefore, make future FIND-SET operations more efficient.

The second binary choice to be made involves whether or not to perform path compression as part of the FIND-SET operation. If not, then the FIND-SET operation is defined as follows:

|   |   |
|---|---|
| FIND-SET(x) | |
| 1 | if parent[x] ≠ x |
| 2 | then return FIND-SET(parent[x]) |
| 3 | else return x |

However, if path compression is to be performed, then the FIND-SET operation is instead defined as follows:

|   |   |
|---|---|
| FIND-SET(x) | |
| 1 | if parent[x] ≠ x |
| 2 | then parent[x] ← FIND-SET(parent[x]) |
| 3 | return parent[x] |

In this case, the FIND-SET operation, while abstractly purely a query operation, actually updates parent pointers so that later FIND-SET operations may be able to locate a representative more quickly. Path compression does not alter which sets are in the collection. Instead, it only alters the tree representation in hopes of gaining efficiency for future operations.

FIND-SET is typically, but not always, defined recursively. Note that the definition of FIND-SET above is a recursive procedure that effectively makes two passes over the path (one as the recursion proceeds "downward" and another as the recursive calls return "upward") and it is during the second pass that parent pointers are updated.

UNION is defined in terms of FIND-SET, so that if FIND-SET performs path compression, then such path compression occurs not only when FIND-SET is called, but also when UNION is called.

It has been proven that when both the rank test and path compression are used, then under certain conditions the algorithm has a tower algorithmic complexity than if only one, or neither, is used. Note that in an alternative to the UNION operation called a "contingent UNION", if two elements are in the same set, the operation fails (e.g., returns false). Otherwise the sets containing the two element are merged into a single set and the operation succeeds (e.g., returns true). In another alternate version of the union-find algorithm, path compression in the FIND-SET operation is replaced by a path "splitting" operation, as illustrated below:

|   |   |
|---|---|
| FIND-SET(x) | |
| 1 | local v ← e |
| 2 | while parent[parent[v]] ≠ parent[v] do |
| 3 | local q ← parent[v] |
| 4 | parent[v] ← parent[q] |
| 5 | v ← q |
| 6 | return parent[v] |

In yet another alternate version of the union-find algorithm, path compression in the FIND-SET operation is replaced by a path "halving" operation, as illustrated below:

|   |   |
|---|---|
| FIND-SET(x) | |
| 1 | local v ← e |
| 2 | while parent[parent[v]] ≠ parent[v] do |
| 3 | parent[v] ← parent[parent[v]] |
| 4 | v ← parent[v] |
| 5 | return parent[v] |

Each of these techniques shortens paths in the tree, less so than by path compression, but with the advantage of making only one pass over the path rather than two. One existing approach for implementing a "contingent UNION" operation makes two calls to FIND-SET, while others employ a technique known as "splicing". A technique for in-lining the two calls to FIND-SET into the code of UNION allows the new root for the result to be chosen before path compression is performed, thus allowing the path compression steps to make all nodes on both paths point to the new root.

In some embodiments, the systems described herein may use a modified union-find type operation to reduce the cost of identifying hash functions that are suitable for use with a specific collection of keys. As noted above, in some embodiments, this suitability testing may include determining whether the graph derived from a pair of hash functions and a set of keys is (or would be) acyclic without actually constructing a complete representation of the graph. Instead, the system may maintain only a set of nodes for each connected component, and may employ a modified union-find type operation to merge the sets as keys are processed. This approach may allow unsuitable pairs of hash functions to be rejected much more quickly than if complete graph representations were constructed and then tested for acyclicity.

One embodiment of a method for testing a pair of hash functions, each of which is represented as a bit matrix plus a bit vector, is illustrated by the flow diagram in FIG. 1. As illustrated at 110, in this example, the method may include receiving a collection of keys for multiple key-value pairs to be evaluated in a lookup circuit. The method may also include receiving representations of two hash functions to be tested for suitability in hashing the received keys, each of which includes a respective bit matrix and a respective bit vector (as in 120). In response to receiving these inputs, the method may include computing a first hash value bit vector and a second hash value bit vector by applying the two hash functions to one of the keys, and performing a union-find type operation to determine whether the first and second hash value bit vectors belong to the same set, as in 130.

In this example, if the first and second hash value bit vectors belong to the same set (shown as the positive exit from 140), the method may include returning an indication that the two hash functions are not suitable for hashing the collection of keys in the lookup circuit (i.e., an indication that the suitability test has failed), as in 145. However, if the first and second hash value bit vectors do not belong to same set (shown as the negative exit from 140), and there are more keys in the collection of keys against which the pair of hash functions is being tested (shown as the positive exit from 150), the method may include continuing to test the two hash functions using another key in the collection of keys (as in 170).

As illustrated in this example, the method may include repeating the operations in 130-150 until it is determined that for one of the keys in the collection, the first hash value bit vector and the second hash value bit vector belong to the same set, or it is determined that for all of the keys in the collection of keys, the first hash value bit vector and the second hash value bit vector belong to different sets. This is illustrated in FIG. 1 by the feedback from 170 to 130. When and if there are no more keys in the collection of keys against which the pair of hash functions is being tested (i.e., if the pair of hash functions has been tested against all keys in the collection without failing), the method may include returning an indication that the two hash functions are suitable for hashing the collection of keys in the lookup circuit. This is illustrated in FIG. 1 by the path from the negative exit of 150 to 155. In some embodiments, once a suitable pair of hash functions has been identified, the method may include loading representations of the two hash functions into the lookup circuit, as in 160.

In some embodiments, the computation for looking up a key k using a perfect hash function i.e., the computation to evaluate H(k), may be split into two steps. In the first step, two primary hash functions F1 and F2 may be evaluated for the key k, resulting in two values F1(k) and F2(k) of p bits each. In the second step, a secondary hash function G may be evaluated for the values F1(k) and F2(k), such that H(k)=G(F1(k), F2(k)). Even if the primary hash functions F1 and F2 are not perfect, the overall hash function H may be perfect if F1, F2, and G are chosen correctly. Such methods are sometimes generalized to use more than two primary hash functions; for example, three hash functions F1, F2, and F3 may be used, along with a secondary combining function of three arguments, so that H(k)=G(F1(k),F2(k),F3(k)). Several such methods are found in the literature. To compute primary hash functions F1 and F2, one of these existing algorithms reties on the conditional summation of random integers modulo a chosen integer t. However, the computation of a modular sum of integers may be undesirable for implementation in hardware as it requires integer adders with early chains and multiple conditional subtractions to compute a result in the range of 0 . . . t–1.

As noted above, an existing lookup circuit that is based on field programmable gate arrays, or FPGAs, uses the techniques of Cuckoo Hashing to look up keys in a table pattern uses a two-level table to accommodate variable-length patterns. In some embodiments, the lookup circuits described herein may use keys of fixed length and a single level of table lookup, which may reduce lookup latency when compared to existing techniques. In some such embodiments, some or all of the data associated with a given key may be made available after only a single level of table lookup. In various embodiments, the lookup techniques described herein may differ from existing Cuckoo Hashing techniques in several other respects. For example, the existing FGPA-based circuit referenced above computes hash values sequentially, such that a lookup operation includes computing one hash function first, probing a table in memory, and making a decision about the results of that hash function before computing another hash function. In contrast, the lookup circuits described herein may compute multiple hash values in parallel (e.g., substantially concurrently).

In various embodiments, the lookup circuits described herein may implement hash functions that need not be minimal perfect hash functions or even perfect hash functions. However, for hardware implementation, it may be desirable to choose hash functions that can be evaluated in constant time for all keys k. Therefore, in some embodiments, the lookup circuits described herein may implement two or more hash functions, each requiring roughly the same fixed amount of time to compute, which may allow them to be computed substantially simultaneously in hardware. When a key is presented to the lookup circuit, each of the hash functions may be applied to the key. In some embodiments, the resulting p-bit hash values may be used as memory addresses in order to access key-value pairs stored in one or more memories. In some such embodiments, at most one key-value pair stored in the memories of the circuit may be identified as matching a presented key, and the associated data in that key-value pair may be selected for output the data associated with the presented key may be delivered or otherwise provided as an output of the lookup circuit as a result of the lookup operation). Note that in some embodiments, the outputs of two or more hash functions may be the same for a particular key, in which case they would identify the same (single) location in memory at which data associated with the particular key is stored.

Figure 2:
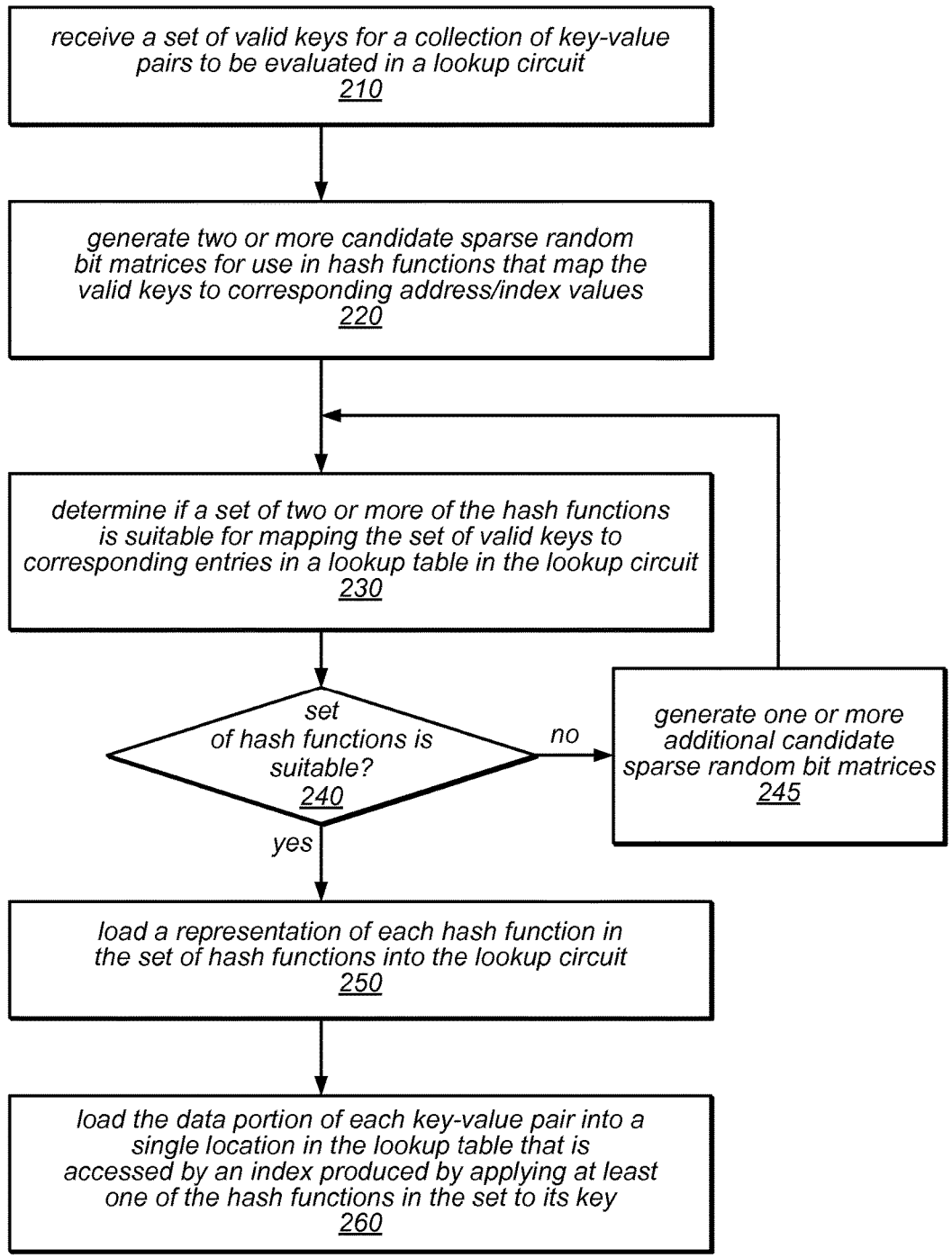
FIG. 2 is a flow diagram illustrating one embodiment of a method for loading a lookup circuit with a set of hash functions.

One embodiment of a method for loading a lookup circuit with a set of hash functions (e.g., a fixed number of hash functions corresponding to the number of hash function sub-circuits in the lookup circuit) is illustrated by the flow diagram in FIG. 2. As illustrated in this example, the method may include receiving a set of valid keys for a collection of key-value pairs to be evaluated in a lookup circuit, as in 210. The method may include generating two or more sparse random bit matrices for use in hash functions that map the valid keys to corresponding address/index values, as in 220.

The method may also include determining if a set of two or more of the hash functions is suitable for mapping the set of valid keys to corresponding entries in a lookup table in the lookup circuit, as in 230. For example, if the lookup circuit includes two hash function sub-circuits, the method may include determining whether a pair of hash function is suitable for use in the circuit, while if the lookup circuit includes three hash function sub-circuits the method may include determining whether a triplet of hash functions is suitable for use in the circuit. Note that in different embodiments, the criteria used to determine whether the set of generated hash functions is suitable may vary dependent on the particular circuitry of the lookup circuit, various characteristics of the set valid keys or of the collection of key-value pairs, and/or the nature of the application in which the lookup circuit is employed. For example, in some embodiments, suitability may be determined based on whether a graph of the set of hash functions (e.g., a pair of hash functions acyclic, on whether the set of hash functions is able to handle (e.g., evaluate) the set of key-value pairs for all valid keys (e.g., to produce exactly one unique address/index value for each valid key among the hash functions in the set), or on other suitability criteria.

As illustrated in this example, if it is determined that the set of hash functions is not suitable for use in the lookup circuit (shown as the negative exit from 240), the method may include generating one or more additional candidate sparse random bit matrices to be tested as part of a set of hash function bit matrices (e.g., as part of a pair or triplet of bit matrices, depending on the number of hash function sub-circuits in the lookup circuit), as in 245. For example, in some embodiments, after one pair of hash functions has been tested and determined not to be suitable, the method may include generating candidate sparse random bit matrices for use in another pair of hash function and testing it for suitability. However, if it is determined that the set of hash functions is suitable for use in the lookup circuit (or once a suitable set of hash functions has been identified), the method may include loading a representation of each of the hash functions in the set of identified set of hash functions into the lookup circuit (e.g., loading a representation of each of the hash functions into a respective hash function sub-circuit). This is illustrated in FIG. 2 by the positive exit from 240 and 250.

As illustrated in this example, in some embodiments, the method may also include loading the data portion of each key-value pair into a single location in the lookup table that is accessed by an index produced by applying at least one of the hash functions in the set to its key, as in 260. For example, the method may include loading data for the key-value pairs into one or more lookup tables in one or more memories within the lookup circuit, in various embodiments.

In some embodiments of the systems described herein, each of the hash functions implemented in the lookup circuit may be defined through the multiplication of a respective bit matrix A of dimensions p×r by a key k that is represented as a bit vector $k=(k_0, \ldots, k_{r-1})$ of length r, followed by an addition of a respective bit vector, $y=(y_0, \ldots, y_{p-1})$, of length p. In some embodiments, the addition may be performed modulo 2. In one such embodiment, the mathematical formula for the computation of a function H, where H may be one of two or more hash functions implemented in a lookup circuit, may be represented by Equation 1, shown below:

$$H(k) = A * k + y \quad \text{Eqn. 1}$$

$$= \begin{pmatrix} a_{0,0} & \cdots & a_{0,r-1} \\ \vdots & \ddots & \vdots \\ a_{p-1,0} & \cdots & a_{p-1,r-1} \end{pmatrix} \begin{pmatrix} k_0 \\ \vdots \\ k_{r-1} \end{pmatrix} + \begin{pmatrix} y_0 \\ \vdots \\ y_{p-1} \end{pmatrix}$$

$$= \begin{pmatrix} a_{0,0}k_0 +_2 & a_{0,1}k_1 +_2 & \cdots & a_{0,r-1}k_{r-1} +_2 & y_0 \\ \vdots & \vdots & \ddots & \vdots & \vdots \\ a_{p-1,0}k_0 +_2 & a_{p-1,1}k_1 +_2 & \cdots & a_{p-1,r-1}k_{r-1} +_2 & y_{p-1} \end{pmatrix}$$

$$= \begin{pmatrix} h_0(k) \\ \vdots \\ h_{p-1}(k) \end{pmatrix}$$

In this example, the operator "$+_2$" represents modulo 2 addition, and the following are assumed:

$a_{i,j} \in \{0,1\}$ $k_i \in \{0,1\}$ $y_i \in \{0,1\}$ $h_i(k) \in \{0,1\}$

In some embodiments, the p×r bit matrix A may be generated and/or chosen such that it is a sparse bit matrix, which may allow the hash function it represents to be implemented using circuitry with low latency. For example, in one such matrix, each row of the matrix may include at least twice as many 0-bits as 1-bits, or may be limited to a pre-defined upper bound on the number of 1-bits, in different embodiments.

Figure 3:
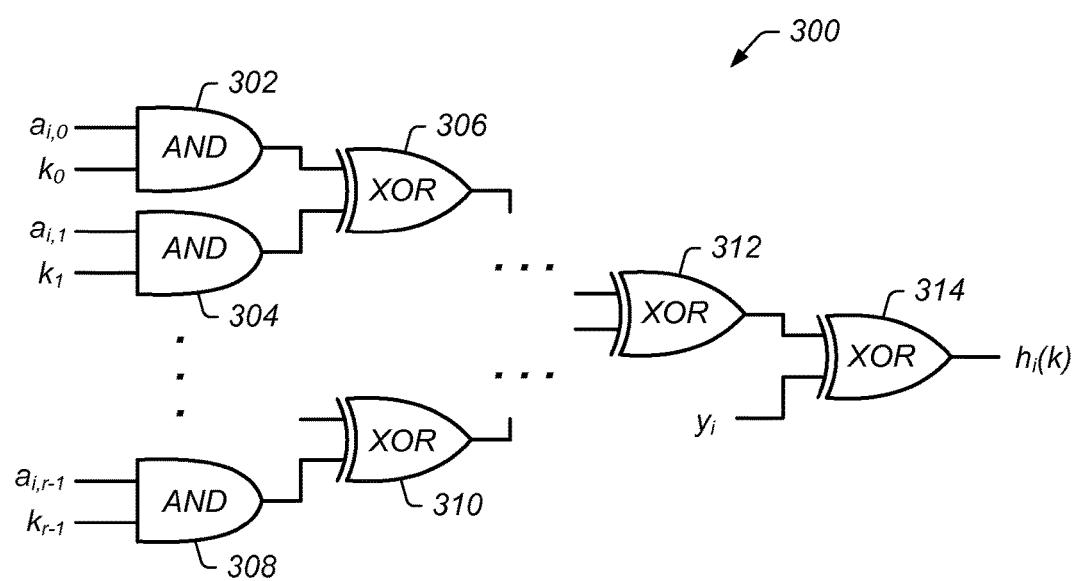
FIG. 3 is a block diagram illustrating a hardware circuit comprising AND gates and XOR gates that is configured to compute one bit of a hash function, according to one embodiment.

In some embodiments, the multiplication of two bits may be efficiently computed in hardware with an AND gate and the sum of two single-bit addends modulo 2 may be efficiently computed with an XOR gate. Hence, the sum of r single-bit addends modulo 2 may be computed with r−1 XOR gates. One such implementation is illustrated in FIG. 3, according to one embodiment. Specifically, FIG. 3 illustrates a hardware circuit 300 that includes multiple AND gates (including AND gates 302, 304, and 308) and a tree of XOR gates (including XOR gates 306, 310, 312, and 314) that are configured to compute one bit of H(k), as described above. In this example, the hardware circuit 300 is configured to compute bit $h_i(k)$ from the illustrated inputs (e.g., $a_{i,0}$ through $a_{i,r-1}$, and $k_0$ through $k_{r-1}$). To compute all p bits of function H, p parallel circuits similar to circuit 300 shown in FIG. 3 would be needed.

In general, with each of the lookup circuits described herein, a key is presented to an input of the circuit, and data associated with the key is provided at an output of the circuit. In some embodiments, an additional output signal may indicate whether or not the data provided at the output is valid. For some applications, it may be desirable for a lookup circuit not to be purely combinatorial, but to have alterable state. More specifically, it may be desirable for the lookup circuit to provide means for updating the set of key-value pairs in the lookup table. As described in more detail below, in some embodiments, the lookup circuit may implement additional inputs (e.g., a write signal and key/data input data) and may implement a mechanism to update the contents of the lookup circuit based on those inputs (e.g., to allow state information about hashing functions and key-value pairs to be updated). For example, when a write signal is asserted, this may indicate that the information presented to a key/data input should be stored in the memory of the lookup circuit.

Figure 4:
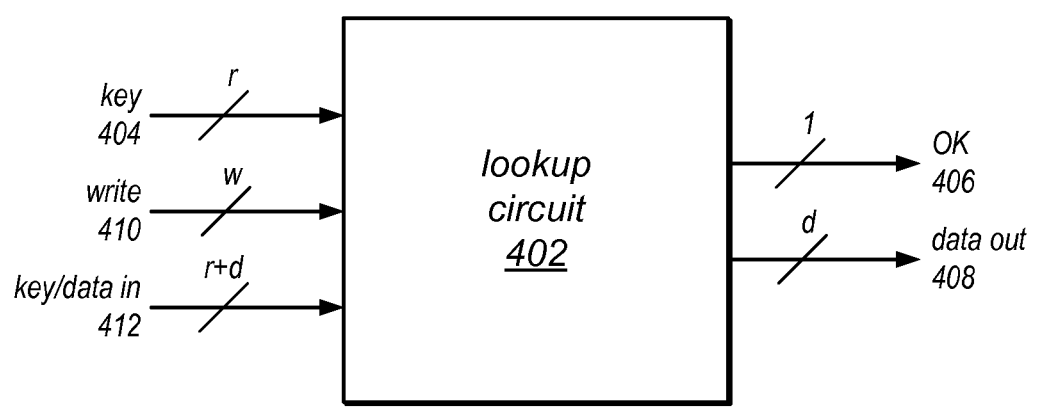
FIG. 4 is a block diagram illustrating an abstract representation of a combinatorial lookup circuit, according to one embodiment.

FIG. 4 is a block diagram illustrating an abstract representation of a combinatorial lookup circuit, according to one embodiment. In this example, lookup circuit 402 is configured to accept as an input a key 404 (in this case, a bit string of length r) and to produce two outputs, namely a single-bit validity signal 406 ("OK") that indicates whether a lookup table with lookup circuit 402 contains a key-value pair whose key is equal to the input key 404), and d bits of associated data 408. In this example, if the validity signal 406 is true, then the associated data 408 is equal to the value in the key-value pair whose key was found to match the input key 404. However, if the validity signal 406 is false, then the associated data 408 may be any bit pattern (i.e., the data 408 may not be associated with the input key 404). In this example, the lookup circuit 402 also accepts two additional inputs, namely a set of w write signals 410 (where w may be 1 or more than 1), and (r+d) bits of key/data information 412. At a clock transition or other specific time, the key/data information 412 may be used to update the lookup table in a manner controlled by the write signals 410. Note that in other embodiments, the contents of the lookup table may be fixed (thus, the lookup circuit may not include these additional inputs) and/or the lookup circuit may not output validity signal (e.g., in embodiments in which all input keys are known to be mapped to valid key-value pairs in the lookup circuit).

Figure 5:
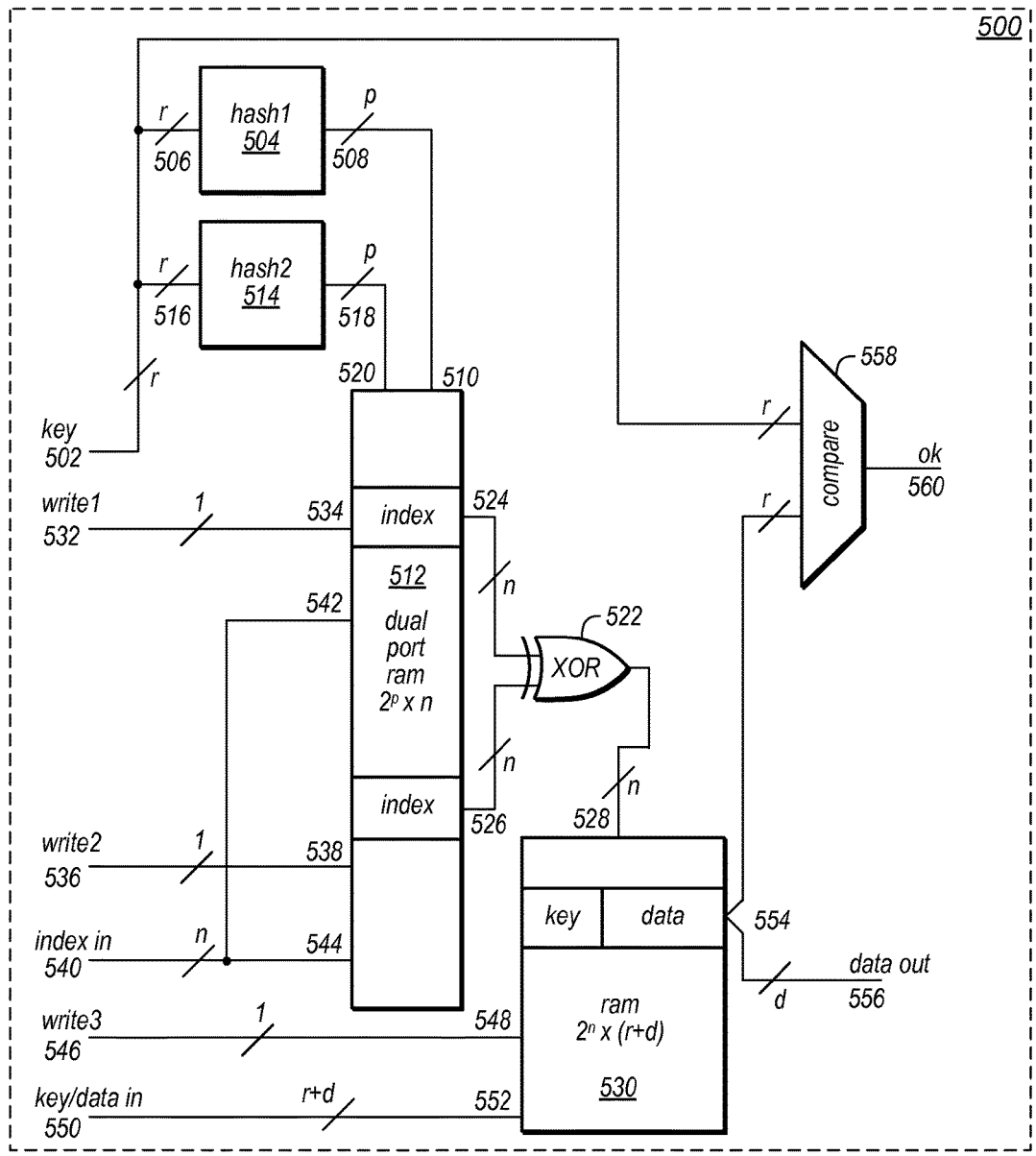
FIG. 5 is a block diagram illustrating a lookup circuit that accepts inputs and produces outputs similar to those accepted and produced by the abstract lookup circuit illustrated in FIG. 4, according to one embodiment.

FIG. 5 is a block diagram illustrating a lookup circuit that is configured to accept inputs and to produce outputs that are similar to those accepted and produced by the abstract circuit 402 shown in FIG. 4, according to one embodiment. In this example, lookup circuit 500 is configured to accept as an input a key 502 (a bit string of length r), corresponding to the input key 404 of FIG. 4. The lookup circuit 500 is also configured to accept a first single-bit write signal 532 and a second single-bit write signal 536, which together may correspond to the write signals 410 of FIG. 4 (with w=2). In this example, lookup circuit 500 is also configured to accept r+d bits of key/data input information 550, corresponding to the key/data inputs 412 of FIG. 4, and an n-bit index input signal 540.

The lookup circuit 500 includes a first primary hash function sub-circuit 504 that is configured to accept the key 502 at an input port 506 and to produce a p-bit output that is connected to a first address input 510 of a dual-ported RAM 512. In this example, the first address input 510 of the dual-ported RAM 512 is at least p bits wide. In some embodiments, the first primary hash function sub-circuit 504 may be configured to implement the functionality of a primary hash function F1. In some embodiments, the first primary hash function sub-circuit 504 may be implemented as p copies of the circuit shown in FIG. 3, using a bit matrix A1 and a bit vector y1. In this example, the lookup circuit 500 also includes a second primary hash function sub-circuit 514 that is configured to receive the key 502 at an input port 516 and to produce a p-bit output 518 that is connected to a second address input 520 of the dual-ported RAM 512. In this example, the second address input 520 of the dual-ported RAM 512 is at least p bits wide. In some embodiments, the second primary hash function sub-circuit 504 may be configured to implement the functionality of a primary hash function F2. In some embodiments, the second primary hash function sub-circuit 514 may be implemented as p copies of the circuit shown in FIG. 3, using a bit matrix A2 and a bit vector y2, where A2 may be the same as A1 or may be different from A1, and y2 may be the same as y1 or my be different from y1. As described in more detail herein, in some embodiments, one or both of the p×r bit matrices A1 and A2 may be generated and/or chosen such that they are sparse bit matrices, which may allow the hash functions they represent to be implemented using circuitry with low latency. For example, in each of these matrices, each row of the matrix may include at least twice as many 0-bits as 1-bits, or may be limited to a pre-defined upper bound on the number of 1-bits, in different embodiments.

In this example, dual-ported RAM 512 contains at least $2^p$ words of memory, where each word holds at least n bits. In some embodiments, the dual-ported RAM 512 may be configured to operate, at a clock transition or other specific time, to read a memory word from an address selected by the p-bit bit string presented at the first address input 510, and to present n bits of data from that memory word to the first read-data output port 524. In this example, the dual-ported RAM 514 also includes a second read-data output port 526, and the dual-ported RAM may be configured to operate, at a clock transition or other specific time, to read a memory word from an address selected by the p-bit bit string presented at the second address input 520 and to present n bits of data from that memory word to the second read-data output port 526.

In the example illustrated FIG. 5, the lookup circuit 500 includes n two-input XOR gates 522 (conventionally depicted by a single XOR-gate symbol with inputs labeled as having n bits each). In some embodiments, each of the n XOR gates includes two inputs that are connected (respectively) to corresponding bits of the first read-data output port 524 of the dual-ported RAM 512 and to corresponding bits of the second read-data output port 526 of the dual-ported RAM 512. The XOR gates 522 and the dual-ported RAM 512 may collectively be configured to implement the functionality of a specific secondary function G, namely the bitwise exclusive OR of the two n-bit strings obtained from the dual-ported RAM 512 by using the two p-bit bit strings presented (respectively) to the first address input 510 and the second address input 520 as addresses.

In an alternate embodiment of lookup circuit 500, the XOR gates 522 may be replaced by n two-input XNOR gates, also known as "equivalence" or "bi-conditional" gates, each of which produces the result "1" when its two input bits are the same, and the result "0" when its two input bits are different. In another alternate embodiment of lookup circuit 500, the XOR gates 522 may be replaced by an addition circuit that is configured to accept two n-bit inputs that are regarded as integers and to produce an n-bit output representing the sum of the inputs. In yet another alternate embodiment of lookup circuit 500, the XOR gates 522 may be replaced by a subtraction circuit that is configured to accept two n-bit inputs that are regarded as integers and to produce an n-bit output representing the difference of the inputs. In still other embodiments, the XOR gates 522 may be replaced by other circuits that are configured combine two n-bit inputs in any of a variety of ways that will allow the lookup circuit 500 to operate in a manner similar to that described herein.

In the lookup circuit 500, the n output bits of the XOR gates 522 are connected to an address input 528 of a single-ported RAM 530. In this example, the address input 528 of the single-ported RAM 530 is at least n bits wide. In this example, the single-ported RAM 530 contains at least z words of memory, each of which includes holds at least r+d bits. In some embodiments, z may be equal to $2^n$. In other embodiments, z may be smaller than $2^n$, and external circuitry, which may be under software control, may be configured to ensure that every bit string presented to address input 528 is a valid address that identifies a memory address within single-ported RAM 530. For example, in some embodiments, z may be equal to $3 \times 2^{n-2}$, and external circuitry, which may be under software control, may be configured to ensure that the two highest-order bits of every n-bit address presented to address input 528 are never both 1-bits. In still other embodiments, z may be larger than $2^n$, the XOR gates 522 may be replaced with a circuit that is configured to accept two n-bit inputs and to produce w output bits (where w is larger than n), and the address input 528 of single-ported RAM 530 may be at least w bits wide rather than at least n bits wide. In another embodiment, the XOR gates 522 may be replaced by a programmable circuit that is configured to select one of at least two different functions for combining two n-bit bit strings to produce a bit string to be presented to the address input 528.

In lookup circuit 500, the first write signal 532 is connected to a first write-enable input 534 of the dual-ported RAM 512, and the second write signal 536 is connected to a second write-enable input 538 of the dual-ported RAM 512. As noted above, the lookup circuit 500 includes an n-bit index input signal 540 that is connected to each of a first write-data input port 542 of the dual-ported RAM 512 and a second write-data input port 544 of the dual-ported RAM 512. The dual-ported RAM 512 may be configured to operate, at a clock transition or other specific time, to accept data from the first write-data input port 542 and to write that data into a memory word at an address selected by the p-bit bit string presented at the first address input 510 of the dual-ported RAM 512, provided that the first write enable input 542 of the dual-ported RAM 512 is true. However, if the first write-enable input 542 of the dual-ported RAM 512 is false, then the data from the first write-data input port 542 of the dual-ported RAM 512 will not be written to the memory. Similarly, the dual-ported RAM 512 may be configured to operate, at a clock transition or other specific time, to accept data from the second write-data input port 544 and to write that data into a memory word at an address selected by the p-bit bit string presented at the second address input 520 of the dual-ported RAM 512, provided that the second write enable input 544 of the dual-ported RAM 512 is true. However, if the second write-enable input 544 of the dual-ported RAM 512 is false, then the data from the second write-data input port 544 of the dual-ported RAM 512 will not be written to the memory. In some embodiments, the lookup circuit 500 may be operated in a manner such that the first write signal 532 and the second write signal 536 are never both true at the same time.

In the example illustrated in FIG. 5, the lookup circuit 500 includes a third single-bit write signal 546 that is connected to a write-enable input 548 of the single-ported RAM 530. As noted above, the lookup circuit 500 includes r+d bits of key/data input information 550 that is connected to a write-data input port 552 of the single-ported RAM 530. The single-ported RAM 530 may be configured to operate, at a clock transition or other specific time, to accept data from the write-data input port 552 and to write that data into a memory word at an address selected by the n-bit bit string presented at the address input 528 of the single-ported RAM 530, provided that the write enable input 548 of the single-ported RAM 530 is true. However, if the write-enable input 548 of the single-ported. RAM 530 is false, then the data from the write-data input port 552 of the dual-ported RAM 530 will not be written to the memory.

In this example, the single-ported RAM 530 may also be configured to operate, at a clock transition or other specific time, to read a memory word from an address selected by the n-bit bit string presented at the first address input 510, and to present r+d bits of data from that memory word to a read-data output port 554 of the single-ported RAM 530. From the read-data output port 554 of the single-ported RAM 530, the rightmost d bits are connected to a d-bit associated data output 556 of the lookup circuit 500.

In the example illustrated in FIG. 5, the lookup circuit 500 includes an r-bit comparator 558 that includes a first input port connected to the key input 502 and a second input port connected to the leftmost r bits of the read-data output port 554 of the single-ported RAM 530. In this example, comparator 558 may be configured to produce a single-bit output signal indicating whether its two input ports have matching data, and the single-bit output signal of the comparator 558 is connected to the validity signal 560 of the lookup circuit 500. In some embodiments, the comparator 558 may be configured to produce true for the validity signal if and only if, the read-data output port 554 is presenting r+d bits of data of which the leftmost r bits match the input key 502.

In some embodiments, the comparator 558 may be configured to compare two keys and to deliver a true signal if and only if the bit strings presented to its two input ports match exactly. In an alternate embodiment, the comparator 558 may be configured to deliver a true signal if and only if the bit strings presented to its two input ports match according to some other criterion, such as whether the bit strings represent character sequences that match if distinctions of alphabetic case (such as uppercase versus lowercase) are ignored. It will be appreciated that the use of other comparators that employ other matching criteria is also possible and falls within the spirit and scope of this disclosure.

In some embodiments, external circuitry, which may be under software control, may be configured to alter the secondary combining, function G by writing new index information to one or more memory locations in the dual-ported RAM 512 by presenting the key to key input 502, presenting index data to index input 540, and presenting a true signal to the first write signal 532. In such embodiments, in response to receiving these inputs, the lookup circuit 500 may be configured to operate, at a clock transition or other specific time, to write the index data presented to the index input 540 to a memory location determined by the first primary hash function sub-circuit 504 from the key 502. Similarly, external circuitry, which may be under software control, may also be configured to write a specific key-value pair to another (possibly different) memory location in the dual-ported RAM 512 by presenting the key to key input 502, presenting index data to index input 540, and presenting a true signal to the second write signal 536. In response to receiving these inputs, the lookup circuit 500 may be configured to operate, at a clock transition or other specific time, to write the index data presented to the index input 540 to a memory location determined by the second primary hash function sub-circuit 514 from the key 502.

In some embodiments, external circuitry, which may be under software control, may be configured to write a specific key-value pair to a memory location in the single-ported RAM 530 by presenting the key to key input 502, presenting the key and value together to key/data input 550, and presenting a true signal to the third write-enable input 546. In response to receiving these inputs, the lookup circuit 500 may be configured to operate, at a clock transition or other specific time, to write the key-value pair presented to the key-data input 550 to a memory location determined by the first primary hash function sub-circuit 504, the second primary hash function sub-circuit 514, the dual-ported RAM 512, and the XOR gates 522, dependent on the key 502. In some embodiments, the d bits of associated data may be changed for a single key-value pair already recorded in the lookup circuit 500 simply by writing a new key-value pair that happens to have the same key as before in the manner described above.

In some embodiments, external circuitry, which may be under software control, may be configured to effectively delete a specific key-value pair from a memory location in the single-ported RAM 530 by presenting the key to key input 502, presenting a different key and an arbitrary value together to key/data input 550, and presenting a true signal to the third write-enable input 546. In this case, the lookup circuit 500 may be configured to operate, at a clock transition or other specific time, to write the different key and the arbitrary value presented to the key-data input 550 to a memory location determined by the first primary hash function sub-circuit 504, the second primary hash function sub-circuit 514, the dual-ported RAM 512, and the XOR gates 522, dependent on the key 502. Note that if the different key is chosen to be a specific bit pattern that will not match any key intended to be presented as key input 502, then the contents of the memory word after it is written will not match the input key 502 on any future lookup request.

In some embodiments, external circuitry, which may be under software control, may be configured to effectively query the lookup circuit 500 to find out whether it contains associated data for a specific key k by presenting the key k to key input 502. In this case, the lookup circuit 500 may be configured to operate, at a clock transition or other specific time, to examine a first memory location within the dual-ported RAM 512 determined by the first primary hash function sub-circuit 504 from the key 502, and also to examine a second memory location within the dual-ported RAM 512 determined by the second primary hash function sub-circuit 514 from the key 502. The lookup circuit 500 may be further configured to combine the contents of the two examined memory locations within the dual-ported RAM 512 by using XOR gates 522 to produce a new value to be presented to the address input 528 of the single-ported RAM 530. In response to receiving this new value at address input 528, the lookup circuit 500 may be configured to examine a memory location within the single-ported RAM 530 determined by the value presented to the address input 528 of the single-ported RAM 530. In some embodiments, the lookup circuit 500 may be further configured to operate, using the comparator 558, to assert true for validity signal 560 if, and only if, the examined memory location within the single-ported RAM 530 contains a key (e.g., in the leftmost r bits) that matches key input 502. The lookup circuit 500 may also operate to deliver to associated data output 556 the rightmost d bits of the examined memory location within the single-ported RAM 530. In such embodiments, if validity signal 560 is true, then the associated data output 556 will present d-bit value that is part of a key-value pair stored in the memory of the single-ported RAM 530 whose key matches the key presented to key input 502.

In some embodiments, lookup circuit 500 (and/or other ones of the lookup circuits described herein) may be intended for use within a larger system that makes appropriate decisions as to whether to assert the first write signal 532 or the second write signal 536 when storing index data into the dual-ported RAM 512 of the lookup circuit 500. For example, external circuitry, which may be under software control, may be configured to implement a loading process to load a collection of key-value pairs into a memory in the lookup circuit. Because index information related to a given key can be stored into only one of two memory locations within the dual-ported RAM 512, and because the primary hash functions may hash different keys into the same p-bit bit string, not every set of keys, and therefore not every set of key-value pairs, can be successfully stored in its entirely into the lookup circuit 500. However, in embodiments in which a collection of valid key-value pairs can be successfully stored into the lookup circuit 500, then the lookup circuit 500 can be used to perform queries directed to those key-value pairs rapidly, e.g., in constant time.

In some embodiments, the primary hash function sub-circuits 504 and 514 may be "hard-wired," that is, fixed and unchanging. For example, each of them may be implemented as a hardware circuit such as the one illustrated in FIG. 3. In an alternate embodiment, the primary hash function sub-circuits 504 and 514 may be implemented according to Equation 1 shown above, but using a circuit that includes a writable memory that contains information specifying the bit matrix A and the bit vector y. In another alternate embodiment, the primary hash function sub-circuits 504 and 514 may be implemented in a manner other than that specified in Equation 1 shown above, using a circuit that includes a writable memory that allows the precise behavior of the primary hash function sub-circuits to be altered under external control. In various alternate embodiments, external software may be configured to examine a set of key-value pairs, choose a pair of primary hash functions, update the writable memory associated with each of the (primary hash function sub-circuits 504 and 514 so that they will operate in a manner consistent with the chosen hash functions, and then proceed to write the index data into the memory of the dual-ported RAM 512 and to write the key-value pairs into the memory of the single-ported RAM 530. In some embodiments, this approach may allow a greater number of sets of key-value pairs to be successfully handled by the lookup circuit 500 than in some existing lookup circuits because the behavior of the hash functions may be customized for any particular set of key-value pairs.

Note that in various embodiments of the lookup circuits described herein, index values suitable for storing into the dual-ported RAM 512 may be computed using any of a variety of suitable techniques. For example, in one embodiment, index values suitable for storing into the dual-ported RAM 512 may be computed using the methods of an algorithm developed by Fabiano C. Botelho, David Menoti and Nivio Ziviani (which is referred to herein as the BMZ algorithm). In another embodiment, z is equal to $2^n$, and index values suitable for storing into the dual-ported RAM 512 may be computed using a graph-construction strategy. For example, a set S of key-value pairs may be converted into a mathematical graph that includes one edge for each key-value pair and one node for each distinct value among all the values that can be produced by applying either of the hash functions F1 and F2 to any key in the set S of key-value pairs. In this example, each edge may connect the two nodes that correspond to the two hash values produced by applying the hash functions F1 and F2 to the key of the key-value pair that corresponds to that edge. If the resulting graph includes a cycle, then the procedure may be configured to report a failure. However, if the resulting graph is acyclic, then a suitable set of index values may be created by first assigning addresses to edges of the graph and then assigning index values to nodes of the graph.

In the first step, each edge may be assigned any n-bit bit string suitable for addressing the single-ported RAM 530, as long as distinct edges are assigned distinct bit strings. In the second step, any one node may be chosen arbitrarily and assigned an arbitrary n-bit index value (for example, the bit pattern that is all 0-bits). In this example, as long as the graph contains at least one edge that connects a node that has not yet been assigned an index value to a node that has already been assigned an index value, the following steps are repeated: any one edge (which may be referred to as "e") that connects a node (which may be referred to as "n1") that has not yet been assigned an index value to a node (which may be referred to as "n2") that has already been assigned an index value may be arbitrarily chosen, then the n-bit bit string that is the bitwise XOR of the index value already assigned to n2 and the n-bit bit string assigned to e may be assigned to n1.

In some embodiments, because this graph is acyclic, this procedure will assign an index value to every node of the graph, and each node will be assigned exactly one index value. The index value assigned to each node may then be stored into a memory location in the dual-ported RAM 512 whose address is the hash value to which that node corresponds. In some embodiments, if a key belonging to one of the key-value pairs in the set S is presented to the key input 502, the lookup circuit 500 may be configured to compute two hash values that correspond to the two distinct nodes in the graph connected by the edge corresponding to that key-value pair, and to fetch from the dual-ported RAM 512 the two index values that were assigned to those two nodes. The lookup circuit may then use XOR gates 522 to compute the n-bit address that was assigned to the edge corresponding to that key-value pair.

In this example, because each edge was assigned a distinct n-bit bit pattern, each key will identify a different memory location within the single-ported RAM 530. Therefore, all the key-value pairs in the set S can be stored into distinct memory locations within the single-ported RAM 530, and if a key belonging to one of the key-value pairs in the set S is presented to the key input 502, the lookup circuit 500 will deliver the data associated with that key to the associated data output 556, and assert true for the validity signal 560. In some embodiments, if all of the other locations within the single-ported RAM 530 are written with key-value pairs whose key is a bit pattern not matching any key in the set of key-value pairs S, then if a key not belonging to one of the key-value pairs in the set S is presented to the key input 502, the lookup circuit 500 may be configured to assert false for the validity signal 560. Note that a variety of other strategies may be used for computing index values to be used with the lookup circuit 500, in other embodiments.

In some embodiments of the lookup circuits described herein, for each input key that is received, two hash function sub-circuits may be configured to apply respective hash functions to the key, and the resulting hash values may be used to look up data stored in two locations in the memory. The lookup circuit my include a selection sub-circuit (sometimes referred to herein as a selector) that chooses one of those two pieces of data to be provided as an output of the lookup circuit. In some embodiments, the selection of one of the two pieces of data may be controlled by (or at least dependent on) the output of a comparator that is also used in deriving a validity signal, as described herein. In some embodiments, the lookup circuit may include a dual-ported memory (e.g., a dual-ported RAM) in which valid data is stored along with the key with which it is associated. In such embodiments, the two pieces of data are retrieved from the dual-ported memory by presenting each of the two hash values at a different one of the two input ports of the memory, and each of the two key/value pairs is output at a corresponding one of the two output ports of the memory. As previously noted, in some embodiments, at most one of the two pieces of data will include (or be associated with) a key that matches the input key. In such embodiments, the loading process will have chosen to store the data (and also, in some cases, the key) for that key-value pair in one of the two locations identified by the two hash values computed for the input key, and the other location may store data associated with another key that happens to hash to one of the same hash values as the input key.

In some embodiments, in order to determine which of the two pieces of data to provide as an output, the lookup circuit may be configured to determine which of the two locations identified by hashes of the input key contains a key that matches the input key (i.e., which of the two locations is the one into which the loading process decided to store the key-value pair corresponding to the input key). Note that because the loading process described herein results in two (or more) potential locations in which to store data for each key-value pair, in some embodiments, lookup circuits that employ this approach may be able to store data for more keys than lookup circuits that employ other loading schemes. For example, in some other lookup circuits in which multiple keys can hash to the same value (but in which there can be only one location per hashed value), when the loading process attempts to store data for a particular key-value pair in a location identified by a hash of its key, data associated with another key might already be stored there.

In some embodiments of the lookup circuits described herein, when an input key is presented to the circuit, it may be fed to two hash function sub-circuits, the outputs of which will identify respective locations in memory (e.g., in a lookup table or other data structure configured to store information for key-value pairs). In some such embodiments, the identified locations will always (or nearly always) be two different locations. In these embodiments, if the input key and its associated data are stored in the table, the loading process will see to it that they will be stored in one of the two locations that are identified by the outputs of the two hash function sub-circuits. However, because of the nature of hash functions, there may be some chance that the two hash functions will collide. If they do collide, data will be read from the same location twice (e.g., using the identical hash values computed by both hash functions). Note that if there are too many keys in the set of valid key-value pairs that hash to the same hash values (and memory locations), the loading function may fail and a different pair of hash functions may need to be implemented in the lookup circuit to handle the set of valid key-value pairs. In other words, there may be a trade-off to be made in that if there are not too many collisions, the loading process described herein (one that includes the application of multiple hash functions to each input key) may allow a lookup circuit to succeed where another (e.g., a lookup circuit that implements only use one hash function) would not.

Figure 6:
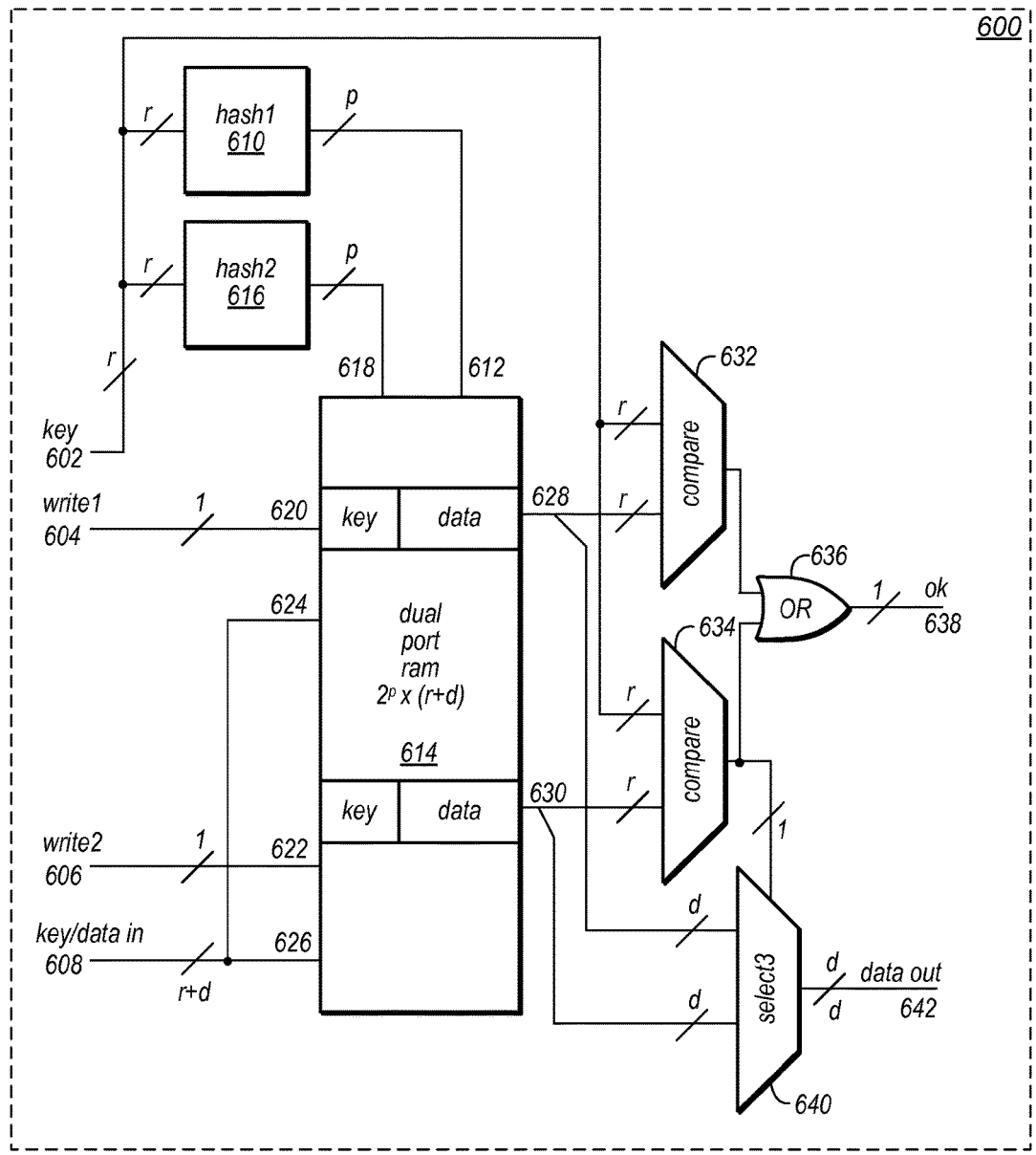
FIG. 6 is a block diagram illustrating a lookup circuit that accepts inputs and produces outputs similar to those accepted and produced by the abstract lookup circuit illustrated in FIG. 4, according to another embodiment.

FIG. 6 is a block diagram illustrating a lookup circuit that is configured to accept inputs and to produce outputs that are similar to those accepted and produced by the abstract circuit 402 shown in FIG. 4, according to another embodiment. In this example, lookup circuit 600 is configured to accept as an input a key 602 (a bit string of length r), corresponding to the input key 404 of FIG. 4. The lookup circuit 600 is also configured to accept a first single-bit write signal 604 and a second single-bit write signal 606, which together correspond to the write signals 410 of FIG. 4 (with w=2). In this example, lookup circuit 600 is also configured to accept r+d bits of key/data input information 608, corresponding to the key/data inputs 412 of FIG. 4.

The lookup circuit 600 includes a first hash function sub-circuit 610 that is configured to accept the key 602 and to produce a p-bit output that is connected to a first address input 612 of a dual-ported RAM 614. In this example, the first address input 612 of the dual-ported RAM 614 is at least p bits wide. In some embodiments, the first hash function sub-circuit 610 may be implemented as p copies of the circuit shown in FIG. 3, using a bit matrix A1 and a bit vector y1. In this example, the lookup circuit 600 also includes a second hash function sub-circuit 616 that is configured to accept the key 602 and to produce a p-bit output that is connected to a second address input 618 of the dual-ported RAM 614. In this example, the second address input 618 of the dual-ported RAM 614 is at least p bits wide. In some embodiments, the second hash function sub-circuit 616 may be implemented as p copies of the circuit shown in FIG. 3, using a bit matrix A2 and a bit vector y2, where A2 may be the same as A1 or may be different from A1, and y2 may be the same as y1 or may be different from y1. As described in more detail herein, in some embodiments, one or both of the p×r bit matrices A1 and A2 may be generated and/or chosen such that they are sparse bit matrices, which may allow the hash functions they represent to be implemented using circuitry with low latency. For example, in each of these matrices, each row of the matrix may include at least twice as many 0-bits as 1-bits, or may be limited to a pre-defined upper bound on the number of 1-bits, in different embodiments.

In lookup circuit 600, the first write signal 604 is connected to a first write-enable input 620 of the dual-ported RAM 614, and the second write signal 606 is connected to a second write-enable input 622 of the dual-ported RAM 614. In this example, the r+d bits of key/data input information 608 are connected to each of a first write-data input port 624 of the dual-ported RAM 614 and a second write-data input port 626 of the dual-ported RAM 614. In this example, dual-ported RAM 614 contains at least $2^p$ words of memory, where each word holds at least r+d bits. In some embodiments, a dual-ported RAM such as 614 dual-ported RAM may be configured to operate, at a clock transition or other specific time, to accept data from the first write-data input port 624 and to write that data into a memory word at an address selected by the p-bit bit string presented at the first address input 612, provided that the first write enable input 620 is true. However, if the first write-enable input 620 is false, then the data from the first write-data input port 624 will not be written to the memory. Similarly, the dual-ported RAM 614 may be configured to operate, at a clock transition or other specific time, to accept data from the second write-data input port 626 and to write that data into a memory word at an address selected by the p-bit bit string presented at the second address input 618, provided that the second write enable input 622 is true. However, if the second write-enable input 620 is false, then the data from the second write-data, input port 626 will not be written to the memory. In some embodiments, the lookup circuit 600 may be operated in a manner such that the first write signal 604 and the second write signal 606 are never both true at the same time.

In lookup circuit 600, the dual-ported RAM 614 includes a first read-data output port 628, and the dual-ported RAM 614 may be configured to operate, at a clock transition or other specific time, to read a memory word from an address selected by the p-bit bit string presented at the first address input 612, and to present r+d bits of data from that memory word to the first read-data output port 628 (where the leftmost r bits represent the key of a key-value pair and the remaining d bits represent the corresponding data for the key-value pair). In this example, the dual-ported RAM 614 also has a second read-data output port 630, and the dual-ported RAM 614 may be configured to operate, at a clock transition or other specific time, to read a memory word from an address selected by the p-bit bit string presented at the second address input 618 and to present r+d bits of data from that memory word to the second read-data output port 630 (wherein, again, the leftmost r bits represent the key of a key-value pair and the remaining d bits represent the corresponding data for the key-value pair).

In this example, the lookup circuit 600 includes two comparators that are configured to determine whether a key-value pair corresponding to the input key is stored in the dual-ported RAM 614. For example, lookup circuit 600 includes a first r-bit comparator 632 that has a first input port connected to the key input 602 and a second input port connected to the leftmost r bits of the first read-data output port 628 of the dual-ported RAM 614. In this example, comparator 632 may be configured to produce a single-bit signal indicating whether its two input ports have matching data. In this example, lookup circuit 600 includes a second r-bit comparator 634 that has a first input port connected to the key input 602 and a second input port connected to the leftmost r bits of the second read-data output port 630 of the dual-ported RAM 614. In this example, comparator 634 may be configured to produce a single-bit signal indicating whether its two input ports have matching data. As illustrated in FIG. 6, the lookup circuit 600 also includes a two-input OR gate 636 whose inputs are connected to the respective output signals of comparator 632 and comparator 634. In this example, the output of the OR gate 636 is the validity signal 638 of the lookup circuit 600, which may correspond to the validity signal 406 in FIG. 4. In this example, the comparator 632, the comparator 634, and the OR gate 636 may be configured to produce a value of true for the validity signal 638 if and only if either of the read-data output port 628 and the read-data output port 630 is presenting r+d bits of data of which the leftmost r bits match the input key 602.

In the example, illustrated in FIG. 6, if either of the locations within dual-ported RAM 614 identified by address inputs 612 and 618 contains a key that matches the input key 602, then that location must contain the correct data for the input key 602. In some embodiments, the key-value information may be loaded into the memory in a manner such that the correct data associated with every valid key will be stored in dual-ported RAM 614. In such embodiments, if the input key 602 does not match any valid key in the dual-ported RAM 614 (i.e., if the input key 602 does not match the key in either of the locations identified by the results of the two hash functions), the validity signal 638 will be false, indicating that there is no entry in the lookup circuit for that key. This may mean that an invalid key was presented, since all valid keys should be represented in the memory. In some embodiments, if the validity signal 638 is true, then at least one of the comparators (i.e., 632 and/or 634) found a match. Note that in some embodiments, comparators 632 and 634 might both find a match in the rare case that the two hash functions map to the same location in the memory. However, this may still result in outputting the correct output data (shown as 642), assuming that the key stored in that location matches the input key 602.

In some embodiments, the comparator 632 may be configured to compare two keys by delivering a true signal if and only if the bit strings presented to its two input ports match exactly. In an alternate embodiment, the comparator 632 may be configured to compare two keys by delivering a true signal if and only if the bit strings presented to its two input ports match according to some other criterion, such as whether the bit strings represent character sequences that match if distinctions of alphabetic case (such as uppercase versus lowercase) are ignored. It will be appreciated that the use of other comparators that employ other matching criteria, is also possible and falls within the spirit and scope of this disclosure. It will also be appreciated that similar alternatives may be used for the comparator 634.

As illustrated in FIG. 6, the lookup circuit 600 includes a selector 640. In this example, selector 640 has a first d-bit input port connected to the rightmost d bits of the first read-data output port 628 of the dual-ported RAM 614, a second d-bit input port connected to the rightmost d bits of the second read-data output port 630 of the dual-ported RAM 614, and a single-bit control signal connected to the output signal of the second comparator 634. In this example, the output of the selector 640 is the d-bit associated data output 642 of the lookup circuit 600, corresponding to the associated data output 408 in FIG. 4. In some embodiments, selector 640 and comparator 634 may be configured to deliver the rightmost d bits of the second read-data output port 630 of the dual-ported RAM 614 to the associated data output 642 whenever the key 602 matches the leftmost r bits of the second read-data output port 630 of the dual-ported RAM 614, and to deliver the rightmost d bits of the first read-data output port 628 of the dual-ported RAM 614 to the associated data output 642 whenever the key 602 does not match the leftmost r bits of the second read-data output port 630 of the dual-ported RAM 614.

In some embodiments, external circuitry, which may be under software control, may be configured to write a specific key-value pair to a memory location in the dual-ported RAM 614 by presenting the key to key input 602, presenting the key and value together to key/data input 608, and presenting a true signal to the first write-enable input 604. In such embodiments, in response to receiving these inputs, the lookup circuit 600 may be configured to operate, at a clock transition or other specific time, to write the key-value pair presented to the key-data input 608 to a memory location determined by the first hashing function sub-circuit 610 from the key 602. Similarly, external circuitry, which may be under software control, may also be configured to write a specific key-value pair to another (possibly different) memory location in the dual-ported RAM 614 by presenting the key to key input 602, presenting the key and value together to key/data input 608, and presenting a true signal to the second write-enable input 606. In response to receiving these inputs, the lookup circuit 600 may be configured to operate, at a clock transition or other specific time, to write the key-value pair presented to the key-data input 608 to a memory location determined by the second hashing function sub-circuit 616 from the key 602.

In some embodiments, external circuitry, which may be under software control, may be configured to effectively delete a key-value pair from the memory in the dual-ported RAM 614 by presenting the key to key input 602, presenting a different key and an arbitrary value together to key/data input 608, and presenting a true signal to the first write-enable input 604. In this case, the lookup circuit 600 may be configured to operate, at a clock transition or other specific time, to write the different key and the arbitrary value presented to the key-data input 608 to a memory location determined by the first hashing function sub-circuit 610 from the key 602. External circuitry, which may be under software control, may also be configured to effectively delete a key-value pair from the memory in the dual-ported RAM 614 by presenting the key to key input 602, presenting a different key and an arbitrary value together to key/data input 608, and presenting a true signal to the second write-enable input 606. In this case, the lookup circuit 600 may be configured to operate, at a clock transition or other specific time, to write the different key and the arbitrary value presented to the key-data input 608 to a memory location determined by the second hashing function sub-circuit 616 from the key 602. In each case, if the different key is chosen to be a specific bit pattern that will not match any key intended to be presented as key input 602, then the contents of the memory word after it is written will not match the input key 602 on any future lookup request.

In some embodiments, external circuitry, which may be under software control, may be configured to effectively query the lookup circuit 600 to find out whether it contains associated data for a specific key k by presenting the key k to key input 602. In this case, the lookup circuit 600 may be configured to operate, at a clock transition or other specific time, to examine a first memory location within the dual-ported RAM 614 determined by the first hashing function sub-circuit 610 from the key 602, and also to examine a second memory location within the dual-ported RAM 614 determined by the second hashing function sub-circuit 616 from the key 602. The lookup circuit 600 may then operate to assert true for validity signal 638 if and only if either the first examined memory location or the second examined memory location contains a key (e.g., in the leftmost r bits) that matches key input 602. The lookup circuit 600 may also operate to deliver to associated data output 642 the rightmost d bits of the second examined memory location if and only if the second examined memory location contains a key (e.g., in the leftmost r bits) that matches key input 602. The lookup circuit 600 may also operate to deliver to associated data output 642 the rightmost d bits of the first examined memory location if and only if the second examined memory location contains a key (e.g., in the leftmost r bits) that does not match key input 602. In other words, if validity signal 638 is true, then the associated data output 642 will present a d-bit value that is part of a key-value pair in the memory of the dual-ported RAM 614 whose key matches the key presented to key input 602.

In some embodiments, lookup circuit 600 (and/or other ones of the lookup circuits described herein) may be intended for use within a larger system that makes appropriate decisions, for each key-value pair, as to whether to assert the first write-enable signal 604 or the second write-enable signal 606 when storing a key-value pair into the lookup circuit 600. For example, external circuitry, which may be under software control, may be configured to implement a loading process such as that described herein to load a collection of key-value pairs into a memory in the lookup circuit. Because each key-value pair can be stored into only one of two memory locations, not every set of key-value pairs can be successfully stored in its entirety into the lookup circuit 600. However, in embodiments in which a collection of valid key-value pairs can be successfully stored into the lookup circuit 600, then the lookup circuit 600 can be used to perform queries directed to those key-value pairs rapidly, e.g., in constant time.

Note that in some embodiments, the hash function sub-circuits 610 and 616 may be "hard-wired," that is, fixed and unchanging. For example, each of them may be implemented as a hardware circuit such as the one illustrated in FIG. 3. In an alternate embodiment, the hash function sub-circuits 610 and 616 may be implemented according to Equation 1 shown above, but using a circuit that includes a writable memory that contains information specifying the bit matrix A and the bit vector y. In another alternate embodiment, the hash function sub-circuits 610 and 616 may be implemented in a manner other than that specified in Equation 1 shown above, using a circuit that includes a writable memory that allows the precise behavior of the hash function sub-circuits to be altered under external control. In various alternate embodiments, external software may be configured to examine a set of key-value pairs, choose a pair of hash functions suitable for use in evaluating those key-value pairs, update the writable memory associated with each of the hash function sub-circuits 610 and 616 no that they will operate in a manner consistent with the chosen hash functions, and then proceed to write the key-value pairs into the memory of the dual-ported RAM 614. In some embodiments, this approach may allow a greater number of sets of key-value pairs to be successfully handled by the lookup circuit 600 than in existing lookup circuits because the behavior of the hash functions may be customized for any particular set of key-value pairs.

Note that, in some embodiments, the first primary hash function sub-circuit 504 and the second primary hash function sub-circuit 514 of lookup circuit 500 may both lie on the "critical path" for fetching associated data from lookup circuit 500, because access to that data requires completion of the computation of both primary hash functions. Similarly, the first hash function sub-circuit 610 and the second hash function sub-circuit 616 of lookup table 600 may both lie on the "critical path" for fetching associated data from lookup circuit 600, because access to that data requires completion of the computation of both hash functions. For either of these lookup circuits, it may be desirable to use hash function sub-circuits that have very low latency in an attempt to lower the overall latency of the lookup circuit.

In some embodiments, at least one of the first primary hash function circuit 504 or the second primary hash function circuit 514 (illustrated in FIG. 5) is a circuit that computes a hash function by performing a bit matrix multiplication, or performing a bit matrix multiplication and then a bit vector addition, where the bit matrix is chosen to be sparse, that is, having a small number or proportion of 1-bits in each row, for example, having at least twice as many 0-bits as 1-bits in each row.

In some embodiments, at least one of the first primary hash function circuit 610 or the second hash function circuit 616 (illustrated in FIG. 6) is a circuit that computes a hash function by performing a bit matrix multiplication, or performing a bit matrix multiplication and then a bit vector addition, where the bit matrix is chosen to be sparse, that is, having a small number or proportion of 1-bits in each row, for example, having at least twice as many 0-bits as 1-bits in each row.

In some embodiments, a lookup circuit such as the lookup circuit 500 or the lookup circuit 600 may be implemented as part of (or using) an FPGA device. Such an FPGA device may support the implementation of various forms of combinatorial circuitry by providing multiple instances of a general-purpose LUT (LookUp Table) circuit.

While several examples of low latency lookup circuits are described herein that are configured to apply hash functions by performing a bit matrix multiplication, or by performing a bit matrix multiplication followed by a bit vector addition, using a bit matrix that is chosen or generated such that the bit matrix is sparse, many other variations of such lookup circuits are possible within the spirit and scope of this disclosure.

In some embodiments, the lookup circuits described herein may be loaded, programmed or otherwise supported through the use of various programmed procedures, such as programmed methods for generating a suitable pair of hash functions (based on sparse random bit matrices) for a given set of keys, for constructing the appropriate contents for various hash table memories, and/or for downloading these contents into the circuits prior to using the circuits for performing key lookup operations. In some embodiments, the programmed methods for constructing of a pair of sparse random bit matrices and corresponding hash functions may include multiple components, which may include: a procedure for randomly choosing a matrix of appropriate size; a procedure for testing whether a pair of generated hash functions will effectively hash the given set of keys; and/or an overall procedure that successively generates pairs of candidate matrices and applies the testing procedure until a suitable pair of hash functions is found. Examples of some of these methods are described in detail herein.

One embodiment of a programmed method that may be used to generate a uniformly random bit matrix is illustrated by the pseudocode below.

```
01  static long[ ] makeRandomMatrix(int nrows,
02                    int ncols,
03                    Random rng) {
04      assert 0 < nrows;
05      assert 0 < ncols && ncols <= 64;
06      final long[ ] result = new long[nrows];
07      for (int j = 0; j < nrows; j++) {
08          result[j] = rng.nextLong( ) >>> (64 − ncols);
09      }
10      return result;
11  }
```

In this example, a programmed method "makeRandomMatrix" (which may be coded in the Java™ programming language) may be used to generate a uniformly random bit matrix, represented as an array of long values, in which each long value represents one row of up to 64 bits. In this example, the programmed method accepts three arguments: the desired number of rows in the matrix "nrows" (declared in line 01), the desired number of columns in the matrix "ncols" (declared in line 02), and a generator of random (or pseudorandom) numbers "rng" (declared in line 03). In this example, the assertion in line 04 requires that the number of rows "nrows" be strictly positive, and the assertion in line 05 requires that the number of columns "ncols" be strictly positive and not greater than 64. Line 06 allocates a new array with the desired number of rows "nrows" and gives it the name "result". In this example, the body of the loop on lines 07 through 09 generates one random word of bits for each row in the matrix, then shifts it right by "64-ncols", so that the rightmost "ncols" bits of the long value are uniformly generated random bits (that is, each bit has a 50% probability of being a 1-bit, independent of all the other bits in the matrix). In this example, line 10 returns the constructed matrix as the output of the programmed method.

In some embodiments, in order to generate a random bit matrix for use in any of the lookup circuits described herein, the programmed method "makeRandomMatrix" shown above may be called with three arguments: a random number generator, an integer value p, and an integer value r. Given these inputs, this programmed method may construct a representation of a matrix having p rows and r columns, whose entries are uniformly generated random bits.

As previously noted, selecting hash functions that implement bit matrix multiplication using sparse random bit matrices, may allow the hash functions to be implemented using circuitry with low latency. In some embodiments, random bit matrices may be generated in a manner that applies a sparseness constraint, and the hash functions generated from these matrices may be implemented in a lookup circuit using the low latency hash function sub-circuits described herein. In various embodiments, such a sparseness constraint may specify a pre-defined upper or lower bound on the number of 1-bits, a pre-defined upper or tower bound on the number of 0-bits, a pre-defined number of 1-bits or 0-bits desired in each row, a constraint on the ratio between the number of 0-bits and the number of 1-bits in each row (e.g., a requirement that there be at least twice as many 0-bits as 1-bits in each row), a constraint on the ratio between the number of 1-bits and the number of 0-bits in each row (e.g., a requirement that there be at least twice as many 1-bits as 0-bits in each row) or another type of constraint on the number of 1-bits and/or the number of 0-bits in each row.

Figure 7:
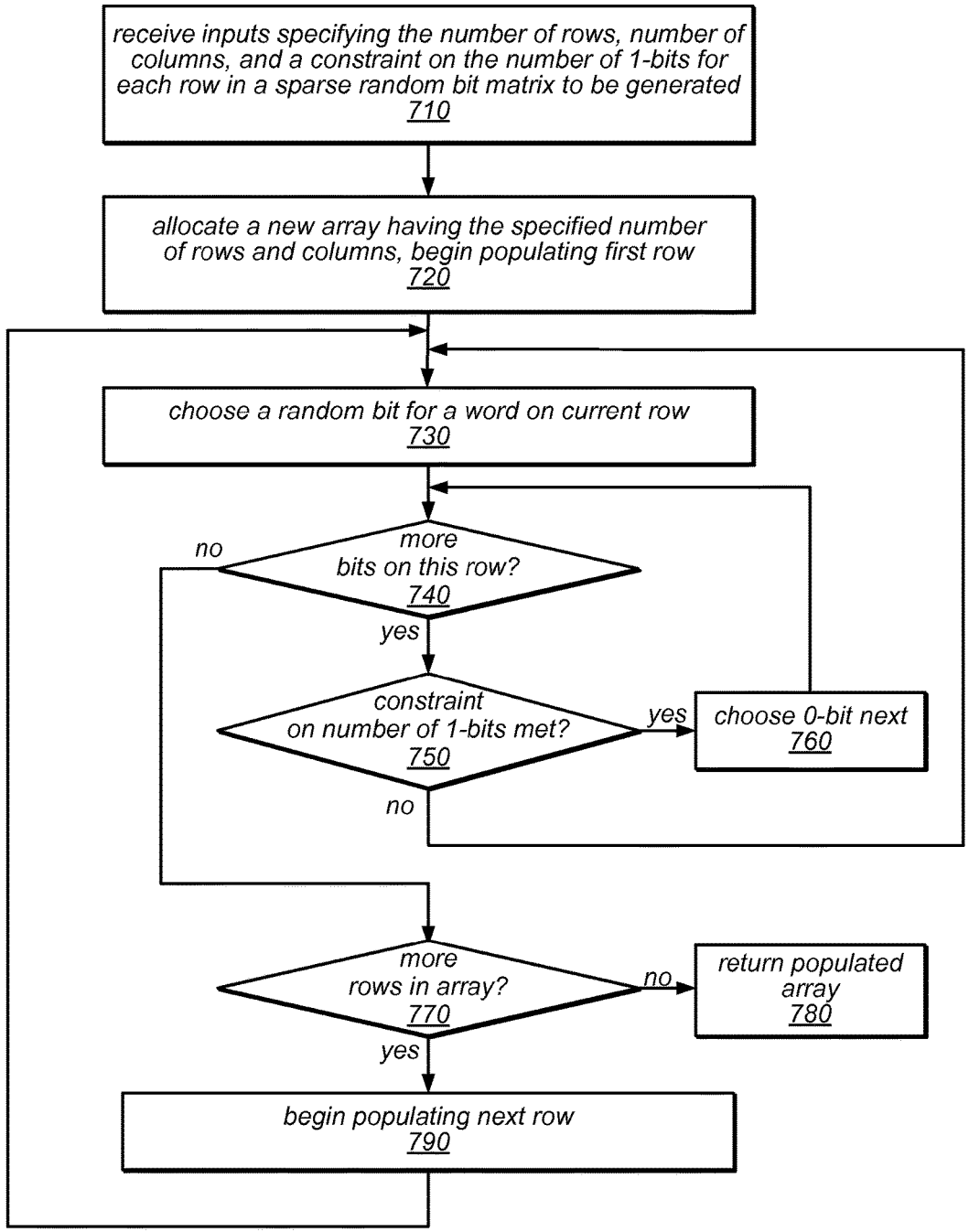
FIG. 7 is a flow diagram illustrating one embodiment of a method for generating a sparse random bit matrix for use in a lookup circuit.

One embodiment of a method for generating a sparse random bit matrix for use in the lookup circuits described herein is illustrated by the flow diagram in FIG. 7. As illustrated at 710, in this example, the method may include receiving inputs specifying the number of rows, the number of columns, and a constraint on the number of 1-bits for each row of a sparse random bit matrix to be generated. In this example, the input may specify a number of 1-bits desired in each row, an upper bound on the number of 1-bits in each row, or a constraint on the ratio between the number of 0-bits and the number of 1-bits in each row. Note that in other embodiments, the method may include receiving one or more other inputs (e.g., the values of various configuration parameters or flags, identifiers of various random or pseudorandom number generators, or other inputs). As illustrated in this example, the method may include allocating a new array having the specified number of rows and columns, and beginning to populate the first row of the array, as in 720.

In order to populate the first row of the array, the method may include choosing a random bit value (i.e., 0 or 1) for a word on the row (as in 730). If there are more bits to be populated on this row (shown as the positive exit from 740), and the specified constraint on the number of 1-bits has not been met for the row (shown as the negative exit from 750), the method may include repeating the operation illustrated at 730 (e.g., choosing a random bit value for the row). This is illustrated in FIG. 7 by the feedback from the negative exit of 750 to 740. However, if there are more bits in this row (shown as the positive exit from 740), but the constraint on the number of 1-bits has been met (shown positive exit of 750) the method may include choosing a 0-bit for the next bit in the row (as in 760).

As illustrated in this example, the operations illustrated in 730-760 may be repeated until the first row of the array has been populated. Once the first row has been populated, if there are more rows in the array to be populated (shown as the positive exit from 770), the method may include beginning to populate the next row in the array (as in 790), and repeating the operations illustrated in 730-760, as needed, in order to populate each additional row. This is illustrated in FIG. 7 by the feedback from the 790 to 730. If there are no more rows to be populated in the array (or once all of the rows of the array have been populated), the method may include returning the populated array. This is illustrated in FIG. 7 by the path from the negative exit of 770 to 780.

One embodiment of a programmed method for generating a random, but sparse, bit matrix (such as those implemented in the lookup circuits described herein) is illustrated by the example pseudocode below.

```
01  static long[ ] makeSparseRandomMatrix(int nrows,
02                int ncols,
03                int maxOnes,
04                boolean exact,
05                boolean oneLessForSomeRows,
06                Random rng) {
07      assert 0 < nrows;
08      assert 0 < ncols && ncols <= 64;
09      assert 1 < maxOnes && maxOnes <= ncols;
10      final long[ ] result = new long[nrows];
11      for (int j = 0; j < nrows; j++) {
12          int nbits = maxOnes;
13          if (oneLessForSomeRows && ((j & 1) == 0)) {
14              nbits = nbits - 1;
15          }
16          result[j] = 1L << rng.nextInt(ncols)
17          for (int k = 1; k < nbits; k++) {
18              int newBit;
19              do {
20                  newBit = 1L << rng.nextInt(ncols);
21              } while(exact&&((result[j]&newBit)!=0));
22              result[j] |= newBit;
23          }
24      }
25      return result;
26  }
```

In this example, a programmed method "makeSparseRandomMatrix" (which may be coded in the Java™ programming language) may be used to generate a sparse bit matrix, represented as an array of long values, in which each long value represents one row of up to 64 bits. In this example, the programmed method accepts six arguments: the desired number of rows in the matrix "nrows" (declared in line 01), the desired number of columns in the matrix "ncols" (declared in line 02), an upper bound on the number of 1-bits in each row of the generated matrix "maxOnes" (declared in line 03), a flag "exact" (declared in line 04) that, if true, indicates that "maxOnes" should be treated as an exact requirement on the number of 1-bits per row rather than an upper bound, a flag "oneLessForSomeRows" (declared in line 05) that, if true, indicates that a value one smaller than "maxOnes" should be used as the exact or maximum number of 1-bits for even-numbered rows of the matrix, and a generator of random (or pseudorandom) numbers "rng" (declared in line 05). In this example, the assertion in line 07 requires that the number of rows "nrows" be strictly positive; the assertion in line 08 requires that the number of columns "ncols" be strictly positive and not greater than 64; and the assertion in line 09 requires that the "maxOnes" be strictly positive and not greater than "ncols". Line 10 allocates a new array with the desired number of rows "nrows" and gives it the name "result".

In this example, the body of the loop on lines 11 through 24 generates one word of bits for each row in the matrix, chosen in a specific non-uniform manner. In this example, line 12 sets a local variable "nbits" equal to "maxOnes"; lines 13 through 15 then reduce the value "nbits" by 1 if (and only if) the flag "oneLessForSomeRows" is true and the row being generated is even-numbered. Line 16 chooses just one bit to set in the current row being generated, by using the "nextInt" method of "rng" to generate a random integer chosen uniformly from the range 0 (inclusive) to "ncols" (exclusive) and then shifting the value "1L" (the value 1 represented as a long integer) to the left by that amount. The inner loop on lines 17 through 23 then executes its body "nbits-1" times.

In this example, line 18 declares a local variable "newbit", which line 20 sets to a word with exactly one 1-bit, chosen in the same manner as on line 16. If the "exact" flag is false, then line 20 is executed just once per iteration of the inner loop on lines 17 through 23. However, if the "exact" flag is true, then the "do" loop on lines 19 through 21 repeats line 20 until "newbit" contains a 1-bit in a position not yet chosen for this row. In either case, the chosen "newbit" value is then logically OR'd into the matrix row being generated. The net effect is that if the "exact" flag is true, then the generated row will include exactly "nbits" 1-bits, but if the "exact" flag is false, then the generated row will include at most "nbits" 1-bits (but at least one 1-bit). Line 25 returns the constructed matrix as the output of the programmed method.

In an alternate embodiment, the programmed method "makeSparseRandomMatrix" may use values of type "BigInteger" rather than "long" values to represent the rows of the generated matrix. In another embodiment, the programmed method "makeSparseRandomMatrix" may use a two-dimensional array of Boolean values to represent the generated matrix. Note that either of these embodiments may be used to generate a matrix that includes rows longer than 64 bits.

In one embodiment, in order to generate a sparse random bit matrix for use in any of the lookup circuits described herein, the programmed method "makeSparseRandomMatrix" shown above may be called with six arguments, e.g., a random number generator, a first integer value p (corresponding to "nrows" in the pseudocode above) a second integer value r (corresponding to "ncols"), a third integer value m (corresponding to "maxOnes"), a first Boolean value false (corresponding to "exact"), and a second Boolean value false (corresponding to "oneLessForSomeRows"), such that the assertions on lines 07 through 09 are satisfied.

Given these inputs, the programmed method may construct a representation of a matrix having p rows and r columns, whose entries are chosen randomly but non-uniformly, such that each row of the generated matrix includes at least one 1-bit, but no more than in m 1-bits.

In another embodiment, in order to generate a sparse random bit matrix for use in any of the lookup circuits described herein, the programmed method "makeSparseRandomMatrix" shown above may be called with the following six arguments: a random number generator, a first integer value p (corresponding to "nrows") a second integer value r (corresponding to "ncols"), a third integer value m (corresponding to "maxOnes"), a first Boolean value true (corresponding to "exact"), and a second Boolean value false (corresponding to "oneLessForSomeRows"), such that the assertions on lines 07 through 09 are satisfied. Given these inputs, the programmed method may construct a representation of a matrix having p rows and r columns, whose entries are chosen randomly but non-uniformly, such that each row of the generated matrix includes exactly m 1-bits.

In another embodiment, in order to generate a sparse random bit matrix for use in any of the lookup circuits described herein, the programmed method "makeSparseRandomMatrix" shown above may be called with the following six arguments: a random number generator, a first integer value p (corresponding to "nrows") a second integer value r (corresponding to "ncols"), a third integer value in (corresponding to "maxOnes"), a first Boolean value true (corresponding to "exact"), and a second Boolean value true (corresponding to "oneLessForSomeRows"), such that the assertions on lines 07 through 09 are satisfied. Given these inputs, the programmed method may construct a representation of a matrix having p rows and r columns, whose entries are chosen randomly but non-uniformly, such that each odd-numbered row of the generated matrix includes exactly in m 1-bits, and each even-numbered row of the generated matrix includes exactly (m−1) 1-bits.

In some embodiments, in order to generate a sparse random bit matrix for use in any of the lookup circuits described herein, the programmed method "makeSparseRandomMatrix" shown above may be called with the following six arguments: a random number generator, a first integer value p (corresponding to "nrows") a second integer value r (corresponding to "ncols"), a third integer value in (corresponding to "maxOnes"), a first Boolean value false (corresponding to "exact"), and a second Boolean value true (corresponding to "oneLessForSomeRows"), such that the assertions on lines 07 through 09 are satisfied. Given these inputs, the programmed method may construct a representation of a matrix having p rows and r columns, whose entries are chosen randomly but non-uniformly, such that each odd-numbered row of the generated matrix includes at least one 1-bit, but no more than in m 1-bits, and each even-numbered row of the generated matrix includes at least one 1-bit, but no more than (m−1) 1-bits.

In some embodiments, the programmed method "makeSparseRandomMatrix" shown above may be called with an argument m (corresponding to "maxOnes") such that m=6. In some embodiments of the lookup circuits described herein, multiplication of an input key (one represented by a bit vector) with the sparse bit matrix produced by the method in this case may be implemented in a hash function sub-circuit that includes odd-parity-of-6 circuits. In other embodiments, the programmed method "makeSparseRandomMatrix" shown above may be called with an argument m such that m=11 or m=12. In some embodiments, multiplication of an input key (one represented by a bit vector) with the sparse bit matrix produced by the method in this case may be implemented in a hash function sub-circuit that includes odd-parity-of-11 circuits or odd-parity-of-12 circuits, such as those described herein.

As illustrated in the examples described herein, in some embodiments, the programmed method "makeSparseRandomMatrix" shown above may be called with an argument corresponding to "exact" that is false. In other embodiments, the programmed method "makeSparseRandomMatrix" shown above may be called with an argument corresponding to "exact" that is true. The use of an argument corresponding to "exact" may allow an application that calls the programmed method "makeSparseRandomMatrix" to control the number of 1-bits per row exactly or to allow flexibility in the number of 1-bits per row up to an upper bound, which may allow more options for the resulting bit matrices and the hash function circuits that employ them. Similarly, in some embodiments, the programmed method "makeSparseRandomMatrix" shown above may be called with an argument corresponding to "oneLessForSomeRows" that is false, while in other embodiments, the programmed method "makeSparseRandomMatrix" shown above may be called with an argument corresponding to "oneLessForSomeRows" that is true. The use of an argument corresponding to "oneLessForSomeRows" may allow an application that calls the programmed method "makeSparseRandomMatrix" to control whether the same constraint is applied to all rows of the resulting matrix or two different constraints are applied to all rows of the resulting matrix, which may in turn affect the available options for implementing the hash function circuits that employ these matrices.

In some embodiments, in order to generate a sparse random bit matrix for use in any of the lookup circuits described herein, the programmed method "makeSparseRandomMatrix" shown above may be called with the following six arguments: a random number generator, a first integer value p (corresponding to "nrows") a second integer value r (corresponding to "ncols"), a third integer value m (corresponding to "maxOnes"), a first Boolean value corresponding to "exact" (either true or false), and a second Boolean value corresponding to "oneLessForSomeRows" (either true or false), such that the assertions on lines 07 through 09 are satisfied, and moreover such that m is not greater than ⅓ the mathematical value of r. Given these inputs, the programmed method may construct a representation of a matrix having p rows and r columns, whose entries are chosen randomly but non-uniformly, such that each row of the generated matrix has at least twice as many 0-bits as 1-bits. For example, the programmed method "makeSparseRandomMatrix" shown above may called with an argument m (corresponding to "maxOnes") such that m=floor(r/3), where "floor(x)" denotes the largest integer that is not larger than x. This computation of m results in a value that is not greater than ⅓ the mathematical value of r.

For example, in one embodiment, the programmed method "makeSparseRandomMatrix" shown above may be called with an argument r (corresponding to "ncols") such that r is not less than 18 and an argument m (corresponding to "maxOnes") such that m=6. In this example, the computation of m=floor(r/3) results in a value of m that is not greater than ⅓ the mathematical value of r. In another example, the programmed method "makeSparseRandomMatrix" shown above may be called with an argument r (corresponding to "ncols") such that r is not less than 36 and an argument m (corresponding to "maxOnes") such that m=12. In this example, the computation of m=floor(r/3)

results in a value of m that is not greater than ⅓ the mathematical value of r. In both of these cases, the bit matrix resulting from the execution of the programmed method "makeSparseRandomMatrix" shown above will be a bit matrix in which each row of the generated matrix has at least twice as many 0-bits as 1-bits.

As described herein, in some embodiments, a lookup circuit e.g., the lookup circuit 500 or the lookup circuit 600) may be used to access data associated with a key presented to key input signals. The lookup circuit may include one or more hash function sub-circuits, each of which computes a p-bit hash value from an r-bit key by multiplying the key by a p×r bit-matrix, or by multiplying the key by a p×r bit-matrix and then adding a p-bit bit-vector.

In some embodiments, the p×r bit-matrix may be chosen (or generated) so as to be sparse. For example, the p×r bit-matrix may be chosen (or generated) so that each row has at least twice as many 0-bits as 1-bits. In some embodiments, the p×r bit-matrix may be generated by calling the programmed method "makeSparseRandomMatrix" shown above. For example, in addition to the combinations of arguments described above, the programmed method "makeSparseRandomMatrix" shown above may be called with the following sets of arguments, each of which may result in the generation of a sparse bit matrix suitable for implementation within one of the hash function sub-circuits described herein: (p=18, r=96, and m=12), (p=18, r=72 and m=6), or (p=13, r=48, and m=6).

As illustrated in FIG. 2, in some embodiments, the lookup circuits described above may be used in conjunction with methods for generating sparse random bit matrices and corresponding hash functions, for determining the suitability of various sets (e.g., pairs) of hash functions for implementation in the lookup circuits, and for loading a set of hash functions into the lookup circuits. For example, in some embodiments, a bit matrix (or set of bit matrices) generated by a programmed method "makeSparseRandomMatrix" (such as that described herein) may be tested against a specific set of keys to determine whether the bit matrix (or set of bit matrices) is suitable for hashing that specific set of keys for use with the lookup circuit. In some embodiments, if testing determines that the bit matrix (or set of bit matrices) generated by the programmed method "makeSparseRandomMatrix" is not suitable for hashing a specific set of keys for use with the lookup circuit, the programmed method "makeSparseRandomMatrix" may be called again, repeatedly, until either a suitable bit matrix (or set of bit matrices) is generated or a resource limit (e.g., a time limit or a fixed number of iterations) has been exhausted. Once a suitable bit matrix (or set of bit matrices) has been identified, the corresponding hash functions may be programmed or otherwise loaded into the lookup circuit.

In some embodiments, a hash function may be represented as a bit matrix plus a bit vector (e.g., in a data structure). One example of a data structure that may be used to represent a hash function as a bit matrix plus a bit vector is illustrated by the pseudocode below.

```
01      class BitMatrixVector {
02          long [ ] A;
03          int y;
04          BitMatrixVector(long[ ] A, int y) {
05              this.A = A;
06              this.y = y;
07          }
08      }
```

In this example, the data structure "BitMatrixVector" (which may be coded in the Java™ programming language) includes a first field "A" (declared on line 02) that represents a bit matrix, and a second field "y" (declared on line 03) that represents a bit vector. In some embodiments, an instance of the data structure "BitMatrixVector" may represent a hash function that computes a hash value by multiplying an input bit vector (e.g., one representing a key value) by the bit matrix stored in the field "A" of the instance of the data structure and then adding the bit vector stored in the field "y" of the instance of the data structure to the result of the multiplication.

In some embodiments, the methods described herein for applying a hash function to an input key may be implemented using program instructions that when executed on one or more computers cause the computer to perform these methods. One embodiment of a programmed method that may be used to apply a hash function that is represented by an instance of the data structure "BitMatrixVector" to a bit vector key and to produce a hash value bit vector is illustrated by the pseudocode below.

```
01      static int hash (long x,
02                       BitMatrixVector hf) {
03          final int n = hf.A.length;
04          int result = hf.y;
05          for (int j = 0; j < n; j++) {
06              long bits = hf.A[j] & x;
07              bits ^= (bits >>> 1);
08              bits ^= (bits >>> 2);
09              bits ^= (bits >>> 4);
10              bits ^= (bits >>> 8);
11              bits ^= (bits >>> 16);
12              bits ^= (bits >>> 32);
13              result |= ((((int)bits) & 1) << j);
14          }
15          return result;
16      }
```

In this example, a programmed method "hash" (which may be coded in the Java™ programming language) may be used to apply a hash function to an input bit vector and to produce a hash value bit vector. In this example, the programmed method accepts two arguments: a bit vector "x" represented as a long value (declared in line 01), and a hash function "hf" represented as a BitMatrixVector data structure (declared in line 02). In this example, a local variable "n" (declared in line 03) is set to the number of rows in the bit matrix stored in the field "A" of the hash function data structure "hf", and a local variable "result" (declared in line 04) is initialized to the bit vector stored in the field "y" of the hash function data structure "hf". In this example, the body of the loop on lines 05 through 14 multiplies the bit matrix "hf.A" by the bit vector "x" (one bit at a time) and adds a resulting bit to the local variable "result" (at line 13).

More specifically, for each iteration j of the loop (as j ranges from 0 up to but not including n), a local variable "bits" (declared in line 06) is set to the bitwise AND of row j of the matrix "hf.A" and he bit vector "x". Thereafter, lines 07 through 12 perform a "parity" computation on the bits of the integer value in the variable "bits". The result of this operation is that the low-order bit is set to 1 if the original value in "bits" had an odd number of 1-bits, but is set to 0 if the original value in "bits" had an even number of 1-bits. Therefore, the low-order bit of the variable "bits", after execution of lines 06 through 12, represents the dot product of row j of the matrix "hf.A." and the bit vector "x", which is one bit of the desired result of multiplying the entire matrix "hf.A" by the bit vector "x". In this example, the code on line 13 isolates that low-order bit, shifts it left by j positions, and uses an XOR computation to update just that bit position within the variable "result". Line 15 then returns the constructed bit vector, represented as an integer value, as the output of the programmed method.

As previously noted, the systems described herein may be configured to generate pairs of hash functions, each of which performs bit matrix multiplication, and to determine their suitability for use in lookup circuits, including, but not limited to, those illustrated herein. One embodiment of a method for generating a pair of hash functions and determining its suitability fur hashing a collection of keys is illustrated by the flow diagram in FIG. 8. As illustrated at 810, in this example, the method may include receiving inputs specifying a collection of keys, the desired number of rows and columns in each bit matrix, and a retry limit. In some embodiments, the inputs may also specify a sparseness constraint and/or a particular random or pseudorandom number generator. In this example, the method may include generating two random bit matrices, each having the specified number of rows and columns (as in 820), and generating two random bit vectors, each having a number of bits equal to the number of rows in the matrices (as in 830).

Figure 8:
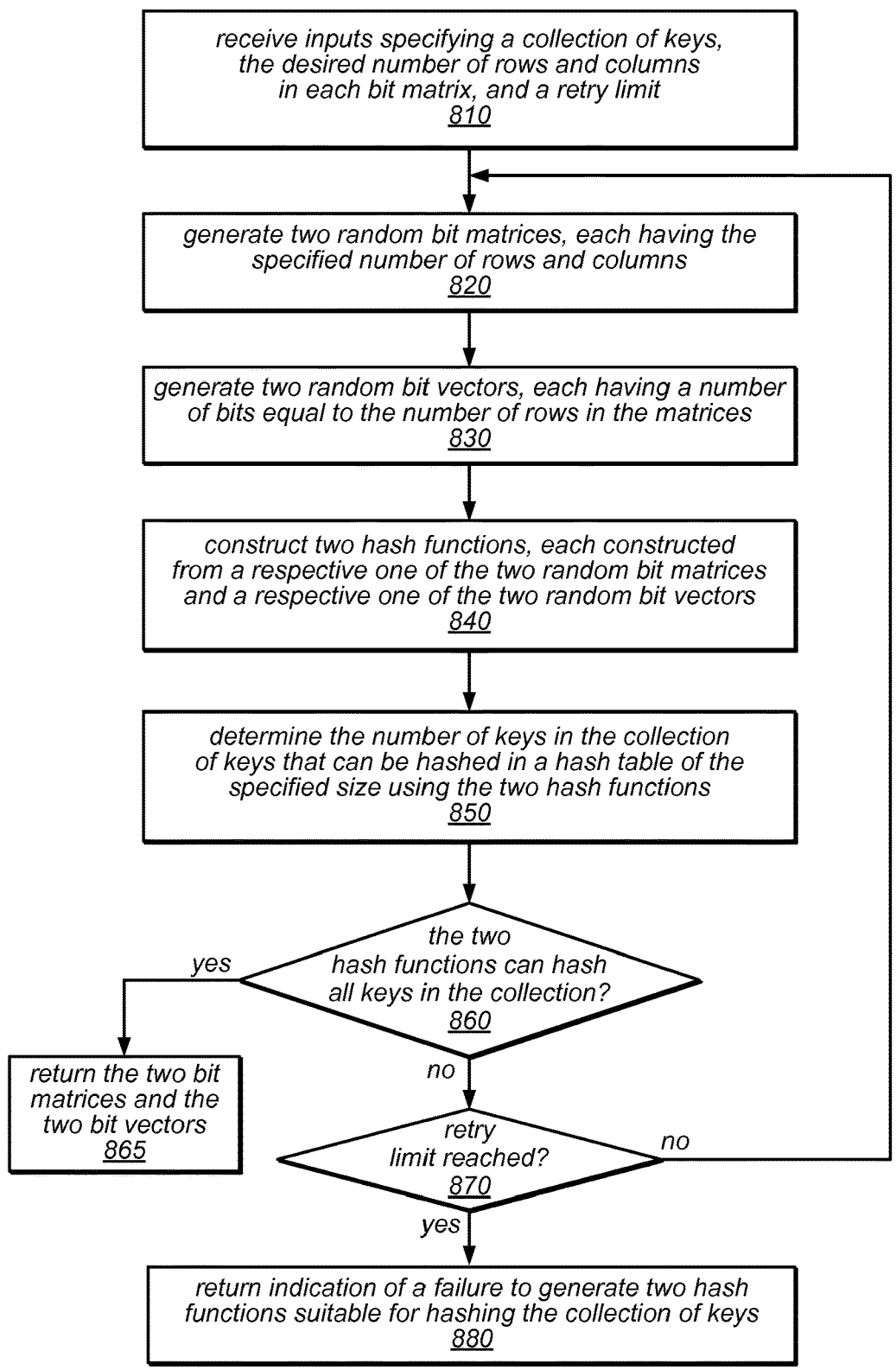
FIG. 8 is a flow diagram illustrating one embodiment of a method for generating a pair of hash functions and determining its suitability for hashing a collection of keys.

As illustrated in FIG. 8, the method may include constructing two hash functions, each of which is constructed from a respective one of the two random bit matrices and a respective one of the two random bit vectors, as in 840. The method may also include determining the number of keys in the collection of keys that can be hashed in a hash table of the specified size using the two hash functions, as in 850. If it is determined that the two hash functions can hash all of the keys in the collection of keys (shown as the positive exit from 860), the method may include returning the two random bit matrices and the two random bit vectors (as in 865). However, if it is determined that fewer than all of the keys in the collection of keys can be hashed by the two hash functions (shown as the negative exit from 860), and while a pre-defined retry limit has not yet been reached (shown as the negative exit from 870), the method may include repeating the operations in 820-860 until a suitable pair of hash functions is identified or until the retry limit has been reached. If the retry limit is reached without identifying a suitable pair of hash functions (shown as the positive exit from 870), the method may include returning an indication of a failure to generate two hash functions that are suitable for hashing the collection of keys, as in 880.

In some embodiments, the methods described herein for generating a pair of hash functions may be implemented using program instructions that when executed on one or more computers cause the computer to perform these methods. One embodiment of a programmed method that may be used to generate a pair of hash functions is illustrated by the pseudocode below.

```
01    static BitMatrixVector[ ] findHash (long [ ] keys,
02            int maxTries,
03            int nrows,
04            int ncols,
05            int maxOnes,
06            boolean exact
07            boolean oneLessForSomeRows,
08            Random rng) {
09        assert 0 < maxTries;
10        assert 0 < nrows && nrows ≤ 32;
11        assert 0 < ncols && ncols ≤ 64;
12        assert 1 < maxOnes && maxOnes ≤ ncols;
```

-continued

```
13        final int[ ] ht = new int [1 << nrows];
14        for (int k = 0; k < maxTries; k++) {
15            final long[ ] A1 =
16                makeSparseRandomMatrix (rng, nrows, ncols, maxOnes,
17                    exact, oneLessForSomeRows);
18            final long[ ] A2 =
19                makeSparseRandomMatrix (rng, nrows, ncols, maxOnes,
20                    exact, oneLessForSomeRows);
21            final int y1 = rng.nextLong( ) >>> (64 − nrows);
22            final int y2 = rng.nextLong( ) >>> (64 − nrows);
23            final BitMatrixVector hf1 = new BitMatrixVector(A1, y1);
24            final BitMatrixVector hf1 = new BitMatrixVector(A2, y2);
25            if (oneTest(keys, hf1, hf2, ht) = = keys.length) {
26                return new BitMatrixVector[ ] {hf1, hf2};
27            }
28        }
29        return null;
30    }
```

In this example, a programmed method "findHash" (which may be coded in the Java™ programming language) may be used to generate a pair of bit-matrix-plus-bit-vector hash functions suitable for hashing a given set of keys within a hash table of specified size (or, alternatively, reporting a failure to find such a pair of hash function after a specified number of attempts). In this example, the programmed method accepts eight arguments: a set of key values "keys" represented as an array of distinct long values (declared in line 01), a maximum number of attempts "maxTries" represented as an integer value (declared in line 02), a generator of random (or pseudorandom) numbers "rng" (declared in line 03), the desired number of rows in each matrix "nrows" (declared in line 04), the desired number of columns in each matrix "ncols" (declared in line 05), an upper bound on the number of 1-bits in each row of each generated matrix "maxOnes" (declared in line 06), a flag "exact" (declared in line 07) that, if true, indicates that "maxOnes" should be treated as an exact requirement on the number of 1-bits per row rather than an upper bound, and a flag "oneLessForSomeRows" (declared in line 08) that, if true, indicates that a value one smaller than "maxOnes" should be used as the exact or maximum number of 1-bits for even-numbered rows of each matrix.

In this example, the assertion in line 09 requires that the maximum number of attempts "maxTries" be strictly positive; the assertion in line 10 requires that the number of rows "nrows" be strictly positive; the assertion in line 11 requires that the number of columns "ncols" be strictly positive and not greater than 64; and the assertion in line 12 requires that the "maxOnes" be strictly positive and not greater than "ncols". In this example, line 13 allocates a new array of size $2^{nrows}$ and gives it the name "ht". In some embodiments, the size of this array may make it suitable for indexing with an integer value representing a bit vector of length "nrows".

In the example pseudocode shown above, the body of the loop on lines 14 through 28 makes a number of attempts (the number of attempts being up to "maxTries") to identify a suitable pair of hash functions. Lines 15 through 17 include a call to a programmed method "makeSparseRandomMatrix" (such as the programmed method "makeSparseRandomMatrix" shown above) to generate a first fresh, randomly chosen bit matrix and to give the first matrix the name "A1". Similarly, lines 18 through 20 include a call to a programmed method "makeSparseRandomMatrix" (such as the programmed method "makeSparseRandomMatrix" shown above) to generate a second fresh, randomly chosen bit matrix and to give the second matrix the name "A2". In this example, line 21 calls the method "rng.nextLong" to generate a long value whose bits are uniformly random, shifts this value right by (64-"nrows") positions to produce a value representing a first bit vector containing a number of random bits that is equal to "nrows", and gives the first bit vector the name "y1". Similarly, line 22 calls the method "rng.nextLong" to generate a long value whose bits are uniformly random, shifts this value right by (64-"nrows") positions to produce a value representing a second bit vector containing a number of random bits that is equal to "nrows", and gives the second bit vector the name "y2".

In this example, line 23 constructs a new "BitMatrixVector" data structure that stores the bit matrix "A1" and the bit vector "y1", which collectively represent a first hash function, and gives the data structure the name "hf1". Similarly, line 24 constructs a new "BitMatrixVector" data structure that stores the bit matrix "A2" and the bit vector "y2", which collectively represent a second hash function, and gives the data structure the name "hf2". In some embodiments, each of the first hash function represented by "hf1" and the second hash function represented by "hf2" may be suitable for computing a hash value bit vector of length "nrows" when applied to a key bit vector of length "ncols". Line 25 includes a call to a programmed method "oneTest" (described in detail below) that takes four arguments (in this case, "keys", "hf1", "hf2" and "ht"), and tests the two hash functions represented by hf1 and hf2 for suitability. For example, if the integer result returned from the call to "oneTest" equals the number of keys in the set "keys", the pair of hash functions is deemed suitable for hashing the given set of keys, and line 26 is executed. In this example, line 26 returns the pair of hash functions, represented as a length-2 array of "BitMatrixVector" values, as the output of the programmed method. In this example, if the loop on lines 14 through 28 completes normally (i.e., if this loop is executed "maxTries" complete iterations without finding a suitable pair of hash functions), then line 29 returns "null" as the output of the programmed method, indicating a failure to generate a suitable pair of hash functions.

In some embodiments, the methods described herein for testing a pair of hash functions may be implemented using program instructions that when executed on one or more computers cause the computer to perform these methods. One embodiment of a programmed method that may be used to test a pair of hash functions is illustrated by the pseudocode below.

```
01    static int oneTest (long [ ] keys,
02                        BitMatrixVector hf1,
03                        BitMatrixVector hf2,
04                        int[ ] ht) {
05        final int nkeys = keys.length;
06        final int htlen = ht.length;
07        for (int j = 0; j < htlen; j++) ht[j] = j;
08        for (int k = 0; k < nkeys; k++) {
09            final int v1 = hash(keys[k], hf1);
10            final int v2 = hash(keys[k], hf2);
11            if (!contingentUnion(ht, v1, v2)) {
12                return k;
13            }
14        }
15        return nkeys;
16    }
```

In this example, a programmed method "oneTest" (which may be coded in the Java™ programming language) tests a pair of bit-matrix-plus-bit-vector hash functions to determine whether they are suitable for hashing a given set of keys within a hash table of specified size. The returned result indicates the number of keys that were (or can be) successfully handled using the tested pair of hash functions. In this example, the programmed method accepts four arguments: a set of key values "keys" represented as an array of distinct long values (declared in line 01), a first hash function "hf1" represented as a BitMatrixVector data structure (declared in line 02), a second hash function "hf2" represented as a BitMatrixVector data structure (declared in line 03), and a work array "ht" represented as an array of integer values.

In the pseudocode above, the programmed method "oneTest" treats the array "ht" as if it were a collection of sets to be processed by a modified union-find type algorithm. More specifically, for each key in the set of key values "keys", the programmed method "oneTest" uses the first hash function "hf1" and the second hash function "hf2" to compute two hash value bit vectors, and then calls a programmed method "contingentUnion" (several variations of which are described in detail below) to determine whether the two bit vectors belong to the same set. If the two bit vectors belong to the same set, then the key is deemed not to have been successfully processed using the tested pair of hash functions. However, if the two bit vectors do not belong to the same set, then the two sets are merged and the key is deemed to have been successfully processed using the tested pair of hash functions.

In this example, line 05 declares a local variable "nkeys" and gives it a value equal to the number of keys in the set represented by the array "keys". Line 06 declares a local variable "htlen" and gives it a value equal to the number of entries in the work array "ht". In this example, the work array "ht" is used to store a collection of sets to be processed by a modified union-find type algorithm. Specifically, each valid index into the array "ht" represents a bit vector of length n, where the array "ht" is of size "htlen"=$2^n$ for some integer value n, and the array entry at index j, for all values j from 0 up to (but not including) "htlen", is the bit vector that is the parent of j for the purposes of the modified union-find type algorithm. Line 07 contains a loop that effectively performs a MAKE-SET operation on every bit vector represented by an integer from 0 up to (but not including) "htlen". More specifically, every element of the work array "ht" is set equal to its own index, in effect making every entry its own parent and therefore its own singleton set.

In this example, the loop on lines 08 through 14 performs "nkeys" iterations, and on each iteration attempts to successfully process one key from the array "keys". On a given iteration k of the loop, line 09 calls the programmed method "hash" with two arguments (in this case, the key bit-vector "keys[k]" and the first hash function "Hf1") to produce a first hash value bit vector that is given the name "v1". Similarly, line 10 calls the programmed method "hash" with two arguments (in this case, the key bit-vector "keys[k]" and the second hash function "hf2") to produce a second hash value bit vector that is given the name "v2". The programmed method "contingentUnion" is called in line 11 with three arguments: the array "ht", the first hash value bit vector "v1", and the second hash value bit vector "v2". The programmed method "contingentUnion" returns a Boolean value indicating whether it was able to successfully process bit vectors "v1" and "v2". If the call to "contingentUnion" produces the value false, then line 12 returns the value "k" as the output of the programmed method, indicating that only "k" keys were successfully processed using the tested pair of hash functions before this failure was detected. However, if the loop on lines 08 through 14 completes normally, having executed "nkeys" complete iterations without finding a key for which the "contingentUnion" test failed, then line 15 returns "nkeys" as the output of the programmed method, indicating that all the keys were successfully processed using the tested pair of hash functions.

Figure 9A:
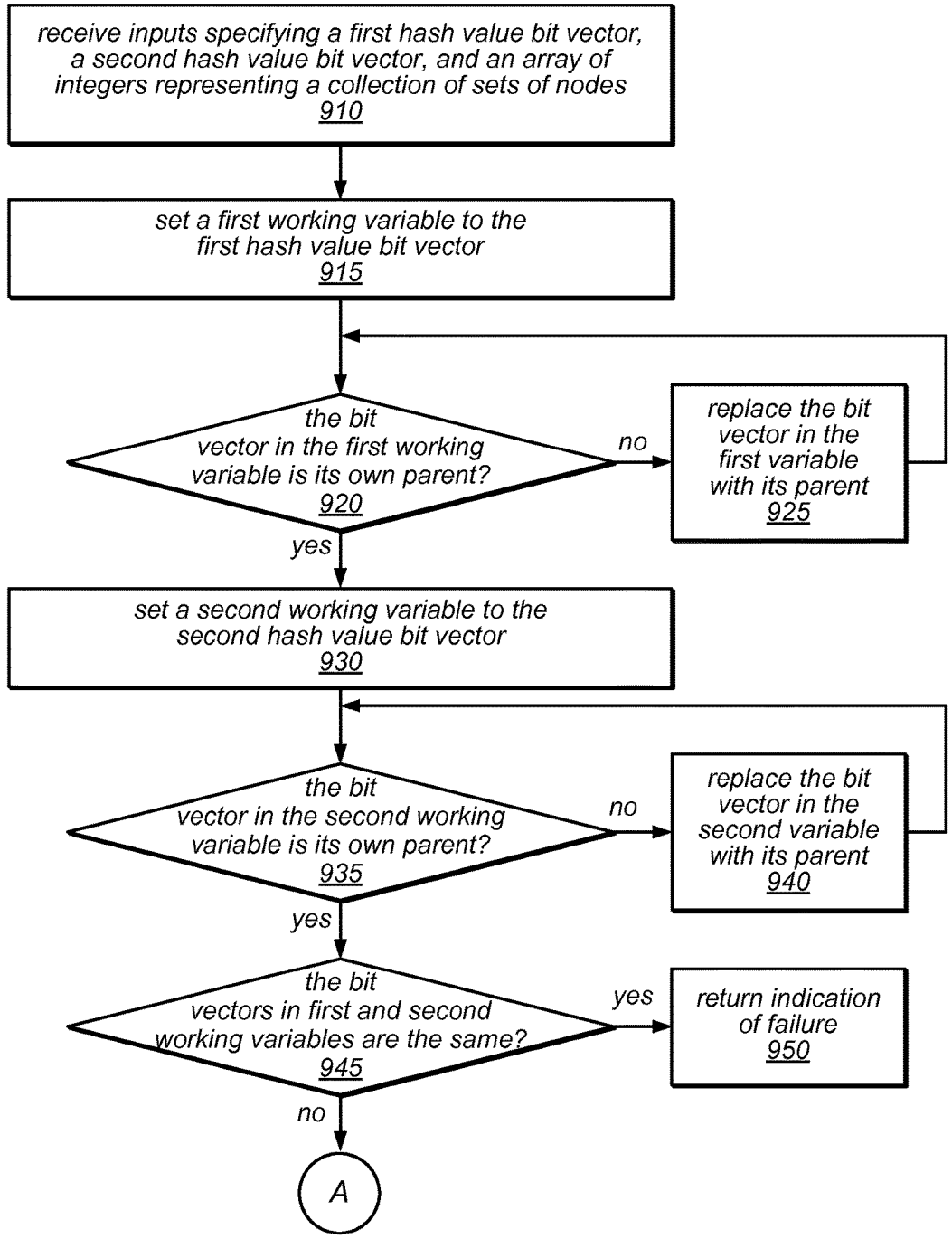
FIGS. 9A-9B illustrate one embodiment of a method for testing two hash value bit vectors using a union-find type operation that includes path compression and no rank test.
Figure 9B:
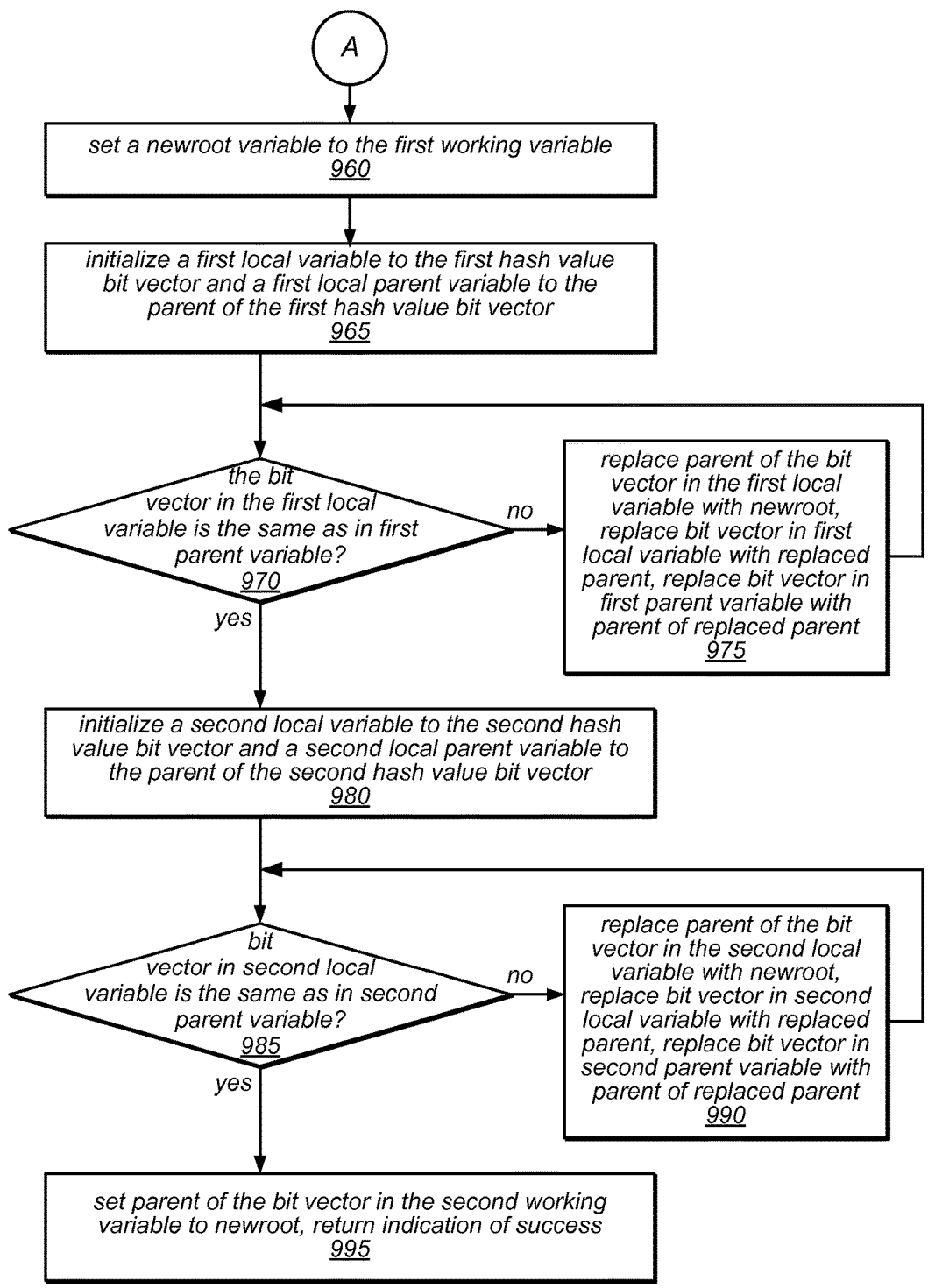

One embodiment of a method for testing two hash value bit vectors using a union-find type operation (e.g., a "contingentUnion" method) that includes path compression and no rank test is illustrated by the flow diagram in FIGS. 9A-9B. As illustrated at 910, in this example, the method may include receiving inputs specifying a first hash value bit vector, a second hash value bit vector, and an array of integers representing a collection of sets. For example, the inputs may include hash value bit vectors that were generated as a result of applying two hash functions in a candidate pair of hash functions to a key. Note that in some embodiments, the inputs may also include an identifier of a working matrix that is allocated for the use of the testing operation. In some embodiments, the information in the array may include, for each of multiple sets of nodes (each of which represents a hash value bit vector), information identifying each of the nodes in the set and the parent of each node in the set. In the example illustrated in FIG. 9A, the method may include beginning an operation to identify the roots of one or more directed graphs for respective sets of nodes that include the hash value bit vectors.

The operation to identify the roots of the directed graphs may include setting a first working variable to the first hash value bit vector, as in 915, and determining whether the bit vector in the first working variable is its own parent, as in 920. While the bit vector in the first working variable is not its own parent, the method may include repeatedly replacing the bit vector in the first variable with its parent. This is illustrated in FIG. 9A by the path from the negative exit of 920 to 925, and from 925 back to the input of 920. Once the first working variable contains a bit vector that is its own parent (i.e., the root of a directed graph for a set of nodes), shown as the positive exit from 920, the method may include setting a second working variable to the second hash value bit vector, as in 930, and determining whether the bit vector in the second working variable is its own parent, as in 935. While the bit vector in the second working variable is not its own parent, the method may include repeatedly replacing the bit vector in the second variable with its parent, as in 925. This is illustrated in FIG. 9A by the path from the negative exit of 935 to 940, and from 940 back to the input of 935.

Once the second working variable contains a bit vector that is its own parent (i.e., once the root of a directed graph for a set of nodes that includes the second hash value bit vector has been identified), shown as the positive exit from 935, the method may include determining whether the bit vectors in first and second working variables are the same. If so, shown as the positive exit from 945, this may indicate that the first and second hash value bit vectors were in the same set of nodes. In this case, the method may include returning an indication of failure, as in 950. However, if the bit vectors in the first and second working variables are not the same (shown as the negative exit from 945), the method may include beginning an operation to merge the sets that include the first and second hash value bit vectors (as shown following connector element A in FIG. 9B). In this example, the merge operation may include following a chain of pointers to the parents of the bit vectors in each set, and updating all of the nodes in both sets so that they to point to the same root (i.e., the root of a new set formed by merging the sets that include the first and second hash value bit vectors).

As illustrated in FIG. 9B, merging the two sets may include setting a newroot variable to the first working variable, as in 960. The method may also include initializing a first local variable to the first hash value bit vector and a first local parent variable to the parent of the first hash value bit vector, as in 965. In this example, while the bit vector in the first local variable is not the same as the bit vector in the first local parent variable (shown as the negative exit from 970), the method may include, repeatedly: replacing the parent of the bit vector in the first local variable with newroot, replacing the bit vector in the first local variable with the replaced parent, and replacing the bit vector in the first local parent variable with the parent of the replaced parent, as in 975. In some embodiments, replacing these elements may involve updating the information in the input array to change various pointers (e.g., pointers in each node that point to the parent of the node). Once the bit vector in the first local variable is the same as the bit vector in the first local parent variable (shown as the positive exit from 970), the root of the set that contains the first hash value bit vector has been found and all of the pointers in that set have been updated to "newroot", thus achieving a path compression for the nodes in the set. At that point, the method may include performing similar operations for the set that includes the second hash value bit vector.

As illustrated in FIG. 9B, the method may include initializing a second local variable to the second hash value bit vector and a second local parent variable to the parent of the second hash value bit vector, a sin 980. In this example, while the bit vector in the first local variable is not the same as the bit vector in the first local parent variable (shown as the negative exit from 985), the method may include, repeatedly: replacing the parent of the bit vector in the second local variable with newroot, replacing the bit vector in the second local variable with the replaced parent, and replacing the bit vector in the second local parent variable with the parent of the replaced parent, as in 990. In some embodiments, replacing these elements may involve updating the information in the input array to change various pointers (e.g., pointers in each node that point to the parent of the node). Once the bit vector in the second local variable is the same as the bit vector in the second local parent variable (shown as the positive exit from 985), the root of the set that contains the second hash value bit vector has been found and all of the pointers in that set have been updated to "newroot", thus achieving a path compression for the nodes in the set. At that point, the method may include setting the parent of the bit vector in the second working variable to newroot, and returning an indication of success (as in 995). In this example, all of the nodes in the two sets that originally included the first and second hash value bit vectors have been merged into a single set whose root is equal to the root of the set that originally contained the first hash value bit vector.

As previously noted, the programmed method "oneTest", described above, may call any one of a number of variations of a "contingentUnion" method that may be used to determine whether two bit vectors belong to the same set, in different embodiments, including, but not limited to, those described below as "contingentUnion1", "contingentUnion2", "contingentUnion3" "contingentUnion4", "contigentUnion5". One embodiment of such a method (in this case, a programmed method that may be used to test two hash value bit vectors using a modified union-find type algorithm that includes path compression, but no rank test is illustrated by the pseudocode below.

```
01    static boolean contingentUnion1 (int [ ] ht, int v1, int v2) {
02        int w1 = v1;
03        while (ht[w1] != w1) { w1 = ht[w1]; }
04        int w2 = v2;
05        while (ht[w2] != w2) { w2 = ht[w2]; }
06        if (w1 = = w2) return false:
07        final int newroot = w1;
08        int x1 = v1; int y1 = ht[x1];
09        while (y1 != x1) { ht[x1] = newroot; x1 = y1; y1 = ht[x1]; }
10        int x2 = v2; int y2 = ht[x2];
11        while (y2 != x2) { ht[x2] = newroot; x2 = y2; y2 = ht[x2]; }
12        ht[w2] = newroot:
13        return true;
14    }
```

In this example, a programmed method "contigentUnion1" (which may be coded in the Java™ programming language) tests two hash value bit vectors derived from one key as part of a process to test a pair of bit-matrix-plus-bit-vector hash functions to determine whether they are suitable for hashing a given set of keys within a hash table of specified size. The returned result is a Boolean value that is true if, and only if the given bit vectors were successfully handled. In this example, the programmed method accepts three arguments: a work array "ht" represented as an array of integer values (declared in line 01), a first hash value bit vector "v1" represented as an integer value (also declared in line 01), and a second hash value bit vector "v2" represented as an integer value a so declared in line 01).

In the pseudocode above, the programmed method "contigentUnion1" treats the array "ht" as if it were a collection of sets to be processed by a modified union-find type algorithm. More specifically, the programmed method "contigentUnion1" uses a modified union-find type algorithm to determine whether the two bit vectors belong to the same set. If the two bit vectors belong to the same set, then the bit vectors are deemed not to have been successfully processed. However, if the two bit vectors do not belong to the same set, then the two sets are merged and the bit vectors are deemed to have been successfully processed.

In this example, line 02 declares a local variable "w1" and initializes it to the value "v1". As long as the bit vector represented by "w1" is not its own parent (according to the collection-of-sets information in the array "ht"), the loop in line 03 repeatedly replaces the bit vector in "w1" with its parent. Note that upon completion of the loop in line 03, "w1" holds the representative of the set containing "v1" (that is, the root of the tree containing "v1"). Similarly, line 04 declares a local variable "w2" and initializes it to the value "v2". As long as the bit vector represented by "w2" is not its own parent (according to the collection-of-sets information in the array "ht"), the loop in line 05 repeatedly replaces the bit vector in "w2" with its parent. Note that upon completion of the loop in line 05, "w2" holds the representative of the set containing "v2" (that is, the root of the tree containing "v2"), In the psuedocode above, line 06 compares the bit vector in "w1" to the bit vector in "w2". If they are the same, then the value false is returned as the results of the programmed method, indicating that the bit vectors "v1" and "v2" were not successfully handled. Note that if "w1" is equal to "w2", then "v1" and "v2" must have been members of the same set on entry to the programmed method "contingentUnion1".

In this example, line 07 declares a local variable "newroot" and initializes it to "w1". This will become the new root of a new tree representing the merging of the set containing "v1" and the set containing "v2". Line 08 declares a local variable "x1" and initializes it to "v1", and also declares a local variable "y1" and initializes it to the parent of "v1". In this example, as long as the bit vector in variable "x1" is not equal to its parent (in the variable "y1"), the loop in line 09 repeatedly alters the parent of "x1" to be "newroot", replaces that bit vector with its parent in the variable "x1", and updates "y1" to be the parent of that parent. In some embodiments, whenever the loop test "y1!=x1" is executed, "y1" will always contains the bit vector that is the parent of the bit vector that is in "x1". Note that upon completion of the loop in line 09, each bit vector originally on the path from "v1" (inclusive) to "w1" (exclusive) has had its parent updated to be "newroot", thus accomplishing a path compression. Similarly, line 10 declares a local variable "x2" and initializes it to "v2", and also declares a local variable "y2" and initializes it to the parent of "v2". In this example, as long as the bit vector in variable "x2" is not equal to its parent (in the variable "y2"), the loop in line 11 repeatedly alters the parent of "x2" to be "newroot", replaces that bit vector with its parent in the variable "x2", and updates "y2" to be the parent of that parent. In some embodiments, whenever the loop test "y2!=x2" is executed, "y2" will always contains the bit vector that is the parent of the bit vector that is in "x2". Note that upon completion of the loop line 11, each bit vector originally on the path from "v2" (inclusive) to "w2" (exclusive) has had its parent updated to be "newroot", thus accomplishing a path compression.

In this example, line 12 changes the parent of the bit vector "w2" to be "newroot". Note that following the execution of line 12, the tree that originally contained "v1" and the tree that originally contained "v2" will have been merged to form a single tree whose root is "newroot", which is equal to "w1". In this example, line 13 returns the value true as the result of the programmed method, indicating that the bit vectors "v1" and "v2" were successfully handled. Note that if "w1" is not equal to "w2", then "v1" and "v2" must have been members of different sets on entry to the programmed method "contingentUnion1".

As described above, the programmed method "contigentUnion1" operates, under certain conditions, to perform a UNION operation on two sets containing the bit vectors in the variables "v1" and "v2". However, unlike with some existing approaches, the UNION operation performed by the programmed method "contingentUnion1" does not use a rank test, thus avoiding the cost of rank bookkeeping. Note that the programmed method "contigentUnion1" described above does not make two calls to a separate procedure to perform a FIND-SET operation, as is the case with some existing approaches. Instead, various portions of the programmed method "contigentUnion1" perform different parts of two FIND-SET operations in an in-lined and interleaved fashion. Note also that the UNION operation performed by the programmed method "contigentUnion1" described above uses path compression optimization, and that the path compression optimization performed by the programmed method "contigentUnion1" differs from the path compression optimization used with some existing approaches. For example, unlike in these previous approaches, the programmed method "contigentUnion1" does not perform path compression separately within each of two trees, then choose a new root, then link the trees. Instead, the programmed method "contigentUnion1" chooses a new root, then compresses each path using the new root, then links the trees, which results in all bit vectors originally on the path from "v2" (inclusive to "w2" (exclusive) having "newroot" (that is, "w1") as their parent rather than "w2" (which is not the root of the new tree).

In some embodiments, in-lining and/or interleaving various parts of two FIND-SET type operations (as in the programmed method "contigentUnion1") may allow a test for successful handling of a key to be performed (e.g., as in line 11) before either of the FIND-SET type operations has been completely executed, and specifically before any of the path compression has been performed.

As previously noted, in some embodiments, the systems described herein may, as a part of testing for the suitability of a pair of hash functions, perform a modified union-find type operation that includes a limited distance-from-root test. Performing such a test may allow special cases for the structure of the chains of nodes in the sets that include the hash value bit vectors generated by those hash functions to be identified prior to executing the standard processing loops of the modified union-find type operation and may allow these special cases to be handled outside of those loops using exception processing. In some embodiments, this approach to the identification and handling of these special cases may significantly reduce the amount of time and/or processing required to test the pair of hash functions because at least some of the operations that would otherwise be performed as part of the modified union-find type operation may be elided for these cases.

Figure 10:
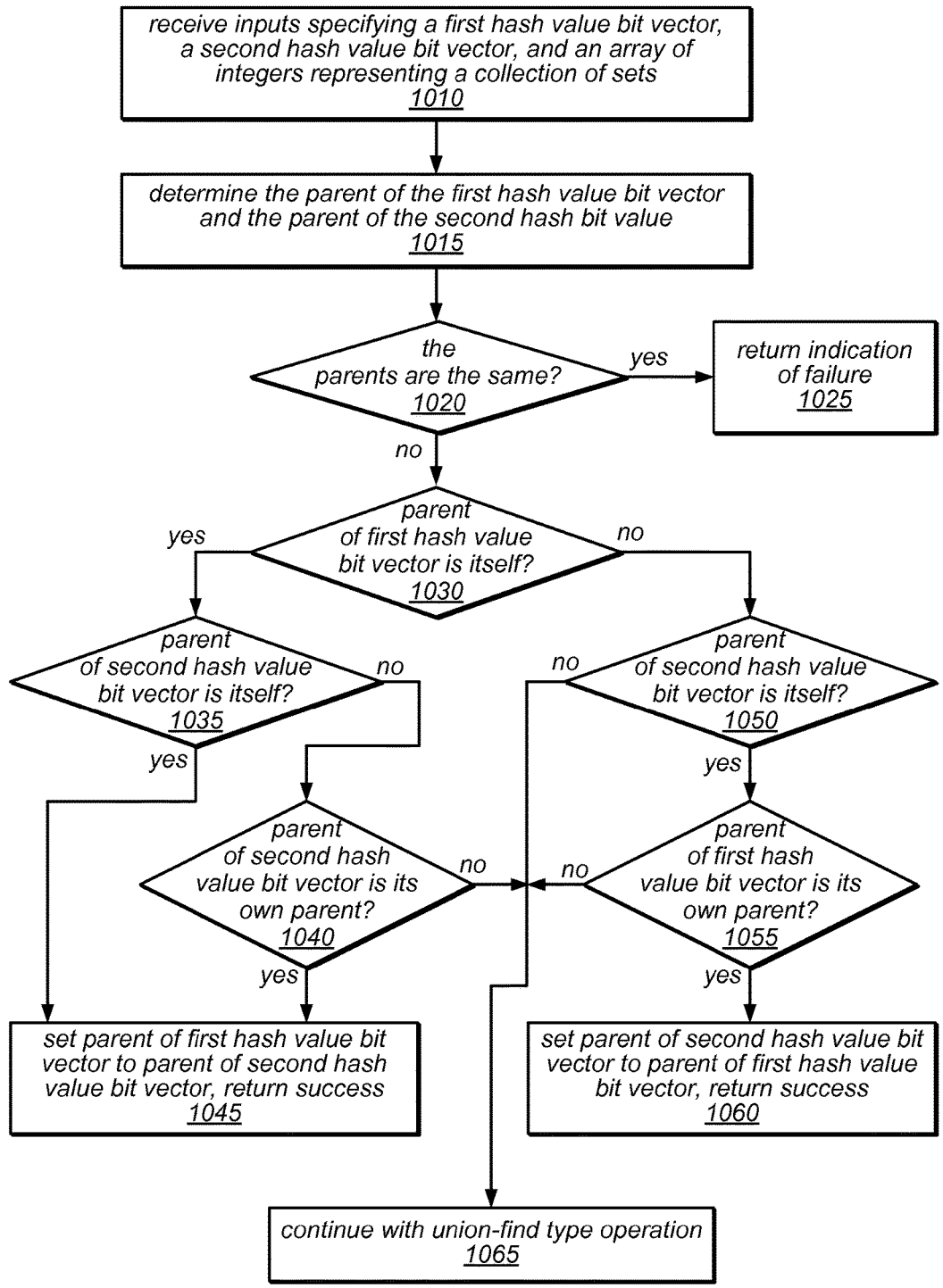
FIG. 10 is a flow diagram illustrating one embodiment of a method for performing a limited distance-from-root test.

One embodiment of a method for performing a limited distance-from-root test (e.g., one that may be performed up front by a modified union-find type operation) is illustrated by the flow diagram in FIG. 10. As illustrated at 1010, in this example, the method may include receiving inputs specifying a first hash value bit vector, a second hash value bit vector, and an array of integers representing a collection of sets. For example, the inputs may include hash value bit vectors that were generated as a result of applying two hash functions in a candidate pair of hash functions to a given key. In some embodiments, the information in the array may include, for each of multiple sets of nodes (each of which represents a hash value bit vector), information identifying each of the nodes in the set and the parent of each node in the set. In this example, the method may include determining the parent of the first hash value bit vector and the parent of the second hash bit value, as in 1015. In this example, if the parents of the first and second hash value bit vectors are the same (shown as the positive exit from 1020), this may indicate that the first and second hash value bit vectors belong to the same set, meaning that the pair of hash functions used to generate the first and second hash value bit vectors is not suitable for hashing the given key (or the target collection of keys). In this case, the method may include returning an indication of failure, as in 1025.

If the parents of the first and second hash value bit vectors are not the same (shown as the negative exit from 1020), but if the parent of the first hash value bit vector is itself (shown as the positive exit from 1030) and either the parent of the second hash value bit vector is itself (shown as the positive exit from 1035) or the parent of the second hash value bit vector is its own parent (shown as the positive exit from 1040), the method may include setting the parent of the first hash value bit vector to the parent of second hash value bit vector, and returning an indication of success, as in 1045, without having to perform all of the remaining operations of the union-find type operation illustrated in FIGS. 9A-9B. In some embodiments, this may involve updating pointer information in the input array (e.g., updating a pointer in the node corresponding to the parent of the first hash value bit vector that points to its parent). In this case, the special case that was identified was that the first hash value bit vector was at a distance 0 from its root and the second hash value bit vector was at a distance 0 or 1 from its root. In this case, the second hash value bit vector was at a distance from its root that was greater than or equal to the distance of the first hash value bit vector from its root, and the two sets were merged to form a single set having the same root as the set that contained the second hash value bit vector. In this example, if the parents of the first and second hash value bit vectors are not the same (shown as the negative exit from 1020) and the parent of the first hash value bit vector is itself (shown as the positive exit from 1030) but neither the parent of the second hash value bit vector is itself (shown as the negative exit from 1035) nor the parent of the second hash value bit vector is its own parent (shown as the negative exit from 1040), the method may include continuing to perform the remaining operations of the modified union-find type operation, as in 1065.

In the example illustrated in FIG. 10, if the parent of the first hash value bit vector is not itself (shown as the negative exit from 1030), but the parent of the second hash value bit vector is itself (shown as the positive exit from 1050) and the parent of the first hash value bit vector is its own parent (shown as the positive exit from 1055), the method may include setting the parent of the second hash value bit vector to the parent of first hash value bit vector, and returning an indication of success, as in 1060, without having to perform all of the remaining operations of the union-find type operation illustrated FIGS. 9A-9B. In some embodiments, this may involve updating pointer information in the input array (e.g., updating a pointer in the node corresponding to the parent of the first hash value bit vector that points to its parent). In this case, the special case that was identified was that the second hash value bit vector was at a distance 0 from its root and the first hash value bit vector was at a distance 1 from its root. In this case, the first hash value bit vector was at a distance from its root that was greater than or equal to the distance of the second hash value bit vector from its root, and the two sets were merged to form a single set having the same root as the set that contained the first hash value bit vector. In this example, if the parent of the first hash value bit vector is not itself (shown as the negative exit from 1030), and either the parent of the second hash value bit vector is not itself (shown as the negative exit from 1050) or the parent of the first hash value bit vector is not its own parent (shown as the negative exit from 1055), the method may include continuing to perform the remaining operations of the modified union-find type operation, as in 1065.

As previously noted, the programmed method "oneTest", described above, may call any one of a number of variations of a "contingentUnion" method that may be used to determine whether two bit vectors belong to the same set, in different embodiments. One embodiment of a programmed method that may be used to test two hash value bit vectors using a modified union-find type algorithm that includes path compression and a limited distance-from-root test is illustrated by the pseudocode below.

```
01    static boolean contingentUnion2 (int [ ] ht, int v1, int v2) {
02        int z1 = ht[v1];
03        int z2 = ht[v2];
04        if (z1 = = z2) return false;
05        if (z1 = = v1) {
06            if (z2 = = v2 || z2 = = ht[z2]) {
07                ht[v1] = z2; return true;
08            }
09        } else if (z2 = = v2 && z1 = = ht[z1]) {
10            ht[v2] = z1; return true;
11        }
12        int w1 = v1;
```

```
13          while (true) {
14              int q1 = ht[w1]; if (q1 = = w1) break;
15                  w1 = ht[q1]; if (w1 = = q1) break; }
16          int w2 = v2;
17          while (true) {
18              int q2 = ht[w2]; if (q2 = = w2) break;
19                  w2 = ht[q2]; if (w2 = = q2) break; }
20          if (w1 = = w2) return false;
21          final int newroot = w1;
22          int x1 = v1;
23          while (true) {
24              int y1 = ht[x1]; if (y1 = = w1) break; ht[x1] = newroot;
25                  x1 = ht[y1]; if (x1 = = w1) break; ht[y1] = newroot;
26          int x2 = v2;
27          while (true) {
28              int y2 = ht[x2]; if (y2 = = w2) break; ht[x2] = newroot;
29                  x2 = ht[y2]; if (x2 = = w2) break; ht[y2] = newroot;
30          ht[w2] = newroot;
31          return true;
32      }
```

In this example, the programmed method "contigentUnion2" performs a modified union-find type algorithm that includes a limited distance-from-root test. The programmed method "contigentUnion2" (which may be coded in the Java™ programming language) tests two hash value bit vectors derived from one key as part of a process to test a pair of bit-matrix-plus-bit-vector hash functions to determine whether they are suitable for hashing a given set of keys within a hash table of specified size. In this example, the returned result is a Boolean value that is true if and only if the given bit vectors were successfully handled. The programmed method "contigentUnion2", like "contigentUnion1" shown above, accepts three arguments: a work array "ht" represented as an array of integer values (declared in line 01), a first hash value bit vector "v1" represented as an integer value (also declared in line 01), and a second hash value bit vector "v2" represented as an integer value (also declared in line 01).

In the pseudocode shown above, line 02 declares a local variable "z1" and initializes it to the value "ht[v1]", which is the parent of "v1". Line 03 declares a local variable "z2" and initializes it to the value "ht[v2]", which is the parent of "v2". In this example, line 04 compares the bit vector in "z1" to the bit vector in "z2". If they are the same, then the value false is returned as the result of the programmed method, indicating that the bit vectors "v1" and "v2" were not successfully handled. Note that if "z1" is equal to "z2", then "v1" and "v2" must have been members of the same set on entry to the programmed method "contigentUnion2". In this example, line 05 compares the bit vector in "v1" to the bit vector in "v1". If they are the same, then lines 06 through 08 are executed. If not, lines 09 through 11 are executed. Note that if "z1" is the same as "v1", then "v1" is the root of the tree for the set containing "v1".

In this example, line 06 compares the bit vector in "z2" to the bit vector in "v2" and, if they are different, also compares the bit vector in "z2" to the parent "ht[z2]" of "z2". In this example, if "z2" is the same as either "v2" or "ht[z2]", then "z2" is the root of the tree for the set containing "v2", and line 07 will be executed. Otherwise, the next line to be executed will be line 12. Line 07 changes the parent of the bit vector "v1" to be "z2", and then returns the value true as the result of the programmed method, indicating that the bit vectors "v1" and "v2" were successfully handled. Note that, following the execution of line 07, the tree that originally contained "v1" and the tree that originally contained "v2" will have been merged to form a single tree whose root is "z2", which is the root of the tree for the set containing "v2". Note also that, because line 07 is executed only when "v1" is the root of the tree for the set containing "v1", "v1" is at distance 0 from its tree root and "v2" is at distance 0 or 1 from its tree root. Therefore, "v2" is at a distance from its tree root that is greater than or equal to the distance of "v1" from its tree root.

In this example, line 09 compares the bit vector in "z2" to the bit vector in "v2" and, if they are the same, also compares the bit vector in "z1" to the parent "ht[z 1]" of "z1". In this example, if "z2" is the same as "v2" and "z1" is the same as "ht[z1]", then "v2" is the root of the tree for the set containing "v2" and "z1" is the root of the tree for the set containing "v1". In this case, line 10 will be executed. Otherwise, the next line to be executed will be line 12. In this example, line 10 changes the parent of the bit vector "v2" to be "z1", and then returns the value true as the result of the programmed method, indicating that the bit vectors "v1" and "v2" were successfully handled. Note that, following the execution of line 10, the tree that originally contained "v1" and the tree that originally contained "v2" will have been merged to form a single tree whose root is "z1", which is the root of the tree for the set containing "v1". Note also that, because line 10 is executed only when "v1" is not the root of the tree for the set containing "v1" and "v2" is the root of the tree for the set containing "v2", "v1" is at distance 1 from its tree root and "v2" is at distance 0 from its tree root. Therefore, "v1" is at a distance from its tree root that is greater than or equal to the distance of "v2" from its tree root.

In some embodiments, if the overall limited distance-from-root test performed by lines 05 through 11 causes the value true to be returned from the programmed method "contigentUnion2", then the root of the tree for the merged set was chosen so that it is no less distant from whichever of "v1" and "v2" originally belonged to the same set as that root than was the root of the tree for the set containing the other of "v1" and "v2". This heuristic may tend to avoid the use of a singleton set as the root of a merged set. This heuristic may also allow the common case of merging two singleton sets to be handled quickly.

Note that lines 12 through 19 of "contigentUnion2" are identical in function and general structure to lines 02 through 05 in "contigentUnion1", except that the loops on lines 03 and 05 of "contigentUnion1" have each been "unrolled" to produce the loops on lines 13 through 15 and 17 through 19, respectively, of "contigentUnion2", in some embodiments, this may improve the speed of execution of those loops in "contigentUnion2". In this example, lines 20 and 21 in "contigentUnion2" are identical in function and structure to lines 06 and 07 in "contigentUnion1". Lines 22 through 29 in "contigentUnion2" are identical in function and general structure to lines 08 through 11 in "contigentUnion1", except that the loops from "contigentUnion1" have each been "unrolled" to produce the loops on lines 23 through 25 and 27 through 29, respectively, of "contigentUnion2". In some embodiments, this may improve the speed of execution of those loops in "contigentUnion2". In this example, lines 30 and 31 of "contigentUnion2" are identical in function and structure to lines 12 and 13 of "contingentUnion1".

As described above, the programmed method "contigentUnion2" operates, under certain conditions, to perform a UNION operation on two sets containing the bit vectors in the variables "v1" and "v2". However, unlike with some existing approaches, the UNION operation performed by the programmed method "contigentUnion2" does not use a rank test, thus avoiding the cost of rank bookkeeping. Note that the UNION operation performed by the programmed method "contigentUnion2" described above uses a limited distance-from-root test, which may allow it to achieve some of the benefits of a rank test while avoiding the cost of rank bookkeeping.

Note that the programmed method "contigentUnion2" described above does not make two calls to a separate procedure to perform a FIND-SET operation, as is the case with some existing approaches. Instead, various portions of the programmed method "contigentUnion2" perform different parts of two FIND-SET operations in an in-lined and interleaved fashion.

Note also that the UNION operation performed by the programmed method "contigentUnion2" described above uses path compression optimization, and that the path compression optimization performed by the programmed method "contigentUnion2" differs from the path compression type optimization used with some existing approaches. For example, unlike in these previous approaches, the programmed method "contigentUnion2" does not perform path compression separately within each of two trees, then choose a new root, then link the trees. Instead, the programmed method "contigentUnion2" chooses a new root, then compresses each path using the new root, then links the trees, which results in all bit vectors originally on the path from "v2" (inclusive) to "w2" (exclusive) having "newroot" (that is, "w1") as their parent rather than "w2" (which is not the root of the new tree).

In some embodiments, in-lining and interleaving various parts of two FIND-SET operations (as in the programmed method "contigentUnion2") may allow a test for successful handling of a key to be performed before either of the FIND-SET operations has been completely executed, and specifically before any of the path compression has been performed.

As described above, the use of a limited distance-from-root test in a modified union-find type operation may allow special cases (e.g., short chains between the hash value bit vectors and the roots of their sets) to be identified and may allow those special cases to be processed more efficiently than those that do not meet pre-defined criteria, for exception processing. For example, the use of a limited distance-from-root test, rather than a rank test, may improve the speed of the modified union-find type algorithm since it does not require the extensive bookkeeping required to perform a full rank test. Note that some of the modified union-find type algorithms described herein may perform asymptotically worse than the standard versions of the union-find algorithm described in the literature in the general case (e.g., when processing millions of nodes and/or for chains containing thousands of nodes), but that for workloads in which special cases are identified for many, or most, of the invocations of the modified union-find operations (which may be the case when testing pairs of hash functions for use in the lookup circuits described herein), the processing of the nodes in these sets may be performed significantly faster (e.g., by a factor of two or three) using the modified union-find type operations described herein that include a limited distance-from-root test than using union-find type operations that include a full rank test.

Figure 11:
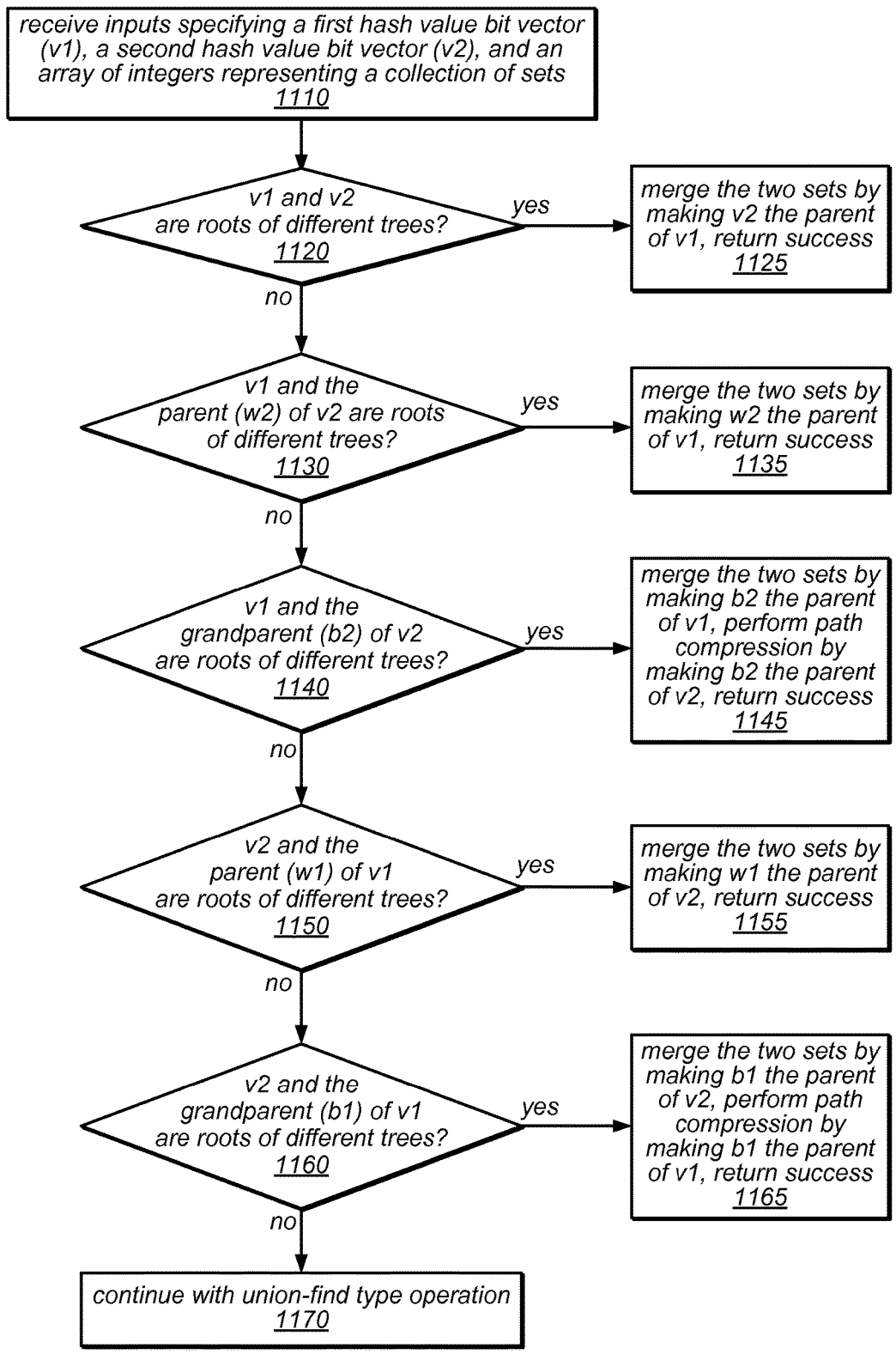
FIG. 11 is a flow diagram illustrating one embodiment of a method for performing a limited distance-from-root test that includes identifying special cases for exception handling.

One embodiment of a method for performing a more extensive limited distance-from-root test than that illustrated in FIG. 10 (one that identifies additional special cases for exception handling based on pre-defined criteria for exception processing) is illustrated by the flow diagram in FIG. 11.

As illustrated at 1110, in this example, the method may include receiving inputs specifying a first hash value bit vector (v1), a second hash value bit vector (v2), and an array of integers representing a collection of sets. For example, the inputs may include hash value bit vectors that were generated as a result of applying two hash functions in a candidate pair of hash functions to a given key. In some embodiments, the information in the array may include, for each of multiple sets of nodes (each of which represents a hash value bit vector), information identifying each of the nodes in the set and the parent of each node in the set. In this example, if v1 and v2 are the roots of different trees (shown as the positive exit from 1120), the method may include merging the two sets (i.e., the set that includes v1 and the set that includes v2) by making v2 the parent of v1, and returning an indication of success (as in 1125), without having to perform all of the remaining operations of the union-find type operation illustrated in FIGS. 9A-9B. In some embodiments, merging the two sets may involve updating pointer information in the input array, as described herein. If v1 and v2 are not the roots of different trees (shown as the negative exit from 1120), the method may include applying one or more other tests for identifying special cases.

In the example illustrated in FIG. 11, if v1 and the parent (w2) of v2 are roots of different trees (shown as the positive exit from 1130), the method may include merging the two sets (i.e., the set that includes v1 and the set that includes v2) by making w2 the parent of v1, and returning an indication of success (as in 1135), without having to perform all of the remaining operations of the union-find type operation illustrated in FIGS. 9A-9B. In some embodiments, merging the two sets may involve updating pointer information in the input array, as described herein. If v1 and the parent (w2) of v2 are not roots of different trees (shown as the negative exit from 1130), the method may include applying one or more other tests for identifying special cases.

If v1 and the grandparent (b2) of v2 are roots of different trees (shown as the positive exit from 1140), the method may include merging the two sets (i.e., the set that includes v1 and the set that includes v2) by making b2 the parent of v1, performing path compression by making b2 the parent of v2, and returning an indication of success (as in 1145)), without having to perform all of the remaining operations of the union-find type operation illustrated in FIGS. 9A-9B. In some embodiments, merging the two sets may involve updating pointer information in the input array, as described herein. If this criterion is not met (shown as the negative exit from 1140), the method may include applying one or more other tests for identifying special cases. In this example, if v2 and the parent (w1) of v1 are roots of different trees (shown as the positive exit from 1150), the method may include merging the two sets (i.e., the set that includes v1 and the set that includes v2) by making w1 the parent of v2, and returning an indication of success (as in 1155)), without having to perform all of the remaining operations of the union-find type operation illustrated in FIGS. 9A-9B. In some embodiments, merging the two sets may involve updating pointer information in the input array, as described herein. If this criterion is not met (shown as the negative exit from 1150), the method may include applying one or more other tests for identifying special cases. For example, if v2 and the grandparent (b1) of v1 are roots of different trees (shown as the positive exit from 1160), the method may include merging the two sets (i.e., the set that includes v1 and the set that includes v2) by making b1 the parent of v2, performing path compression by making b1 the parent of v1, and returning an indication of success (as in 1165), without having to perform all of the remaining operations of the union-find type operation illustrated in FIGS. 9A-9B. In some embodiments, merging the two sets may involve updating pointer information in the input array, as described herein.

As illustrated in FIG. 11, if none of the pre-defined criteria for exception processing is met (shown as the negative exit from 1160), the method may include continuing to perform the remaining operations of the union-find type operation, as in 1170.

As previously noted, the programmed method "widest", described above, may call any one of a number of variations of a "contingentUnion" method that may be used to determine whether two bit vectors belong to the same set, in different embodiments. One embodiment of a programmed method that may be used to test two hash value bit vectors using a modified union-find type algorithm that includes path compression and a broader (but still limited) distance-from-root test is illustrated by the pseudocode below.

```
01    static boolean contingentUnion3 (int [ ] ht, int v1, int v2) {
02        int w1 = ht[v1];
03        int w2 = ht[v2];
04        if (w1 = = w2) return false;
05        if (w1 = = v1) {
06            if (w2 = = v2 { ht[v1] = v2; return true; }
07            if (w2 = = v1) return false;
08            int b2 = ht[b2];
09            if (b2 = = w2) { ht[v1] = w2; return true; }
10            w2 = ht[b2];
11            if (w2 = = b2) {
12                if (b2 = = v1) return false;
13                ht[v1] = b2; ht[v2] = b2; return true;
14            }
15            while (true) { int q2 = ht[w2]; if (q2 = = w2) break;
16                          w2 = ht[q2]; if (w2 = = q2) break; }
17        else if (w2 = = v2) {
18            if (w1 = = v2) return false;
19            int b1 = ht[w1];
20            if (b1 = = w1) { ht[v2] = w1; return true; }
21            w1 = ht[b1];
22            if (w1 = = b1) {
23                if (b1 = = v2) return false;
24                ht[v2] = b1; ht[v1] = b1; return true;
25            }
26            while (true) { int q1 = ht[w1]; if (q1 = = w1) break;
27                          w1 = ht[q1]; if (w1 = = q1) break; }
28        }
29        } else {
30            while (true) { int q1 = ht[w1]; if (q1 = = w1) break;
31                          w1 = ht[q1]; if (w1 = = q1) break; }
32            while (true) { int q2 = ht[w2]; if (q2 = = w2) break;
33                          w2 = ht[q2]; if (w2 = = q2) break; }
34        }
35        if (w1 = = w2) return false;
36        final int newroot = w1;
37        int x1 = v1;
38        while (true) {
39            int y1 = ht[x1]; if (y1 = = w1) break; ht[x1] = newroot;
40            x1 = ht[y1]; if (x1 = = w1) break; ht[y1] = newroot;
41        int x2 = v2;
42        while (true) {
43            int y2 = ht[x2]; if (y2 = = w2) break; ht[x2] = newroot;
44            x2 = ht[y2]; if (x2 = = w2) break; ht[y2] = newroot;
45        ht[w2] = newroot;
46        return true;
47    }
```

In this example, a programmed method "contigentUnion3" (which may be coded in the Java™ programming language), tests two hash value bit vectors derived from one key as part of a process to test a pair of bit-matrix-plus-bit-vector hash functions to determine whether they are suitable for hashing a given set of keys within a hash table of specified size. As in the previous example, the result is a Boolean value that is true if, and only if, the given bit vectors were successfully handled. The programmed method "contigentUnion3", like "contigentUnion1" and "contigentUnion2", accepts three arguments: a work array "ht" represented as an array of integer values (declared in line 01), a first hash value bit vector "v1" represented as an integer value (also declared in line 01), and a second hash value bit vector "v2" represented as an integer value (also declared in line 01).

In this example, the programmed method "contigentUnion3" applies a more extensive limited distance-from-root test than that applied by the programmed method "contigentUnion2". For example, lines 05 through 28 are configured to handle five special cases in the following different ways:

(1) If "v1" is a root and "v2" is a different root, then line 06 merges the two sets by making "v2" the parent of "v1".

(2) If "v1" is a root and the parent "w2" of "v2" is a different root, then line 09 merges the two sets by making "w2" the parent of "v1".

(3) If "v1" is a root and the grandparent "b2" of "v2" is a different root, then line 13 merges the two sets by making "b2" the parent of "v1", and furthermore performs path compression by making "b2" the parent of "v2".

(4) If "v2" is a root and the parent "w1" of "v1" is a different root, then line 20 merges the two sets by making "w1" the parent of "v2".

(5) if "v2" is a root and the grandparent "b1" of "v1" is a different root, then line 24 merges the two sets by making "b1" the parent of "v2", and furthermore performs path compression by making "b1" the parent of "v1".

Note that in this example, the loop on lines 13 through 15 in "contigentUnion2" is duplicated so as to appear in two places in "contigentUnion3", this case, in lines 26 through 27 and lines 30 through 31. Similarly, the loop on lines 17 through 19 in "contigentUnion2" is duplicated so as to appear in two places in "contigentUnion3", in this case, in lines 15 through 16 and lines 32 through 33. This duplication of code may allow one of the two loops not to be executed needlessly in certain cases where control eventually arrives at line 35. Note that lines 02 through 04 in "contigentUnion3" are similar in function and structure to lines 02 through 04 in "contigentUnion2", and that lines 35 through 46 in "contigentUnion3" are identical in function and structure to lines 20 through 31 in "contigentUnion2", in this example.

Note that the UNION operation performed by the programmed method "contigentUnion3" described above uses a limited distance-from-root test, which may allow it to achieve some of the benefits of a rank test while avoiding the cost of rank bookkeeping. Also note that the programmed method "contigentUnion3" shown above furthermore performs path compression without using a loop, in certain cases.

As previously noted, the programmed method "oneTest", described above, may call any one of a number of variations of a "contingentUnion" method that may be used to determine whether two bit vectors belong to the same set, in different embodiments. One embodiment of a programmed method that may be used to test two hash value bit vectors using a modified union-find type algorithm that includes a "splitting" technique on paths rather than full path compression is illustrated by the pseudocode below.

```
01    static boolean contingentUnion4 (int [ ] ht, int v1, int v2) {
02        int z1 = ht[v1];
03        int z2 = ht[v2];
04        if (z1 = = z2) return false;
05        if (z1 = = v1) {
06            if (z2 = = v2 || z2 = = ht[z2]) {
07                ht[v1] = z2; return true;
08            }
09        } else if (z2 = = v2 && z1 = = ht[z1]) {
10            ht[v2] = z1; return true;
11        }
12        int q1 = ht[z1];
13        while (true) {
14            if (q1 = = z1) break;
15            ht[v1] = q1;
16            v1 = ht[q1];
17            if (v1 = q1) break;
18            ht[z1] = v1;
19            z1 = ht[v1];
20            if (z1 = v1) { q1 = v1: break; }
21            ht[q1] = z1;
22            q1 = ht[z1];
23        }
24        int q2 = ht[z2];
25        while (true) {
26            if (q2 = = z2) break;
27            ht[v2] = q2:
28            v2 = ht[q2];
29            if (v2 = q2) break;
30            ht[z2] = v2;
31            z2 = ht[v2];
32            if (z2 = v2) { q2 = v2; break; }
33            ht[q2] = z2;
34            q2 = ht[z2];
35        }
36        if (q1 = = q2) return false;
37        ht[q2] = q1;
38        return true;
39    }
```

In this example, a programmed method "contigentUnion4" (which may be coded in the Java™ programming language) tests two hash value bit vectors derived from one key as part of a process to test a pair of bit-matrix-plus-bit-vector hash functions to determine whether they are suitable for hashing a given set of keys within a hash table of specified size. As in the previous examples, the result is a Boolean value that is true if, and only if, the given bit vectors were successfully handled. The programmed method "contigentUnion4", like programmed methods "contigentUnion1", "contigentUnion2", and "contigentUnion3", accepts three arguments: a work array "ht" represented as an array of integer values (declared in line 01), a first hash value bit vector "v1" represented as an integer value (also declared in line 0)), and a second hash value bit vector "v2" represented as an integer value (also declared in line 01). In this example, the programmed method. "contigentUnion4" shown above uses the same limited distance-from-root test as the programmed method "contigentUnion2" described above. Note that lines 02 through 11 in "contigentUnion4" are identical in function and structure to lines 02 through 11 in "contigentUnion2".

As shown in the pseudocode above, the programmed method "contigentUnion4" uses a "splitting" technique in order to make one pass, rather than two, over each path from "v1" or "v2" to a tree root in all cases. In this example, lines 12 through 23 of "contigentUnion4" implement the "splitting" version of FIND-SET as applied to "v1" by unrolling the loop within FIND-SET by a factor of three, thus avoiding "register shuffling". Similarly, lines 24 through 35 implement the "splitting" version of FIND-SET as applied to "v2" by unrolling the loop within FIND-SET by a factor of three, again avoiding "register shuffling". In this example, when execution of both loops has completed and execution control arrives at line 36, "q1" is the root of the tree for the set containing "v1", and "q2" is the root of the tree for the set containing "v2". In this example, line 36 compares the bit vector in "q1" to the bit vector in "q2". If they are the same, then the value false is returned as the result of programmed method "contingentUnion4", indicating that the bit vectors "v1" and "v2" were not successfully handled. Note that if "q1" is equal to "q2", then "v1" and "v2" must have been members of the same set on entry to the programmed method "contingentUnion4".

In this example, line 37 changes the parent of the bit vector "q2" to be "q1". Note that, following the execution of line 37, the tree that originally contained "v1" and the tree that originally contained "v2" will have been merged to form a single tree whose root is "q1". Line 38 returns the value true as the result of programmed method "contigentUnion4", indicating that the bit vectors "v1" and "v2" were successfully handled. Note that if "q1" is not equal to "q2", then "v1" and "v2" must have been members of different sets on entry to the programmed method "contingentUnion4".

As described above, the programmed method "contigentUnion4" operates, under certain conditions, to perform a UNION operation on two sets containing the bit vectors in the variables "v1" and "v2", However, unlike with some existing approaches, the UNION operation performed by the programmed method "contigentUnion4" does not use a rank test, thus avoiding the cost of rank bookkeeping. Note also that the UNION operation performed by the programmed method "contigentUnion4" described above uses a limited distance-from-root test, which may allow it to achieve some of the benefits of a rank test while avoiding the cost of rank bookkeeping.

As previously noted, the programmed method "oneTest", described above, may call any one of a number of variations of a "contingentUnion" method that may be used to determine whether two bit vectors belong to the same set, in different embodiments. One embodiment of a programmed method that may be used to test two hash value bit vectors using a modified union-find type algorithm that includes a "halving" technique on paths rather than full path compression is illustrated by the pseudocode below.

```
01    static boolean contingentUnion5 (int [ ] ht, int v1, int v2) {
02        int z1 = ht[v1];
03        int z2 = ht[v2];
04        if (z1 = = z2) return false;
05        if (z1 = = v1) {
06            if (z2 = = v2 || z2 = = ht[z2]) {
07                ht[v1] = z2; return true;
08            }
09        } else if (z2 = = v2 && z1 = = ht[z1]) {
10            ht[v2] = z1; return true;
11        }
12        int q1 = ht[z1];
13        while (true) {
14            if (q1 = = z1) break;
15            ht[v1] = q1;
16            v1 = ht[q1];
17            z1 = ht[v1];
18            if (z1 = v1) break;
19            ht[q1] = z1;
20            q1 = ht[z1];
21            v1 = ht[q1];
22            if (v1 = q1) { z1 = v1; break; }
23            ht[z1] = v1;
24            z1 = ht[v1];
25            q1 = ht[z1];
26        }
```

```
27          int q2 = ht[z2];
28          while (true) {
29              if (q2 = = z2) break;
30              ht[v2] = q2;
31              v2 = ht[q2];
32              z2 = ht[v2];
33              if (z2 = v2) break;
34              ht[q2] = z2;
35              q2 = ht[z2];
36              v2 = ht[q2];
37              if (v2 = q2) { z2 = v2; break; }
38              ht[z2] = v2;
39              z2 = ht[v2];
40              q2 = ht[z2];
41          }
42          if (z1 = = z2) return false;
43          ht[z2] = z1;
44          return true;
45      }
```

In this example, a programmed method "contigentUnion5" (which may be coded in the Java™ programming language) tests two hash value bit vectors derived from one key as part of a process to test a pair of bit-matrix-plus-bit-vector hash functions to determine whether they are suitable for hashing a given set of keys within a hash table of specified size. As in the previous examples, the result is a Boolean value that is true if, and only if, the given bit vectors were successfully handled. The programmed method "contigentUnion5", like programmed methods "contigentUnion1", "contigentUnion2", "contigentUnion3", and "contigentUnion4", accepts three arguments: a work array "ht" represented as an array of integer values (declared in line 01), a first hash value bit vector "v1" represented as an integer value (also declared in line 01), and a second hash value bit vector "v2" represented as an integer value (also declared in line 01). As shown in the pseudocode above, the programmed method "contigentUnion5" uses the same limited distance-from-root test as the programmed method "contigentUnion2" shown above. Note that lines 02 through 11 in "contigentUnion5" are identical in function and structure to lines 02 through 11 in "contingentUnion2".

In this example, the programmed method "contigentUnion5" uses a "halving" technique in order to make one pass, rather than two, over each path from "v1" or "v2" to a tree root in all cases. Note that lines 12 through 26 in "contigentUnion5" implement the "halving" version of FIND-SET as applied to "v1" by unrolling the loop within FIND-SET by a factor of three, thus avoiding "register shuffling". Similarly, lines 27 through 41 in "contigentUnion5" implement the "halving" version of FIND-SET as applied to "v2" by unrolling the loop within FIND-SET by a factor of three, again avoiding "register shuffling". Note that when execution of both loops has completed and execution control arrives at line 42, "z1" is the root of the tree for the set containing "v1", and "z2" is the root of the tree for the set containing "v2".

In this example, line 42 compares the bit vector in "z1" to the bit vector in "z2". If they are the same, then the value false is returned as the result of the programmed method, indicating that the bit vectors "v1" and "v2" were not successfully handled. Note that if "z1" is equal to "z2", then "v1" and "v2" must have been members of the same set on entry to the programmed method "contigentUnion5". In this example, line 43 changes the parent of the bit vector "z2" to be "z1". Note that, following the execution of line 43, the tree that originally contained "v1" and the tree that originally contained "v2" will have been merged to form a single tree whose root is "z1". Line 44 returns the value true as the result of the programmed method, indicating that the bit vectors "v1" and "v2" were successfully handled. Note that if "z1" is not equal to "z2", then "v1" and "v2" must have been members of different sets on entry to the programmed method "contingentUnion5".

As described above, the programmed method "contigentUnion5" operates, under certain conditions, to perform a UNION operation on two sets containing the bit vectors in the variables "v1" and "v2". However, unlike with some existing approaches, the UNION operation performed by the programmed method "contigentUnion5" does not use a rank test, thus avoiding the cost of rank bookkeeping. Note also that the UNION operation performed by the programmed method "contigentUnion5" described above uses a limited distance-from-root test, which may allow it to achieve some of the benefits of a rank test white avoiding the cost of rank bookkeeping.

Note that, while a pair of hash functions on a set of keys may be regarded as defining a mathematical graph on nodes corresponding to hash values, where each edge of the graph connects two nodes if, and only if, their hash values are generated by applying the pair of hash functions to some key in the set, the programmed methods described above for performing modified union-find type operations at no time construct an explicit representation of the entire graph. Instead, a disjoint-set data structure is constructed for use in these modified union-find type operations. In some embodiments of the systems described herein, if construction of a representation of the graph were performed by starting with the set of nodes corresponding to all possible hash values and then adding one edge at a time, while simultaneously testing the keys corresponding to those edges using the disjoint-set data structure, then at all times there would be a bijective correspondence between the connected components of the graph and the sets in the collection represented by the disjoint-set data structure, such that a given set contains exactly the nodes of its corresponding connected component.

In some embodiments, by using a disjoint-set data structure rather than a graph data structure, the programmed methods described herein may avoid recording a representation of the precise edge structure within each connected component, allowing more rapid computation of the test as to whether keys can be successfully handled by a candidate pair of hash functions. Note that the programmed methods described above for performing "contingentUnion" operations (including those referred to as "contigentUnion1", "contigentUnion2", "contigentUnion3", "contigentUnion4", and "contigentUnion5") return false for a key if, and only if, adding the corresponding edge to the graph would produce a cycle. Note also that the programmed method "oneTest" returns the value "nkeys" if, and only if, the graph defined by the set of keys and the pair of hash functions is acyclic.

In some embodiments, at least one hash function may be represented not as a BitMatrixVector data structure such as that described above), but instead as a table (which may be an array or a hash table) that is indexed by key values and that stores corresponding hash values. In such embodiments, each invocation of the function "hash" described above, for example "hash(keys[k], hf1)", may be replaced by a table access, for example "hf1[keys[k]]" or "hf1.get(keys[k])". In other embodiments, at least one hash function may be represented not as a BitMatrixVector data structure, but instead as a function of the host language (which may represented in the program text by a so-called "lambda expression" or its equivalent) that accepts a key value as an argument and returns a corresponding hash value. In such embodiments, each invocation of the function "hash" described above, for example "hash(keys[k], hf1)", may be replaced by a function call, for example "hf1(keys[k])". In still other embodiments, at least one hash function may be represented not as a BitMatrixVector data structure, but instead as an array that is indexed by integers that are suitable indices for the array "keys" and whose elements are hash values corresponding to the keys in array "keys" such that element j in this table is the hash value for element j of the array "keys". In such embodiments, each invocation of the function "hash" described above, for example "hash(keys[k], hf1)", may be replaced by an array access, for example "hf1[k]".

In various embodiments, the programmed methods described above may be used in a variety of combinations to support the implementation of the lookup circuits described herein (e.g., to generate, choose, and/or determine the suitability of matrix generators, random bit matrices, sparse random bit matrices, hash functions, and/or pairs of hash functions, and/or to initialize or otherwise load various elements of the lookup circuits or of the tables and/or hash function sub-circuits thereof).

Note that in some embodiments of the lookup circuits described herein, the write-enable signals and key-data/in signals may be omitted. In such embodiments, some other means may be used to specify (and/or load) the contents of the memories in the lookup circuits or to specify the contents of a memory in another technology that supports the reading and writing of information (including, but not limited to, flash memory technology). In other embodiments, the RAM circuits illustrated in the figures and described herein may be replaced with some form of read-only memory technology and the write-enable signals and key-data/in signals of these lookup circuits may be omitted.

It will be appreciated by one of ordinary skill in the art that the specific choice to store an r-bit key and d bits of associated data into a memory word by storing the key into the leftmost r bits and the associated data into the rightmost d bits is only one illustrative choice among many, that other ways of storing or encoding an r-bit key and d bits of associated data into a memory word holding at least r+d bits are possible, and that these and other such design variations fall within the spirit and scope of this disclosure. For example, in one embodiment, data representing the key may be stored in the rightmost r bits of a memory word and the associated data may be stored in the leftmost d bits of the memory word. In another example, the bits representing the key and the bits representing the associated data may be interleaved within a memory word, in some embodiments. Similar remarks apply to the storing of both data and index information within a single memory word.

While the lookup circuits 500 and 600 described herein illustrate a query process that performs computation and memory accesses in combinatorial logic, it will be appreciated by one of ordinary skill in the art that in other embodiments, the computation and memory accesses may be performed sequentially and may be divided into multiple pipeline stages, while still falling within the spirit and scope of the present disclosure.

Note also that in various embodiments of the lookup circuits 500 and 600, the hash function sub-circuits included in those lookup circuits may be implemented in FPGAs or using any other suitable implementations of the hash function circuitry described herein. In general, any or all of the hash functions described herein may be defined through memory content, may be implemented in fixed combinatorial logic (e.g., gates), may be implemented in programmable combinatorial logic, or may be implemented using any combination of these and other technologies suitable for implementing the functionality of a hash function sub-circuit. In some design environments (e.g., those that utilize FPGAs), high-density SRAMs may be readily available for use in implementing the techniques described herein, while the construction of CAMs could be costly in terms of resources.

Figure 12:
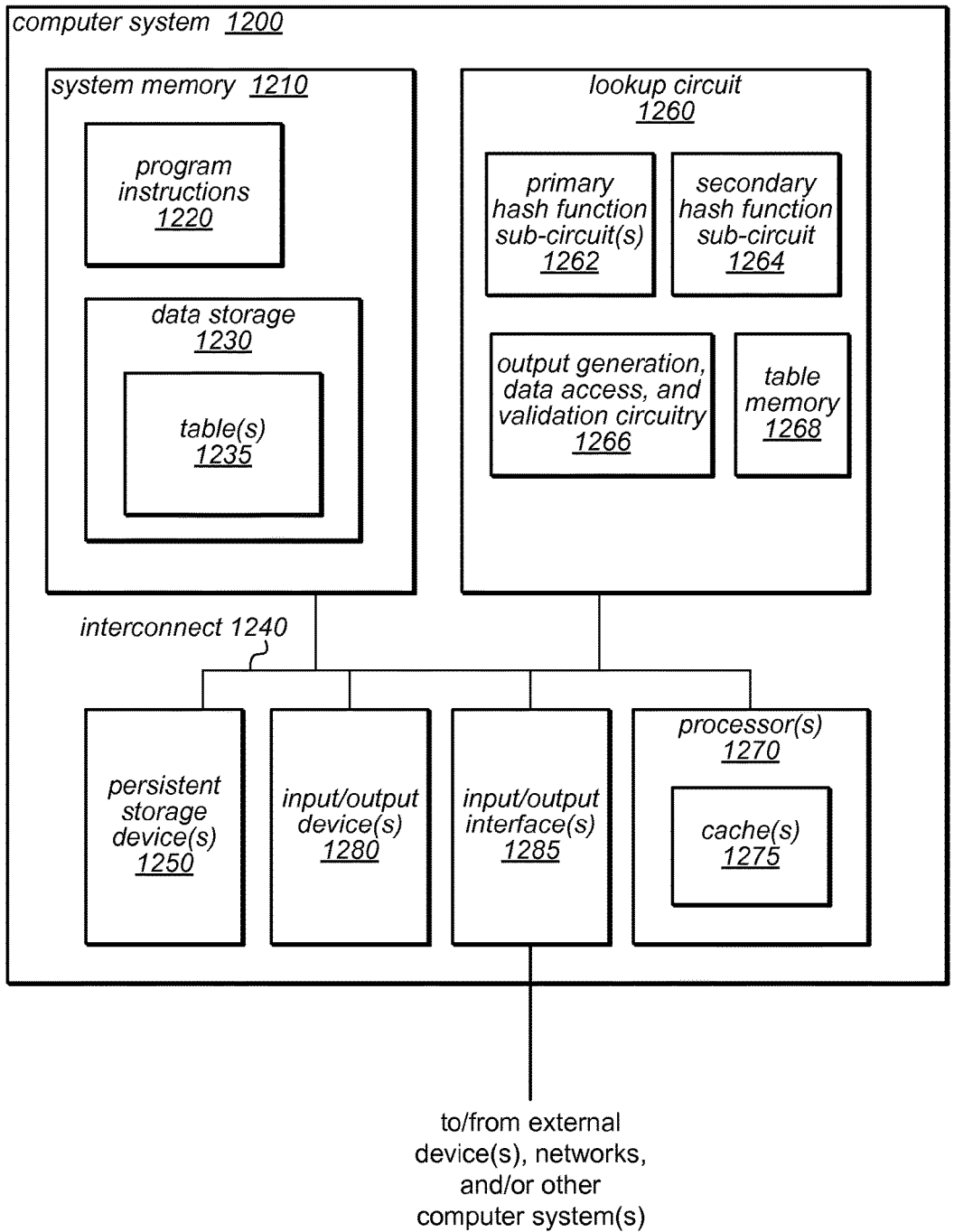
FIG. 12 is a block diagram illustrating one embodiment of a computing system that is configured to generate hash functions suitable for implementation within a hash function evaluation circuit or lookup circuit and/or to perform lookup operations using such circuits.

The techniques described herein for implementing and configuring lookup circuits (which may include generating representations of various hash functions, testing them for suitability with the lookup circuits, and/or loading them into hash function sub-circuits), evaluating hash functions using such circuits, and/or accessing data in a lookup table using these techniques may be implemented on or by any of a variety of computing systems, in different embodiments. For example, the hash function evaluation circuits and lookup circuits described herein may be implemented in various circuit-level network processing devices including network interface cards, network processors, smart routers/switches, etc., according to different embodiments. In different embodiments, these circuits may be implemented within a single hardware device (e.g., a single chip, card, and/or apparatus), or the functionality of these circuits may be partitioned across multiple hardware devices (e.g., multiple chips on the same card or on different cards). FIG. 12 illustrates a computer system 1200 that is configured to implement configuring lookup circuits (which may include generating representations of various hash functions, testing them for suitability with the lookup circuits, and/or loading them into hash function sub-circuits), evaluating hash functions using such circuits, and/or accessing data in a lookup table using these techniques, according to various embodiments. The computer system 1200 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc., or in general any type of computing device.

In various embodiments, one or more of the mechanisms for implementing configuring lookup circuits (which may include generating representations of various hash functions, testing them for suitability with the lookup circuits, and/or loading them into hash function sub-circuits), evaluating hash functions using such circuits, and/or accessing data in a lookup table using these techniques, as described herein, may be provided as a computer program product, or software, that may include a non-transitory, computer-readable storage medium having stored thereon instructions, which may be used to program a computer system 1200 (or other electronic devices) to perform a process according to various embodiments. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette or hard disk); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.).

In various embodiments, computer system 1200 may include one or more processors 1270; each may include multiple cores, any of which may be single or multi-threaded. For example, multiple processor cores may be included in a single processor chip (e.g., a single processor 1270), and multiple processor chips may be included in computer system 1200. Each of the processors 1270 may include a cache or a hierarchy of caches 1275, in various embodiments. For example, each processor chip 1270 may include multiple L1 caches (e.g., one per processor core) and one or more other caches (which may be shared by the processor cores on a single processor). The computer system 1200 may also include one or more persistent storage devices 1250 (e.g., optical storage, magnetic storage, hard drive, tape drive, solid state memory, etc.) one or more system memories 1210 (e.g., one or more of cache, SRAM, DRAM, RDRAM, EDO RAM, DDR 10 RAM, SDRAM, Rambus RAM, EEPROM, etc.), one or more input/output interfaces 1285, and/or one or more input/output devices 1280 (e.g., keyboards, monitors, etc.). Other embodiments may include more, fewer, or different components than those illustrated in FIG. 12. For example, some embodiments may include additional components not illustrated in FIG. 12 (e.g., video cards, audio cards, additional network interfaces, peripheral devices, a network interface such as an ATM interface, a Frame Relay interface, an Ethernet interface, an Infiniband interface, etc.).

As illustrated in FIG. 12, the one or more processors 1270, the storage device(s) 1250, the input/output devices 1280, the input/output interfaces 1285, and the system memory 1210 may be coupled to the system interconnect 1240. One or more of the system memories 1210 may contain program instructions 1220. Program instructions 1220 may be executable to implement one or more applications, which may include application source code and/or executable application code that is configured to generate bit matrices (e.g., random bit matrices and/or sparse random bit matrices), generate a set of hash functions (e.g., perfect hash functions, minimal perfect hash functions or other types of hash functions), test pairs of hash functions for suitability in hashing a collection of keys, load various hash functions into a lookup circuit or a hash function evaluation circuit or otherwise program a lookup circuit or a hash function evaluation circuit to implement one or more hash functions, load information for key-value pairs in a lookup table, and/or initiate a table lookup operation that uses a lookup circuit or a hash function evaluation circuit to access the data associated with a presented key, as described herein. In some embodiments, program instructions 1220 may also include shared libraries, operating systems, or a compiler (e.g., one that compiles a user program written in a domain-specific programming language and/or a comma-separated values file to generate a lookup circuit configuration or a hash function evaluation circuit configuration that implements one or more selected hash functions).

Program instructions 1220 may be encoded in platform native binary, any interpreted language such as Java™ byte-code, or in any other language such as C/C++, Java™, etc., or in any combination thereof. In various embodiments, components and/or functions implemented by program instructions 1220 (e.g., compilers, applications, operating systems, and/or shared libraries) may each be implemented in any of various programming languages or methods. For example, in one embodiment, one or more components or functions implemented by program instructions 1220 may be Java based, while in another embodiment they may be written using the C or C++ programming languages. Similarly, applications may be written using Java, C, C++, or another programming language, according to various embodiments. Moreover, in some embodiments, the different components or functions implemented by program instructions 1220 may not be implemented using the same programming language. For example, an application implemented by program instructions 1220 may be C++ based, while a compiler implemented by program instructions 1220 may be developed using C.

In various embodiments, the program instructions 1220 may include any or all of the functions, operations, or procedures, and/or other processes for implementing configuring lookup circuits (which may include generating representations of various hash functions, testing them for suitability with the lookup circuits, and/or loading them into hash function sub-circuits), evaluating hash functions using such circuits, and/or accessing data in a lookup table using these techniques, as described herein. The system memory 1210 may further comprise data storage locations 1230 where data may be stored. For example, in some embodiments, data storage locations 1230 may store data that is associated with one or more sets of keys in lookup tables (e.g., data storage locations 1230 may include storage for one or more single-ported or dual-ported memories, each of which may store one or more lookup tables) or may store data for bit matrices or bit vectors in one or more arrays. In other embodiments, data storage locations 1230 may store data in one or more hash tables, or may store parameter values, configuration information, and/or any other data usable to implement the techniques described herein using one or more hash evaluation circuits or hash function sub-circuits, some of which may include values that are configurable by the programmer or by a user (e.g., data storage locations 1230 may include storage for one or more memories each of which may store one or more hash tables for various hash function sub-circuits).

As illustrated in FIG. 12, in some embodiments, computer system 1200 may include one or more hash evaluation circuits, such as lookup circuit 1260. As illustrated in this example, each lookup circuit 1260 may include one or more hash function sub-circuit(s) 1262, a selection sub-circuit 1264, and circuitry 1266 for performing output generation (which may include computational logic that modifies data values obtained from a lookup table before or after selection), data access, and key validation. In this example, lookup circuit 1260 also includes table memory 1268, which may include one or more memories, each of which may store one or more hash tables and/or lookup tables, such as those described herein. In other embodiments, one or more of these hash tables may be stored in memory included within hash function sub-circuits 1262 and/or output generation, data access, and validation circuitry 1266.

In some embodiments, interconnect 1240 may be configured to couple processor(s) 1270 and/or lookup circuit 1260 directly to a computer system network. In other embodiments, these (or other) components of computer system 1200 may be coupled to one or more external devices, network(s), and/or other computer system(s) through interconnect 1240 and input/output interface(s) 1285. For example, in some embodiments, computer system 1200 may include an interface 1285 through which network packets are received from one or more other computer systems (some of which may be similar to computer system 1200). These packets may then be routed to lookup circuit 1260 in order to perform a table lookup operation on information (keys) contained in those packets, as described herein. In some embodiments, interconnect 1270 and input/output interface(s) 1285 may be configured to implement one or more of various interface or network standards, e.g., Peripheral Component Interconnect (PCI), Ethernet, HyperTransport (HT), Infiniband, or any variant or successor of these or other suitable input/output protocols. In other embodiments, one or more of interconnect 1270 and input/output interface(s) 1285 may be configured to implement a custom interface.

Although the embodiments above have been described in considerable detail, numerous variations and modifications will become apparent to those skilled in the art once the above disclosure is fully appreciated. For example, although many of the embodiments are described in terms of particular types of data structures (e.g., hash tables), it should be noted that the techniques and mechanisms disclosed herein for implementing configuring lookup circuits (which may include generating representations of various hash functions, testing them for suitability with the lookup circuits, and/or loading them into hash function sub-circuits), evaluating hash functions using such circuits, and/or accessing data in a lookup table using these techniques may be applicable in other contexts and/or using structures and procedures other than those described in the examples herein. It is intended that the following claims be interpreted to embrace all such variations and modifications.

What is claimed:
1. A method, comprising:
    receiving a collection of keys for multiple key-value pairs to be evaluated in a lookup circuit;
    receiving representations of two or more hash functions, each of which comprises a respective bit matrix and a respective bit vector;
    determining whether the two or more hash functions can be combined for use in the lookup circuit to map all keys in the collection to unique lookup addresses, including performing, for each of at least one key in the collection of keys:
        computing a first hash value bit vector by applying one of the two or more hash functions to the key;
        computing one or more other hash value bit vectors by applying respective other ones of the two or more hash functions to the key; and
        performing a union-find type operation to construct one or more graphs based on the first hash value bit vector and the one or more other hash value bit vectors to determine whether the first hash value bit vector and the one or more other hash value bit vectors belong to the same set, wherein nodes in the one or more graphs are distinct hash value bit vectors produced by the two or more hash values from distinct keys in the collection and edges in the one or more graphs are the distinct keys in the collection that produced their respective connected nodes;
    wherein said computing the first hash value bit vector, said computing the one or more other hash value bit vectors, and said determining whether the first hash value bit vector and the one or more other hash value bit vectors belong to the same set are performed iteratively for respective keys in the collection of keys until:
        it is determined that, for one of the keys in the collection, the first hash value bit vector and the one or more other hash value bit vectors belong to the same set; or
        it is determined that, for all of the keys in the collection of keys, the first hash value bit vector and at least one of the one or more other hash value bit vectors belong to different sets; and
    returning, based on whether the first hash value bit vector and the one or more other hash value bit vectors belong to the same set, data indicating whether the two or more hash functions can be combined for use in the lookup circuit.

2. The method of claim 1, wherein in response to determining that, for a given one of the keys in the collection, the first hash value bit vector and the one or more other hash value bit vectors belong to the same set, said performing the union-find type operation comprises returning an indication of a failure to handle the given key using the two or more hash functions.

3. The method of claim 1, wherein in response to determining that, for a given one of the keys in the collection, the first hash value bit vector and the one or more other hash value bit vectors do not belong to the same set, said performing the union-find type operation comprises:
    merging the respective sets to which first hash value bit vector and the one or more other hash value bit vectors belong; and
    returning an indication of success in handling the given key using the two or more hash functions.

4. The method of claim 1, wherein said performing the union-find type operation comprises performing a path compression or path shortening operation and does not comprise performing a rank test.

5. The method of claim 4, wherein said performing a path compression or path shortening operation comprises performing a path splitting operation.

6. The method of claim 4, wherein said performing a path compression or path shortening operation comprises performing a path halving operation.

7. The method of claim 1, wherein said performing the union-find type operation comprises performing a limited distance-from-root test.

8. The method of claim 1, wherein said performing the union-find type operation comprises:
    finding the root of a directed graph for a set comprising the first hash value bit vector;
    finding the roots of directed graphs for sets comprising the one or more other hash value bit vectors; and
    determining whether the root of the directed graph for the set comprising the first hash value bit vector and the roots of the directed graphs for the sets comprising the one or more other hash value bit vectors are the same.

9. The method of claim 8,
    wherein said performing the union-find type operation comprises determining that the first hash value bit vector and the one or more other hash value bit vectors meet criteria for exception processing; and
    wherein said finding the root of the directed graph for a set that comprises the first hash value bit vector, said finding the roots of the directed graphs for a set that comprise the one or more other hash value bit vectors, and said determining whether the root of the directed graph for the set that comprises the first hash value bit vector and the roots of the directed graphs for the sets that comprise the one or more other hash value bit vectors are the same are performed in response to determining that the first hash value bit vector and the one or more other hash value bit vectors do not meet the criteria for exception processing.

10. The method of claim 9, wherein said determining that the first hash value bit vector and the one or more other hash value bit vectors meet criteria for exception processing comprises:
- determining that the first hash value bit vector is the root of the directed graph for the set that comprises the first hash value bit vector and that the one or more other hash value bit vectors are the roots of the directed graphs for different sets that comprise the one or more other hash value bit vectors;
- determining that the first hash value bit vector is the root of the directed graph for the set that comprises the first hash value bit vector and that respective parents of the one or more other hash value bit vectors are the roots of the directed graphs for different sets that comprise the one or more other hash value bit vectors;
- determining that the first hash value bit vector is the root of the directed graph for the set that comprises the first hash value bit vector and that respective parents of the respective parents of the one or more other hash value bit vectors are the roots of the directed graphs for different sets that comprise the one or more other hash value bit vectors;
- determining that the one or more other hash value bit vectors are the roots of the directed graphs for the sets that comprise the one or more other hash value bit vectors and that a parent of the first hash value bit vector is the root of the directed graph for a different set that comprises the first hash value bit vector; or
- determining that the one or more other hash value bit vectors are the roots of the directed graphs for the sets that comprise the one or more other hash value bit vectors and that a parent of a parent of the first hash value bit vector is the root of the directed graph for a different set that comprises the first hash value bit vector.

11. The method of claim 1, further comprising, in response to determining that the two or more hash functions can be combined for use in the lookup circuit, transferring a representation of each of the two or more hash functions to the lookup circuit.

12. The method of claim 11, wherein said transferring comprises transferring a representation of at least one of the two or more hash functions to a memory in the lookup circuit, to fixed combinatorial logic in the lookup circuit, or to programmable combinatorial logic in the lookup circuit.

13. The method of claim 1, wherein for at least one of the two or more hash functions, the representation of the hash function comprises a random bit matrix that meets a predefined sparseness constraint.

14. A non-transitory, computer-readable storage medium storing program instructions that when executed on one or more computers cause the one or more computers to perform:
- receiving a collection of keys for multiple key-value pairs to be evaluated in a lookup circuit;
- receiving representations of two or more hash functions, each of which comprises a respective bit matrix and a respective bit vector;
- determining whether the two or more hash functions can be combined for use in the lookup circuit to map all keys in the collection to unique lookup addresses, including performing, for each of at least one key in the collection of keys:
  - computing a first hash value bit vector by applying one of the two or more hash functions to the key;
  - computing one or more other hash value bit vectors by applying respective other ones of the two or more hash functions to the key; and
  - performing a union-find type operation to construct one or more graphs based on the first hash value bit vector and the one or more other hash value bit vectors to determine whether the first hash value bit vector and the one or more other hash value bit vectors belong to the same set, wherein nodes in the one or more graphs are distinct hash value bit vectors produced by the two or more hash functions from distinct keys in the collection and edges in the one or more graphs are the distinct keys in the collection that produced their respective connected nodes;
- wherein said computing the first hash value bit vector, said computing the one or more other hash value bit vectors, and said determining whether the first hash value bit vector and the one or more other hash value bit vectors belong to the same set are performed iteratively for respective keys in the collection of keys until:
  - it is determined that, for one of the keys in the collection, the first hash value bit vector and the one or more other hash value bit vectors belong to the same set; or
  - it is determined that, for all of the keys in the collection of keys, the first hash value bit vector and at least one of the one or more other hash value bit vectors belong to different sets; and
- returning, based on whether the first hash value bit vector and the one or more other hash value bit vectors belong to the same set, data indicating whether the two or more hash functions can be combined for use in the lookup circuit.

15. The non-transitory, computer-readable storage medium of claim 14,
- wherein in response to determining that, for a given one of the keys in the collection, the first hash value bit vector and the one or more other hash value bit vectors belong to the same set, said performing the union-find type operation comprises returning an indication of a failure to handle the given key using the two or more hash functions; and
- wherein in response to determining that, for a given one of the keys in the collection, the first hash value bit vector and the one or more other hash value bit vectors do not belong to the same set, said performing the union-find type operation comprises:
  - merging the respective sets to which first hash value bit vector and the one or more other hash value bit vectors belong; and
  - returning an indication of success in handling the given key using the two or more hash functions.

16. The non-transitory, computer-readable storage medium of claim 14, wherein said performing the union-find type operation comprises performing a path compression or path shortening operation and does not comprise performing a rank test.

17. The non-transitory, computer-readable storage medium of claim 14, wherein said performing the union-find type operation comprises:
- determining whether the first hash value bit vector and the one or more other hash value bit vectors meet criteria for exception processing;
- in response to determining that the first hash value bit vector and the one or more other hash value bit vectors do not meet the criteria for exception processing:

finding the root of a directed graph for a set comprising the first hash value bit vector;

finding the roots of directed graphs for sets comprising the one or more other hash value bit vectors; and determining whether the root of the directed graph for the set comprising the first hash value bit vector and the roots of the directed graphs for the sets comprising the one or more other hash value bit vectors are the same; and in response to determining that the first hash value bit vector and the one or more other hash value bit vectors meet the criteria for exception processing:

eliding at least some of said finding the root of the directed graph for a set that comprises the first hash value bit vector, said finding the roots of the directed graphs for sets that comprise the one or more other hash value bit vectors, and said determining whether the root of the directed graph for the set that comprises the first hash value bit vector and the roots of the directed graphs for the sets that comprise the one or more other hash value bit vectors are the same.

18. A system, comprising:

one or more processors; and a memory coupled to the one or more processors and storing program instructions that when executed on the one or more processors cause the one or more processors to perform:

receiving a collection of keys for multiple key-value pairs to be evaluated in a lookup circuit;

receiving representations of two or more hash functions, each of which comprises a respective bit matrix and a respective bit vector;

determining whether the two or more hash functions can be combined for use in the lookup circuit to map all keys in the collection to unique lookup addresses, including performing, for each of at least one key in the collection of keys:

computing a first hash value bit vector by applying one of the two or more hash functions to the key;

computing one or more other hash value bit vectors by applying respective other ones of the two or more hash functions to the key; and performing a union-find type operation to construct one or more graphs based on the first hash value bit vector and the one or more other hash value bit vectors to determine whether the first hash value bit vector and the one or more other hash value bit vectors belong to the same set, wherein nodes in the one or more graphs are distinct hash value bit vectors produced by the two or more hash functions from distinct keys in the collection and edges in the one or more graphs are the distinct keys in the collection that produced their respective connected nodes;

wherein said computing the first hash value bit vector, said computing the one or more other hash value bit vectors, and said determining whether the first hash value bit vector and the one or more other hash value bit vectors belong to the same set are performed iteratively for respective keys in the collection of keys until:

it is determined that, for one of the keys in the collection, the first hash value bit vector and the one or more other hash value bit vectors belong to the same set; or it is determined that, for all of the keys in the collection of keys, the first hash value bit vector and at least one of the one or more other hash value bit vectors belong to different sets; and returning, based on whether the first hash value bit vector and the one or more other hash value bit vectors belong to the same set, data indicating whether the two or more hash functions can be combined for use in the lookup circuit.

19. The system of claim 18, wherein said performing the union-find type operation comprises performing a path compression or path shortening operation and does not comprise performing a rank test;

wherein in response to determining that, for a given one of the keys in the collection, the first hash value bit vector and the one or more other hash value bit vectors belong to the same set, said performing the union-find type operation comprises returning an indication of a failure to handle the given key using the two or more hash functions;

wherein in response to determining that, for a given one of the keys in the collection, the first hash value bit vector and the one or more other hash value bit vectors do not belong to the same set, said performing the union-find type operation comprises:

merging the respective sets to which first hash value bit vector and the one or more other hash value bit vectors belong; and returning an indication of success in handling the given key using the two or more hash functions.

20. The system of claim 18, wherein said performing the union-find type operation comprises:

determining whether the first hash value bit vector and the one or more other hash value bit vectors meet criteria for exception processing;

in response to determining that the first hash value bit vector and the one or more other hash value bit vectors do not meet the criteria for exception processing:

finding the root of a directed graph for a set comprising the first hash value bit vector;

finding the roots of directed graphs for sets comprising the one or more other hash value bit vectors; and determining whether the root of the directed graph for the set comprising the first hash value bit vector and the roots of the directed graphs for the sets comprising the one or more other hash value bit vectors are the same; and in response to determining that the first hash value bit vector and the one or more other hash value bit vectors meet the criteria for exception processing:

eliding at least some of said finding the root of the directed graph for a set that comprises the first hash value bit vector, said finding the roots of the directed graphs for a set that comprise the one or more other hash value bit vectors, and said determining whether the root of the directed graph for the set that comprises the first hash value bit vector and the roots of the directed graphs for the sets that comprise the one or more other hash value bit vectors are the same.

* * * * *

UNITED STATES PATENT AND TRADEMARK OFFICE
CERTIFICATE OF CORRECTION

PATENT NO. : 10,503,716 B2
APPLICATION NO. : 14/069259
DATED : December 10, 2019
INVENTOR(S) : Chase et al.

It is certified that error appears in the above-identified patent and that said Letters Patent is hereby corrected as shown below:

In the Specification

In Column 3, Line 22, delete "away" and insert -- a way --, therefor.

In Column 3, Line 23, delete "tow" and insert -- low --, therefor.

In Column 6, Line 65, delete "white" and insert -- while --, therefor.

In Column 7, Line 3, after "FPGA" insert -- wiring, --.

In Column 7, Line 67, after "If" insert -- , --.

In Column 11, Line 59, delete "tower" and insert -- lower --, therefor.

In Column 13, Line 27, after "function" insert -- *H*, --.

In Column 13, Line 40, delete "(k)." and insert -- (k)). --, therefor.

In Column 13, Line 42, delete "reties" and insert -- relies --, therefor.

In Column 13, Line 46, delete "early" and insert -- carry --, therefor.

In Column 14, Line 54, after "functions" insert -- ) is --.

In Column 17, Line 34, delete "my" and insert -- may --, therefor.

In Column 17, Line 58, after "illustrated" insert -- in --.

In Column 19, Line 51, after "if" insert -- , --.

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,503,716 B2

In Column 20, Line 1, delete "combining," and insert -- combining --, therefor.

In Column 21, Line 20, after "present" insert -- a --.

In Column 21, Line 38, delete "entirely" and insert -- entirety --, therefor.

In Column 21, Line 48, delete "FIG," and insert -- FIG. --, therefor.

In Column 21, Line 62, delete "(primary" and insert -- primary --, therefor.

In Column 23, Line 19, delete "my" and insert -- may --, therefor.

In Column 25, Line 22, delete "write-data," and insert -- write-data --, therefor.

In Column 26, Lines 41-42, delete "criteria," and insert -- criteria --, therefor.

In Column 28, Line 47, delete "no" and insert -- so --, therefor.

In Column 30, Line 43, delete "tower" and insert -- lower --, therefor.

In Column 32, Line 23, after "value" insert -- in --.

In Column 33, Line 5, after "than" delete "in".

In Column 33, Line 28, delete "in" and insert -- $m$ --, therefor.

In Column 33, Line 45, delete "in" and insert -- $m$ --, therefor.

In Column 33, Line 54, after "than" delete "in".

In Column 35, Line 8, after "circuit" insert -- ( --.

In Column 36, Line 58, delete "he" and insert -- the --, therefor.

In Column 36, Line 66, delete ""hf.A."" and insert -- "hf.A" --, therefor.

In Column 37, Line 13, delete "fur" and insert -- for --, therefor.

In Column 42, Line 62, after ""contingentUnion4"," insert -- or --.

In Column 42, Line 62, delete ""contigentUnion3"" and insert -- "contingentUnion3", --, therefor.

In Column 42, Line 66, delete "test" and insert -- test) --, therefor.

In Column 43, Lines 15-16, delete ""contigentUnion1"" and insert -- "contingentUnion1" --, therefor.

In Column 43, Line 22, after "if" insert -- , --.

In Column 43, Line 28, delete "a so" and insert -- (also --, therefor.

In Column 43, Lines 29-30, delete ""contigentUnion1"" and insert -- "contingentUnion1" --, therefor.

In Column 43, Lines 32-33, delete ""contigentUnion1"" and insert -- "contingentUnion1" --, therefor.

In Column 43, Line 55, delete "psuedocode" and insert -- "pseudocode" --, therefor.

In Column 44, Line 24, after "loop" insert -- in --.

In Column 44, Lines 39-40, delete ""contigentUnion1"" and insert -- "contingentUnion1" --, therefor.

In Column 44, Line 44, delete ""contigentUnion1"" and insert -- "contingentUnion1" --, therefor.

In Column 44, Line 46, delete ""contigentUnion1"" and insert -- "contingentUnion1" --, therefor.

In Column 44, Line 50, delete ""contigentUnion1"" and insert -- "contingentUnion1" --, therefor.

In Column 44, Line 53, delete ""contigentUnion1"" and insert -- "contingentUnion1" --, therefor.

In Column 44, Line 56, delete ""contigentUnion1"" and insert -- "contingentUnion1" --, therefor.

In Column 44, Line 59, delete ""contigentUnion1"" and insert -- "contingentUnion1" --, therefor.

In Column 44, Line 62, delete ""contigentUnion1"" and insert -- "contingentUnion1" --, therefor.

In Column 44, Line 65, delete "(inclusive" and insert -- (inclusive) --, therefor.

In Column 45, Line 3, delete ""contigentUnion1")" and insert -- "contingentUnion1)" --, therefor.

In Column 46, Line 26, after "illustrated" insert -- in --.

In Column 47, Lines 20-21, delete ""contigentUnion2"" and insert -- "contingentUnion2" --, therefor.

In Column 47, Line 24, delete ""contigentUnion2"" and insert -- "contingentUnion2" --, therefor.

In Column 47, Line 31, after "if" insert -- , --.

In Column 47, Line 32, delete ""contigentUnion2"," and insert -- "contingentUnion2," --, therefor.

In Column 47, Lines 32-33, delete ""contigentUnion1"," and insert -- "contingentUnion1," --, therefor.

In Column 47, Line 50, delete ""contigentUnion2"," and insert -- "contingentUnion2," --, therefor.

In Column 48, Line 35, delete ""contigentUnion2","" and insert -- "contingentUnion2," --, therefor.

In Column 48, Line 43, delete ""contigentUnion2","" and insert -- "contingentUnion2," --, therefor.

In Column 48, Line 45, delete ""contigentUnion1","" and insert -- "contingentUnion1," --, therefor.

In Column 48, Line 46, delete ""contigentUnion1","" and insert -- "contingentUnion1," --, therefor.

In Column 48, Line 48, delete ""contigentUnion2","" and insert -- "contingentUnion2," --, therefor.

In Column 48, Line 50, delete ""contigentUnion2","" and insert -- "contingentUnion2," --, therefor.

In Column 48, Line 51, delete ""contigentUnion2","" and insert -- "contingentUnion2," --, therefor.

In Column 48, Line 52, delete ""contigentUnion1","" and insert -- "contingentUnion1," --, therefor.

In Column 48, Line 53, delete ""contigentUnion2","" and insert -- "contingentUnion2," --, therefor.

In Column 48, Lines 54-55, delete ""contigentUnion1","" and insert -- "contingentUnion1," --, therefor.

In Column 48, Line 55, delete ""contigentUnion1","" and insert -- "contingentUnion1," --, therefor.

In Column 48, Lines 57-58, delete ""contigentUnion2","" and insert -- "contingentUnion2," --, therefor.

In Column 48, Line 59, delete ""contigentUnion2","" and insert -- "contingentUnion2," --, therefor.

In Column 48, Line 60, delete ""contigentUnion2","" and insert -- "contingentUnion2," --, therefor.

In Column 48, Lines 63-34, delete ""contigentUnion2","" and insert -- "contingentUnion2," --, therefor.

In Column 49, Line 1, delete ""contigentUnion2","" and insert -- "contingentUnion2," --, therefor.

In Column 49, Line 4, delete ""contigentUnion2","" and insert -- "contingentUnion2," --, therefor.

In Column 49, Line 8, delete ""contigentUnion2","" and insert -- "contingentUnion2," --, therefor.

In Column 49, Line 12, delete ""contigentUnion2","" and insert -- "contingentUnion2," --, therefor.

In Column 49, Line 16, delete ""contigentUnion2","" and insert -- "contingentUnion2," --, therefor.

In Column 49, Line 19, delete ""contigentUnion2","" and insert -- "contingentUnion2," --, therefor.

In Column 49, Line 22, delete ""contigentUnion2","" and insert -- "contingentUnion2," --, therefor.

CERTIFICATE OF CORRECTION (continued)
U.S. Pat. No. 10,503,716 B2

In Column 49, Line 25, delete ""contigentUnion2","" and insert -- "contingentUnion2," --, therefor.

In Column 49, Line 33, delete ""contigentUnion2","" and insert -- "contingentUnion2," --, therefor.

In Column 49, Line 43, delete "criteria," and insert -- criteria --, therefor.

In Column 51, Line 11, delete ""widest"," and insert -- "oneTest", --, therefor.

In Column 51, Lines 61-62, delete ""contigentUnion3"" and insert -- "contingentUnion3" --, therefor.

In Column 52, Lines 2-3, delete ""contigentUnion3"" and insert -- "contingentUnion3" --, therefor.

In Column 52, Line 3, delete ""contigentUnion1"" and insert -- "contingentUnion1" --, therefor.

In Column 52, Lines 3-4, delete ""contigentUnion2"" and insert -- "contingentUnion2" --, therefor.

In Column 52, Lines 11-12, delete ""contigentUnion3"" and insert -- "contingentUnion3" --, therefor.

In Column 52, Lines 11-12, delete ""contigentUnion3"" and insert -- "contingentUnion3" --, therefor.

In Column 52, Lines 13-14, delete ""contigentUnion2"" and insert -- "contingentUnion2" --, therefor.

In Column 52, Line 37, delete ""contigentUnion2"" and insert -- "contingentUnion2" --, therefor.

In Column 52, Line 38, delete ""contigentUnion3"" and insert -- "contingentUnion3" --, therefor.

In Column 52, Line 40, delete ""contigentUnion2"" and insert -- "contingentUnion2" --, therefor.

In Column 52, Line 41, delete ""contigentUnion3"" and insert -- "contingentUnion3" --, therefor.

In Column 52, Lines 45-46, delete ""contigentUnion3"" and insert -- "contingentUnion3" --, therefor.

In Column 52, Line 47, delete ""contigentUnion2"" and insert -- "contingentUnion2" --, therefor.

In Column 52, Line 48, delete ""contigentUnion3"" and insert -- "contingentUnion3" --, therefor.

In Column 52, Line 49, delete ""contigentUnion2"" and insert -- "contingentUnion2" --, therefor.

In Column 52, Line 52, delete ""contigentUnion3"" and insert -- "contingentUnion3" --, therefor.

In Column 52, Line 56, delete ""contigentUnion3"" and insert -- "contingentUnion3" --, therefor.

In Column 53, Line 23, delete "q2:" and insert -- q2; --, therefor.

In Column 53, Lines 35-36, delete ""contigentUnion4","" and insert -- "contingentUnion4", --, therefor.

CERTIFICATE OF CORRECTION (continued)
U.S. Pat. No. 10,503,716 B2

In Column 53, Lines 43-44, delete ""contigentUnion4"," and insert -- "contingentUnion4", --, therefor.

In Column 53, Lines 44-45, delete ""contigentUnion1"," and insert -- "contingentUnion1", --, therefor.

In Column 53, Line 45, delete ""contigentUnion2"," and insert -- "contingentUnion2", --, therefor.

In Column 53, Line 45, delete ""contigentUnion3"," and insert -- "contingentUnion3", --, therefor.

In Column 53, Line 49, delete "0))," and insert -- 01), --, therefor.

In Column 53, Line 51, delete "method." and insert -- method --, therefor.

In Column 53, Line 51, delete ""contigentUnion4"" and insert -- "contingentUnion4" --, therefor.

In Column 53, Line 53, delete ""contigentUnion2"" and insert -- "contingentUnion2" --, therefor.

In Column 53, Line 54, delete ""contigentUnion4"" and insert -- "contingentUnion4" --, therefor.

In Column 53, Line 58, delete ""contigentUnion4"" and insert -- "contingentUnion4" --, therefor.

In Column 53, Line 61, delete ""contigentUnion4"" and insert -- "contingentUnion4" --, therefor.

In Column 54, Line 7, delete ""contigentUnion4"" and insert -- "contingentUnion4" --, therefor.

In Column 54, Lines 17-18, delete ""contigentUnion4"" and insert -- "contingentUnion4" --, therefor.

In Column 54, Lines 23-24, delete ""contigentUnion4"" and insert -- "contingentUnion4" --, therefor.

In Column 54, Line 26, delete ""v2"," and insert -- "v2". --, therefor.

In Column 54, Line 28, delete ""contigentUnion4"" and insert -- "contingentUnion4" --, therefor.

In Column 54, Line 31, delete ""contigentUnion4"" and insert -- "contingentUnion4" --, therefor.

In Column 55, Lines 20-21, delete ""contigentUnion5"" and insert -- "contingentUnion5" --, therefor.

In Column 55, Lines 28-29, delete ""contigentUnion5"" and insert -- "contingentUnion5" --, therefor.

In Column 55, Lines 29-30, delete ""contigentUnion1"" and insert -- "contingentUnion1" --, therefor.

In Column 55, Line 30, delete ""contigentUnion2"" and insert -- "contingentUnion2" --, therefor.

In Column 55, Line 30, delete ""contigentUnion3"" and insert -- "contingentUnion3" --, therefor.

CERTIFICATE OF CORRECTION (continued)
U.S. Pat. No. 10,503,716 B2

In Column 55, Lines 30-31, delete ""contigentUnion4"" and insert -- "contingentUnion4" --, therefor.

In Column 55, Line 37, delete ""contigentUnion5"" and insert -- "contingentUnion5" --, therefor.

In Column 55, Line 39, delete ""contigentUnion2"" and insert -- "contingentUnion2" --, therefor.

In Column 55, Line 40, delete ""contigentUnion5"" and insert -- "contingentUnion5" --, therefor.

In Column 55, Lines 42-43, delete ""contigentUnion5"" and insert -- "contingentUnion5" --, therefor.

In Column 55, Lines 45-46, delete ""contigentUnion5"" and insert -- "contingentUnion5" --, therefor.

In Column 55, Line 49, delete ""contigentUnion5"" and insert -- "contingentUnion5" --, therefor.

In Column 55, Line 63, delete ""contigentUnion5"" and insert -- "contingentUnion5" --, therefor.

In Column 56, Lines 7-8, delete ""contigentUnion5"" and insert -- "contingentUnion5" --, therefor.

In Column 56, Line 12, delete ""contigentUnion5"" and insert -- "contingentUnion5" --, therefor.

In Column 56, Line 15, delete ""contigentUnion5"" and insert -- "contingentUnion5" --, therefor.

In Column 56, Line 17, delete "white" and insert -- while --, therefor.

In Column 56, Lines 48-50, delete ""contigentUnion1", "contigentUnion2", "contigentUnion3", "contigentUnion4", and "contigentUnion5")" and insert -- "contingentUnion1", "contingentUnion2", "contingentUnion3", "contingentUnion4", and "contingentUnion5") --, therefor.